US010409488B2

(12) United States Patent
Paek et al.

(10) Patent No.: US 10,409,488 B2
(45) Date of Patent: Sep. 10, 2019

(54) INTELLIGENT VIRTUAL KEYBOARDS

(71) Applicant: Microsoft Technology Licensing, LLC, Redmond, WA (US)

(72) Inventors: Timothy S. Paek, Sammamish, WA (US); Cole R. Benson, Seattle, WA (US); Asela J. Gunawardana, Seattle, WA (US); Zachary D. Oligschlaeger, Seattle, WA (US); Alisher Saydalikhodjayev, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 15/362,380

(22) Filed: Nov. 28, 2016

(65) Prior Publication Data

US 2017/0357443 A1 Dec. 14, 2017

Related U.S. Application Data

(63) Continuation-in-part of application No. 15/181,073, filed on Jun. 13, 2016.
(Continued)

(51) Int. Cl.
*G06F 3/048* (2013.01)
*G06F 3/0488* (2013.01)
(Continued)

(52) U.S. Cl.
CPC ........ *G06F 3/04886* (2013.01); *G06F 3/0481* (2013.01); *G06F 3/0482* (2013.01);
(Continued)

(58) Field of Classification Search
None
See application file for complete search history.

(56) References Cited

U.S. PATENT DOCUMENTS 8,059,101 B2 * 11/2011 Westerman ........... G06F 3/0416
178/18.01
8,584,031 B2 * 11/2013 Moore ................ G06F 3/04817
715/773
(Continued)

FOREIGN PATENT DOCUMENTS

| WO | 2007080570 A1 | 7/2007 |
| WO | WO2014105401 | 7/2014 |
| WO | 2014117244 A1 | 8/2014 |

OTHER PUBLICATIONS

"Non Final Office Action Issued in U.S. Appl. No. 15/181,073", dated May 9, 2018, 30 Pages.
(Continued)

*Primary Examiner* — Hua Lu
(74) *Attorney, Agent, or Firm* — Klaquist Sparkman, LLP

(57) ABSTRACT

Systems, methods, and computer media for intent-based, dynamic generation and display of task icons within virtual keyboards are provided herein. A system can include a processor, an intent classifier, and a user interface generator. The intent classifier can be configured to determine user intent candidates based on contextual information. A user interface generator can be configured to generate the virtual keyboard for display and, upon receiving an indication of a user intent determined based on the user intent candidates, generate a task icon within the virtual keyboard. The task icon represents functionality associated with the determined user intent. Interaction with the task icon in the virtual keyboard can launch functionality associated with the determined intent. The user interface generator can also be configured to present a search interface upon receiving an indication of a user interaction with the virtual keyboard.

18 Claims, 42 Drawing Sheets

Related U.S. Application Data

(60) Provisional application No. 62/359,096, filed on Jul. 6, 2016.

(51) Int. Cl.
  *G06F 16/951* (2019.01)
  *G06F 3/0481* (2013.01)
  *G06F 3/0482* (2013.01)

(52) U.S. Cl.
  CPC ........ *G06F 3/0488* (2013.01); *G06F 3/04817* (2013.01); *G06F 3/04883* (2013.01); *G06F 16/951* (2019.01)

(56) References Cited

U.S. PATENT DOCUMENTS

| | | | | |
|---|---|---|---|---|
| 9,031,208 | B2 | 5/2015 | Raghav et al. | |
| 9,086,775 | B1* | 7/2015 | Tse | G06F 3/048 |
| 2003/0014491 | A1 | 1/2003 | Horvitz et al. | |
| 2006/0069686 | A1 | 3/2006 | Beyda et al. | |
| 2009/0303187 | A1* | 12/2009 | Pallakoff | G06F 3/0488 345/169 |
| 2010/0100839 | A1* | 4/2010 | Tseng | G06F 1/1624 715/780 |
| 2011/0153324 | A1* | 6/2011 | Ballinger | G10L 15/30 704/235 |
| 2011/0285656 | A1* | 11/2011 | Yaksick | G06F 3/04883 345/173 |
| 2011/0289025 | A1* | 11/2011 | Yan | G06N 20/00 706/12 |
| 2011/0316772 | A1* | 12/2011 | Zhang | G06F 3/0236 345/156 |
| 2012/0084248 | A1* | 4/2012 | Gavrilescu | G06F 16/9535 706/52 |
| 2012/0117499 | A1 | 5/2012 | Mori et al. | |
| 2012/0127082 | A1 | 5/2012 | Kushler | |
| 2012/0209879 | A1* | 8/2012 | Banerjee | G06F 16/338 707/776 |
| 2012/0278309 | A1* | 11/2012 | Tang | G06F 16/951 707/722 |
| 2013/0173727 | A1* | 7/2013 | Libin | H04L 51/10 709/206 |
| 2014/0115070 | A1* | 4/2014 | Virtanen | G06Q 10/107 709/206 |
| 2014/0164476 | A1* | 6/2014 | Thomson | G06Q 10/101 709/203 |
| 2014/0172814 | A1* | 6/2014 | Yuen | G06F 16/90324 707/706 |
| 2014/0223372 | A1* | 8/2014 | Dostie | G06F 3/0482 715/813 |
| 2014/0280603 | A1* | 9/2014 | Rideout | H04L 51/046 709/205 |
| 2014/0310001 | A1* | 10/2014 | Kalns | G10L 15/1822 704/270.1 |
| 2014/0317578 | A1* | 10/2014 | Chaudhri | G06F 3/04817 715/863 |
| 2014/0379744 | A1* | 12/2014 | Kuo | G06F 3/0237 707/767 |
| 2015/0026157 | A1* | 1/2015 | Kruzeniski | G06F 3/0482 707/722 |
| 2015/0049026 | A1* | 2/2015 | Chen | G06F 3/04886 345/173 |
| 2015/0100537 | A1* | 4/2015 | Grieves | G06N 5/048 706/52 |
| 2016/0034178 | A1* | 2/2016 | Yoon | G06F 3/04886 715/760 |
| 2016/0292217 | A1* | 10/2016 | Sinha | G06F 3/0482 |
| 2017/0024365 | A1* | 1/2017 | Emerick | G06F 17/2247 |
| 2017/0098159 | A1* | 4/2017 | Sharifi | G06F 3/0484 |
| 2017/0109780 | A1* | 4/2017 | Moore | G06Q 30/0244 |
| 2017/0308291 | A1* | 10/2017 | Luipold | G06F 3/0482 |
| 2017/0310616 | A1* | 10/2017 | Cao | G06F 3/04886 |
| 2017/0346769 | A1* | 11/2017 | McCray | H04L 51/26 |
| 2017/0351399 | A1* | 12/2017 | Pallakoff | G06F 3/0488 |
| 2017/0357521 | A1 | 12/2017 | Paek et al. | |

OTHER PUBLICATIONS

"International Search Report and Written Opinion Issued on PCT Application No. PCT/US2017/036243" dated Sep. 8, 2017, 13 Pages.

Padla, R, "Google launches Gboard, lets you search for GIFs and emojis within chat", Published on: May 13, 2016 Available at: http://androidcommunity.com/google-launches-gboard-lets-you-search-for-gifs-and-emojis-within-chat-20160513/.

Chacos, Brad, "Google's Gboard is a feature-packed iPhone keyboard with baked-in search capabilities", Published on: May 12, 2016 Available at: http://www.macworld.com/article/3069589/apple-phone/googles-gboard-is-a-feature-packed-iphone-keyboard-with-baked-in-search-capabilities.html.

Messina, Chris, "2016 will be the year of conversational commerce", Published on: Jan. 19, 2016 Available at: https://medium.com/chris-messina/2016-will-be-the-year-of-conversational-commerce-1586e85e3991#.40lbeec01.

Calimlim, Aldrin, "6 emoji keyboard apps for iOS to help you say more", Published on: July 17, 2015 Available at: http://appadvice.com/appnn/2015/07/6-emoji-keyboard-apps-for-ios-to-help-you-say-more.

Leber, Jessica, "Smart Assistant Listens to You Talk, Fetches Info Automatically", Published on: Jan. 17, 2013 Available at: https://www.technologyreview.com/s/509906/smart-assistant-listens-to-you-talk-fetches-info-automatically/.

Ahmed, Waqas, "Dialapp for Android Magically Predicts Who You Want to Call Next Based on Context", Published on: Jun. 29, 2013 Available at: http://www.addictivetips.com/android/dialapp-predicts-who-you-want-to-call-based-on-context/.

"Gboard—Search. GIFs. Emojis & more. Right from your keyboard", Retrieved on: Jul. 8, 2016 Available at: https://itunes.apple.com/us/app/gboard-search.-gifs.-emojis/id1091700242?mt=8.

Google, "Meet Gboard: Search, GIFs, emojis & more. Right from your keyboard," https://googleblog.blogspot.com/2016/05/gboard-search-gifs-emojis-keyboard.html, 5 pages, May 12, 2016.

Olivarez-Giles, "Review: Gboard Adds Google's Search Box to iPhone Keyboards," http://www.wsj.com/articles/review-gboard-adds-googles-search-box-to-iphone-keyboards- . . . , 3 pages, May 12, 2016.

"International Search Report and Written Opinion Issued in PCT Application No. PCT/US2017/036468", dated Sep. 5, 2017,13 Pages.

Crook, "Google is reportedly making an iOS keyboard with search functionality," Mar. 23, 2016, 5 pages.

Danninger, et al., "The connector service-predicting availability in mobile contexts", In Proceedings of Third International Workshop on Machine Learning for Multimodal Interaction, May 1, 2006, pp. 1-12.

"How do I turn on Android emoji predictions to show up in the prediction bar?", Retrieved on: Mar. 29, 2016, Available at: https://support.swiftkey.com/hc/en-us/articles/201457892-How-do-I-turn-on-Android-emoji-predictions-to-show-up-in-the-prediction-bar-.

Jain, et al., "PALTask Chat:A Personalized Automated Context-Aware Web-Resources Listing Tool", In Proceedings of IEEE Ninth World Congress on Services, Jun. 28, 2013, 4 pages.

Khalil, et al., "Improving Cell Phone Awareness by using Calendar Information", In Proceedings of Human-Computer Interaction-Interact, Sep. 12, 2005, pp. 588-600.

Newman, Nic, "Media, Journalism and Technology Predictions 2016", Jan. 6, 2016, Available at: http://digitalnewsreport.org/publications/2016/predictions-2016/.

Pielot, et al., "Didn't You See My Message? Predicting Attentiveness to Mobile Instant Messages", In Proceedings of Human Factors in Computing Systems, Apr. 26, 2014, 10 pages.

Pierce, David, "Screw Texting. It's Time to Pick a Universal Messaging App", Published on: Aug. 2015, Available at: http://www.wired.com/2015/08/time-to-ditch-texting/.

(56) References Cited

OTHER PUBLICATIONS

Seneff, et al., "Exploiting Context Information in Spoken Dialogue Interaction with Mobile Devices?", In Proceedings of International Workshop on Improved Mobile User Experience, May 13, 2007, pp. 1-11.

"Final Office Action Issued in U.S. Appl. No. 15/181,073", dated Nov. 13, 2018, 23 Pages.

\* cited by examiner

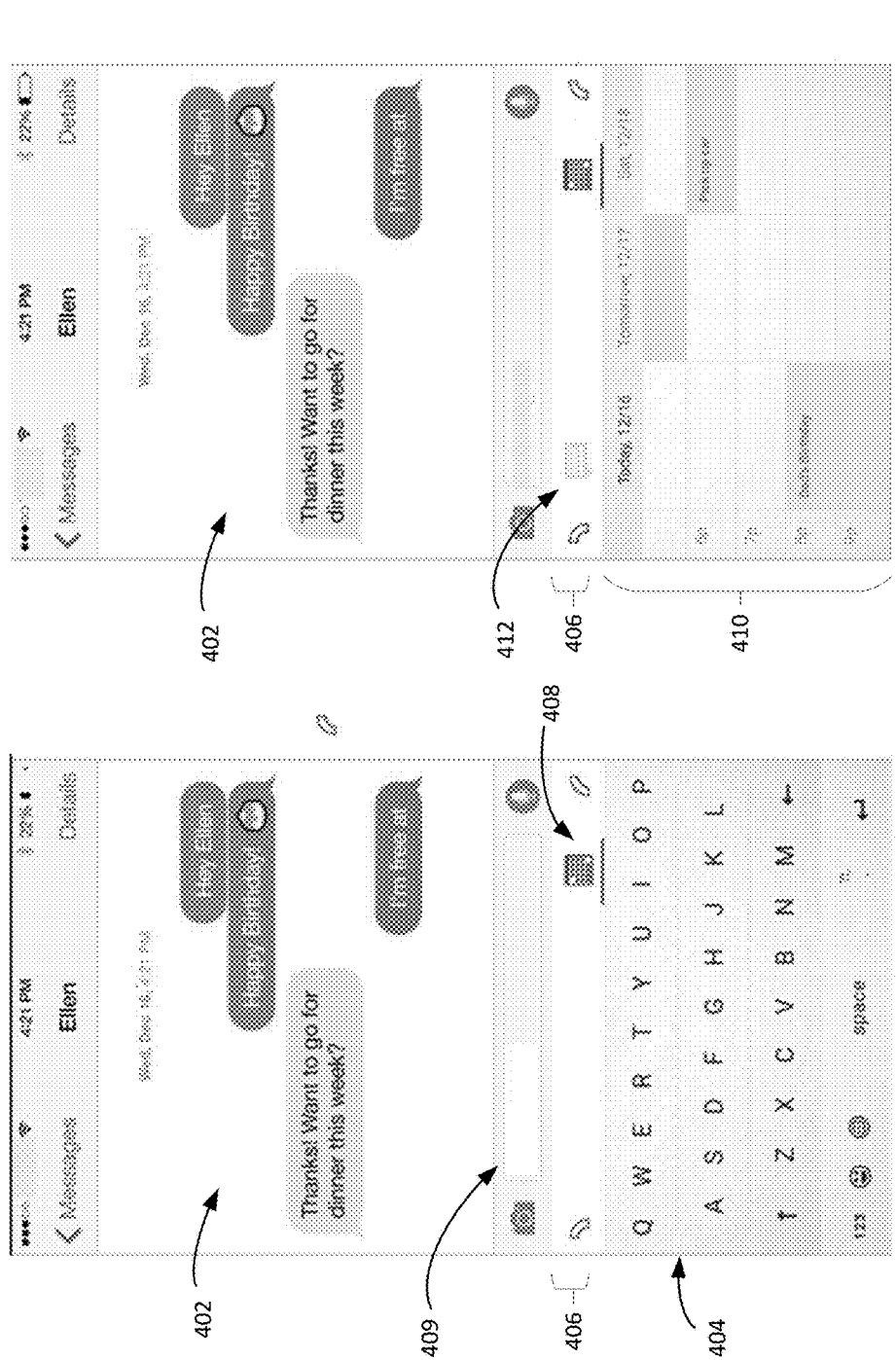

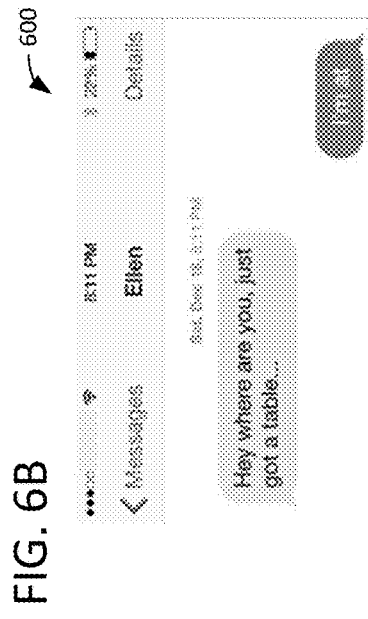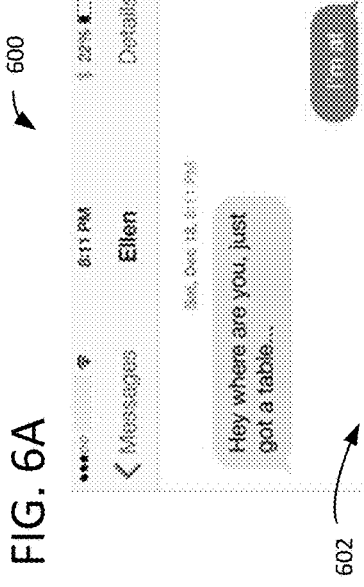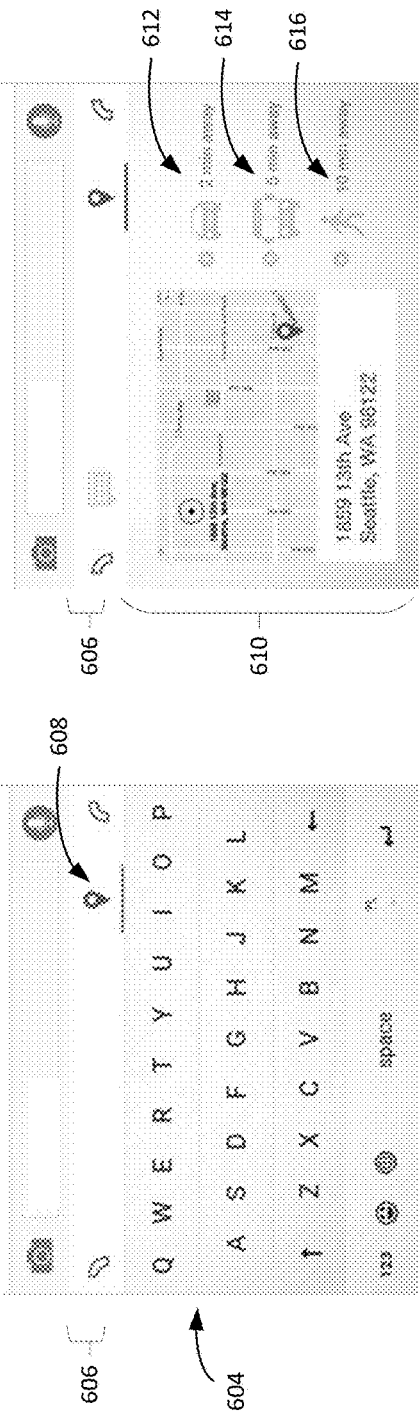
FIG. 6A
FIG. 6B

FIG. 6C
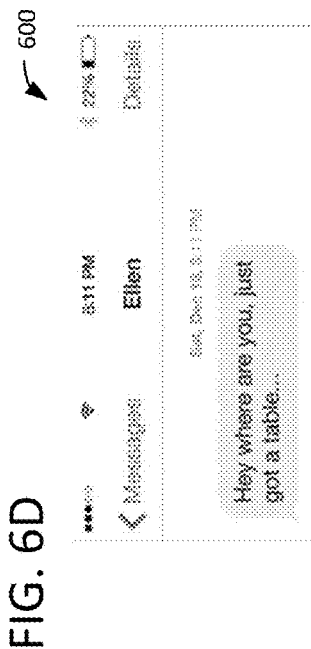
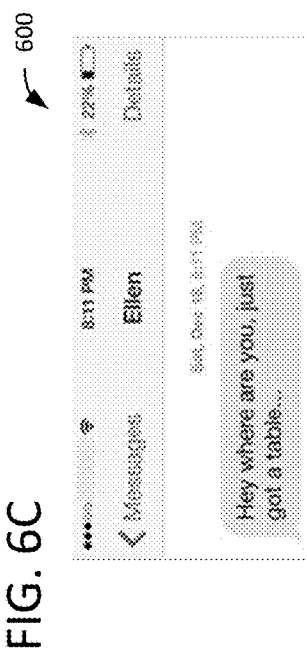
FIG. 6D
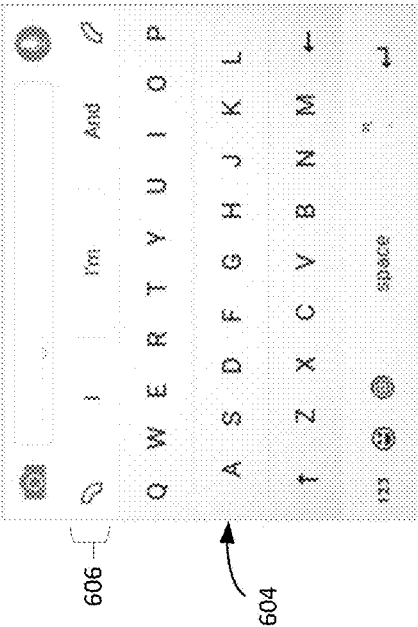
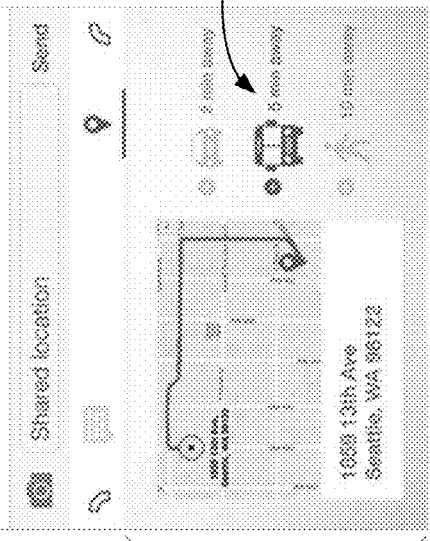

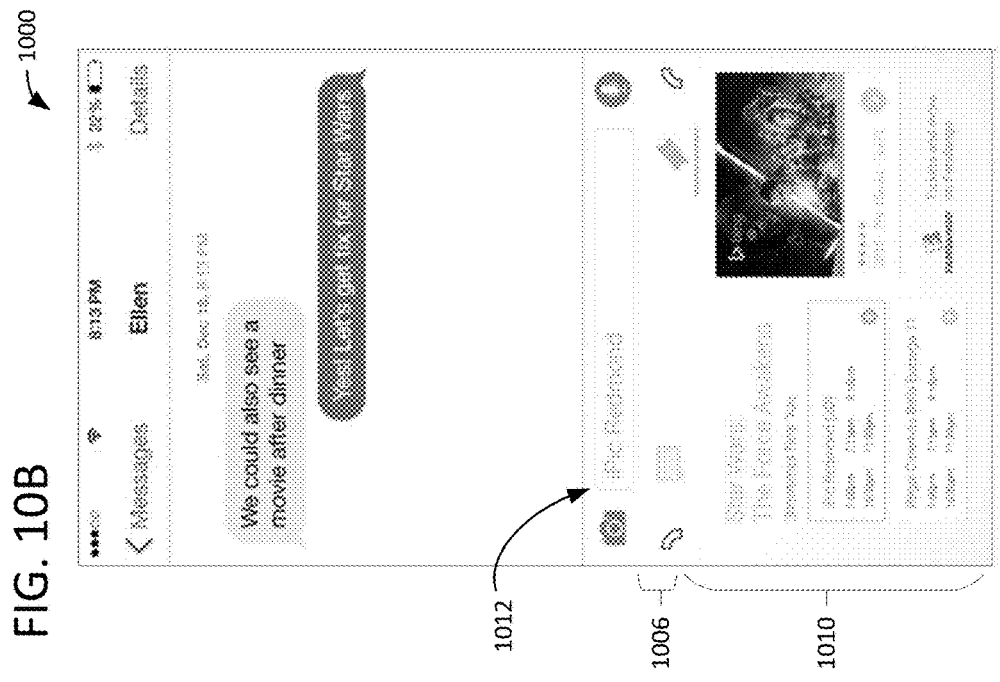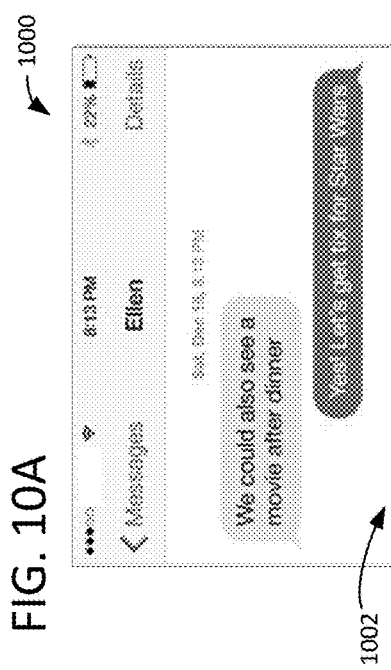
FIG. 10B
FIG. 10A

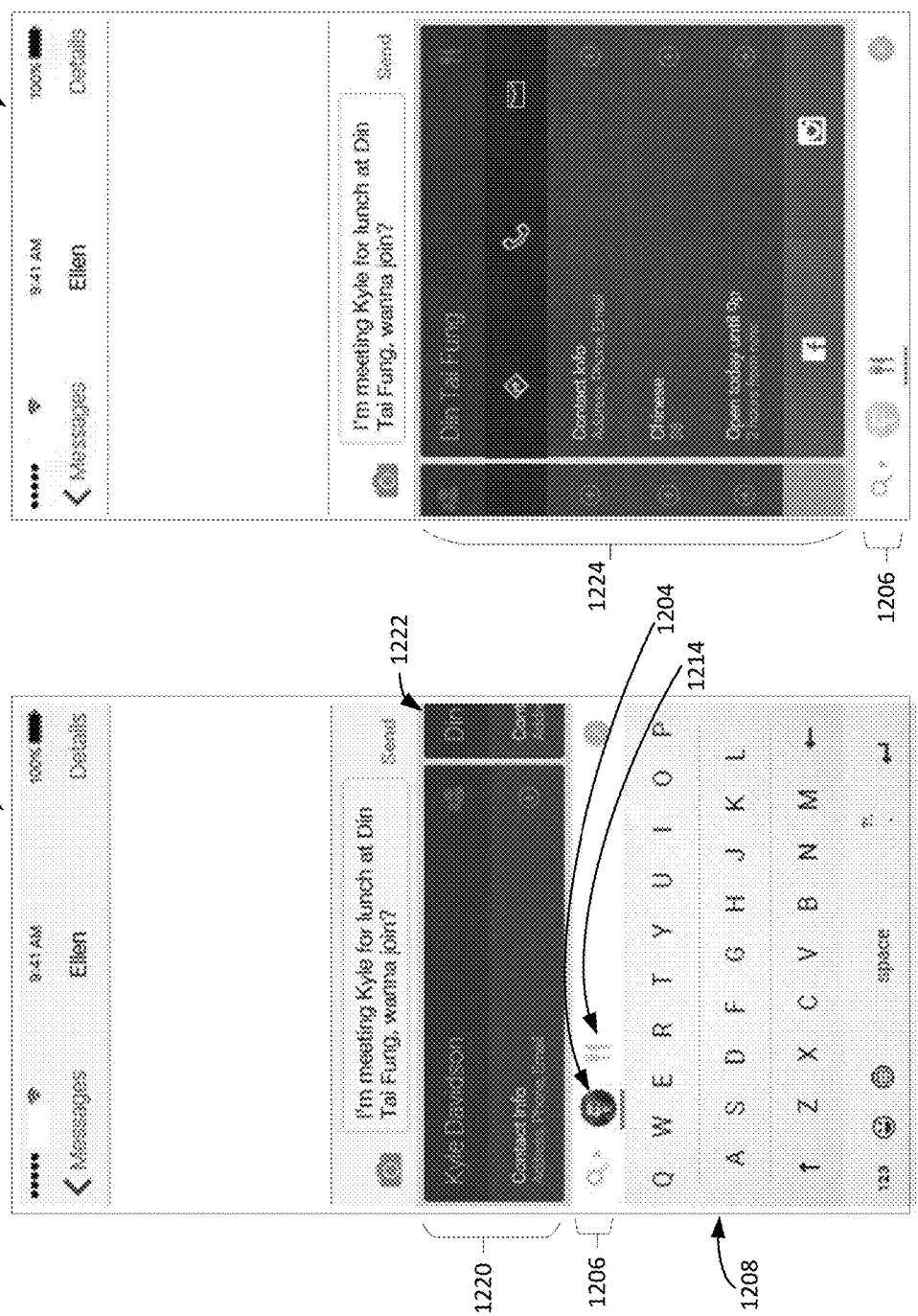

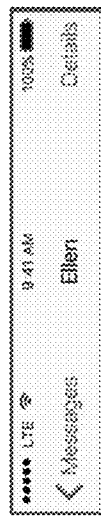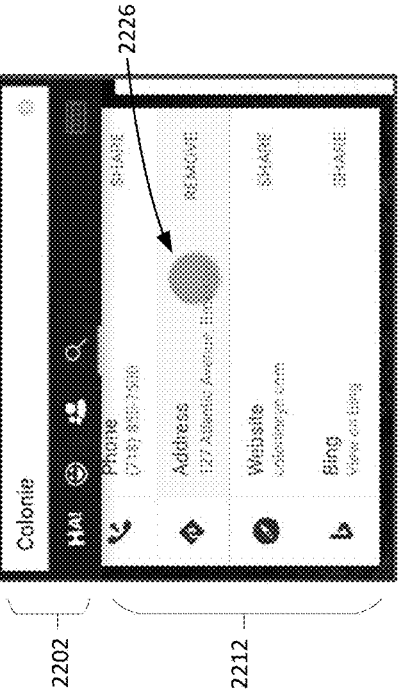
FIG. 22J
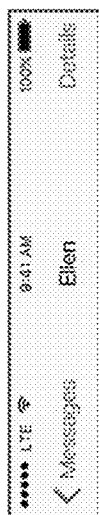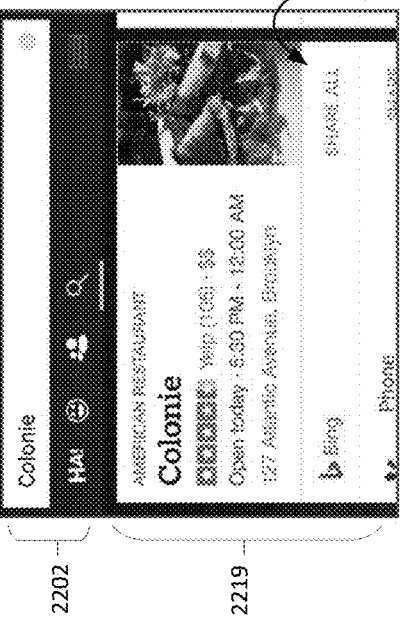
FIG. 22I

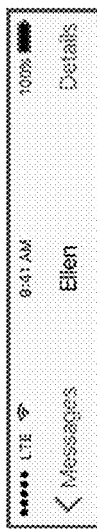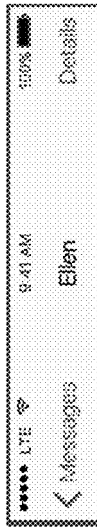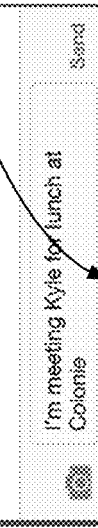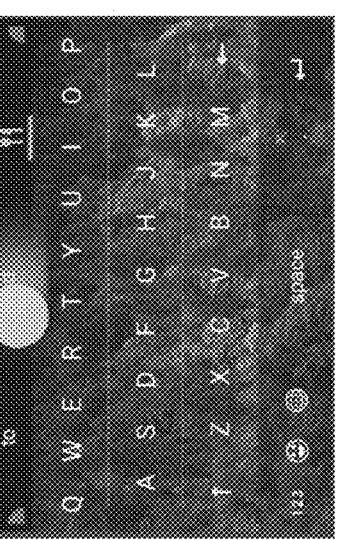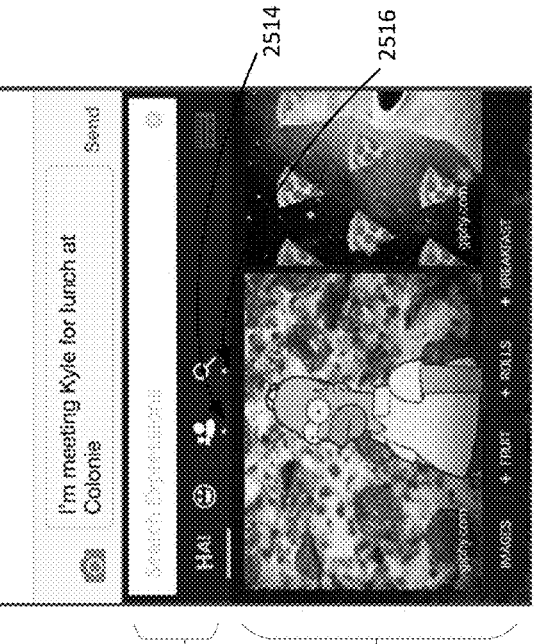
FIG. 25E
FIG. 25F

INTELLIGENT VIRTUAL KEYBOARDS

CROSS-REFERENCE TO RELATED APPLICATIONS

This application claims the benefit of U.S. Provisional Application No. 62/359,096, filed Jul. 6, 2016 and titled "INTELLIGENT VIRTUAL KEYBOARDS," and is a continuation-in-part of U.S. patent application Ser. No. 15/181,073, filed Jun. 13, 2016 and titled "VIRTUAL KEYBOARD WITH INTENT-BASED, DYNAMICALLY GENERATED TASK ICONS," both of which are incorporated herein by reference in their entirety.

BACKGROUND

With the advent of touchscreens and mobile devices, virtual keyboards have become commonplace. Virtual keyboards are typically displayed, for example, when a user taps the screen to enter text while using an application on a touchscreen device. Despite their advantages, virtual keyboards are often difficult and cumbersome to use for certain activities.

SUMMARY

Examples described herein relate to intent-based, dynamic generation and display of task icons within virtual keyboards, as well as in-keyboard search functionality. An example system can include a processor, an intent classifier, a ranker, and a user interface generator. The intent classifier can be configured to determine, by the processor, one or more user intent candidates based on contextual information. Contextual information can be, for example, text entered via a virtual keyboard, information relating to an application that is active while the virtual keyboard is displayed, text received in a conversation in the active application, etc.

User intent candidates can be selected in different ways. For example, a ranker can be configured to, by the processor, rank the one or more user intent candidates, and based on the ranking, select a user intent candidate as a determined user intent. A user interface generator can be configured to, by the processor, generate the virtual keyboard for display. Upon receiving an indication of the determined user intent, the user interface generator can also be configured to generate a task icon within the virtual keyboard based on the determined user intent. The task icon can be displayed, for example, in the input method editor (IME) of the virtual keyboard. Selection of or other interaction with the task icon in the virtual keyboard can launch functionality associated with the determined intent. User intent can be updated based on additional contextual information, and the task icon can be removed from the virtual keyboard if the task icon no longer reflects the updated user intent.

The user interface generator can also be configured, by the processor, to present a search interface (e.g., one or more search icons) in response to receiving an indication of an interaction with the IME portion of the virtual keyboard. Upon receiving the indication of the interaction with the IME, a portion of the virtual keyboard can also be replaced with a search result interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

BRIEF DESCRIPTION OF THE DRAWINGS

FIGS. 4A-4D illustrate determination of intent and presentation of a calendar task icon in a virtual keyboard.

FIGS. 6A-6D illustrate determination of intent, presentation of a mapping task icon, and selection of shareable content (a current location and estimated time of arrival) from a task icon user interface.

FIGS. 10A-10B illustrate determination of intent and presentation of a movie task icon in the virtual keyboard.

FIGS. 12A-12H illustrate various features related to determination of intent and presentation of a task icon in the virtual keyboard in which a task user interface is presented above the virtual keyboard.

FIGS. 22A-22J illustrate presentation of a search interface in response to a user interaction with the IME portion of the virtual keyboard.

FIG. 24 illustrates an example method of reconfiguring a graphical user interface in which an indicator is presented in association with a search icon to reflect that a task icon corresponding to a search category of the search icon was presented but has not been interacted with.

FIGS. 25A-25G illustrate presentation of an indicator in association with a search icon reflecting that a task icon corresponding to a search category of a search icon was presented but has not been interacted with.

DETAILED DESCRIPTION

Figure 1:
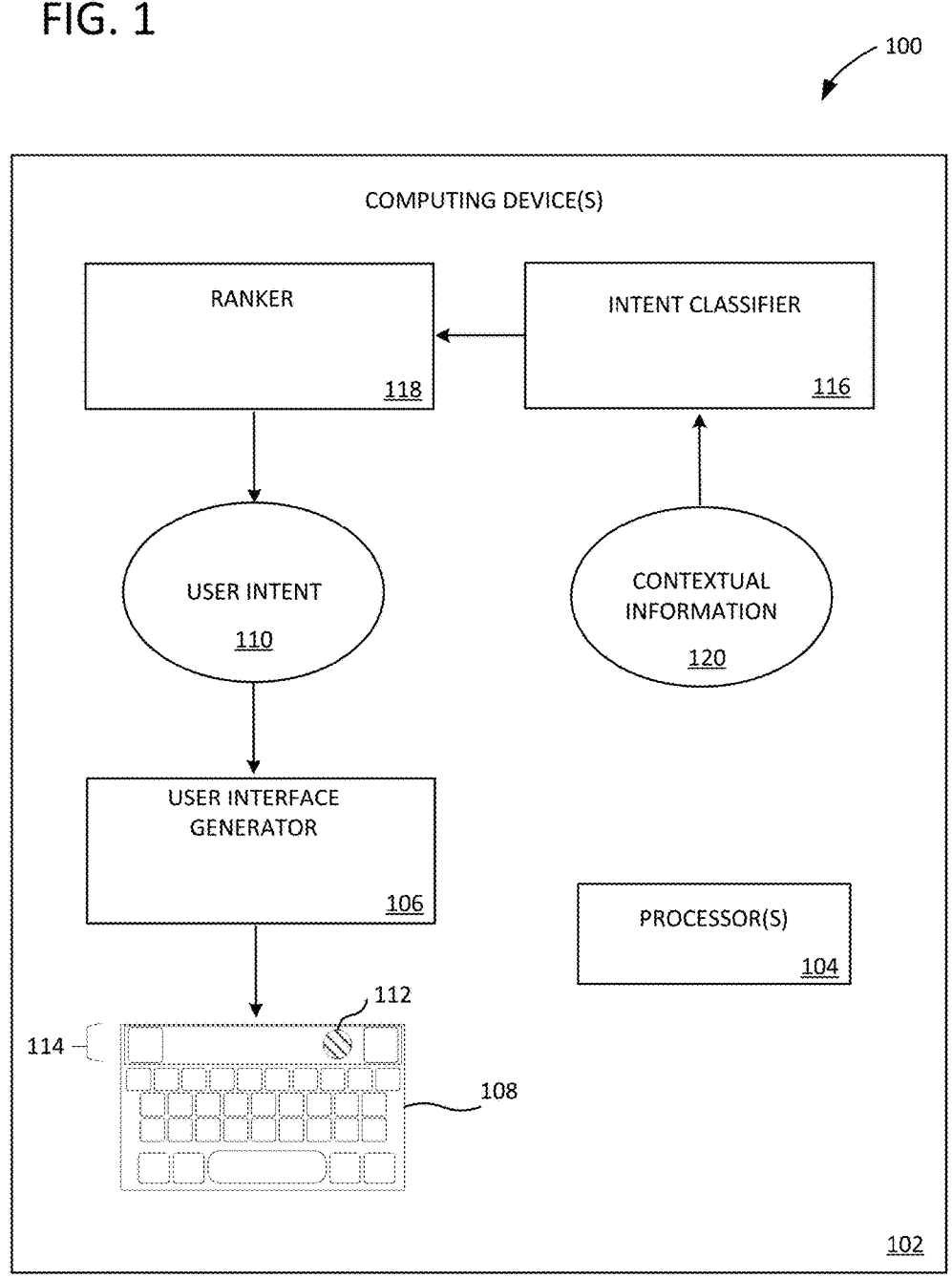
FIG. 1 is a block diagram of an example system capable of dynamically generating intent-based task icons.

Using the systems, methods, and computer-readable media described herein, an intent of a user interacting with a user interface of a computing device can be dynamically determined based on contextual information (e.g., text entered by the user or received from another user), and a task icon reflecting the user intent can be generated and displayed within a virtual keyboard in the user interface. Interaction with the task icon can cause a task icon user interface to be displayed in place of a portion of the overall user interface (e.g., displayed above the virtual keyboard or in place of a portion of the virtual keyboard). The task icon user interface provides convenient access (e.g., via an application user interface, links, deep links, etc.) to functionality corresponding to the user intent.

Unlike conventional approaches, the dynamic, intent-based approaches described herein allow users to access desired functionality directly from the virtual keyboard and/or task icon user interface without forcing the user to exit an application, open another application to perform an action, and then switch back to the original application.

As an example, the described approaches can be used to determine user intent while a user is having a conversation in a messaging application. In an example conversation, the user receives "feel like grabbing a bite to eat?" The user then enters, via a virtual keyboard, "sure, where?" One or both of these questions can be analyzed to determine that the user intent is to find a restaurant at which to meet for dinner. After this user intent is determined, a mapping task icon is generated and presented in the virtual keyboard. A selection, swipe, or other interaction with the mapping task icon causes a mapping task icon user interface to be displayed. The mapping task icon user interface can show locations of nearby restaurants, provide links to webpages of the restaurants, provide shareable restaurant information (e.g., a name and address that can be inserted into the messaging conversation), etc.

Thus, the mapping task icon user interface provides the user with access to mapping functionality (searching for restaurants near the user's current location) without the user having to exit the messaging application, launch a mapping application, locate restaurants, copy information, switch back to the messaging application, etc. The user can simply select a restaurant from the mapping task icon user interface, causing the restaurant's information to be added to the conversation, and continue with the uninterrupted flow of conversation.

Search functionality can also be provided to a user via the virtual keyboard. As an example, a virtual keyboard that does not include a search icon, search query text entry box, or other search functionality can be presented, and user can interact with the IME portion of the virtual keyboard to cause one or more search icons and/or other aspects of a search interface to be presented within the virtual keyboard. By providing search functionality when a user requests such functionality instead of including a search interface as a permanent part of a virtual keyboard, cluttering the virtual keyboard with a large number of icons or features that a user is not currently interested in using can be avoided.

In the described examples, the computational complexity of performing a desired action is reduced through the dynamic, intent-based approaches, which eliminates the computational cost of exiting/launching/relaunching applications and navigating through a user interface to locate desired applications. Examples are described below with reference to FIGS. 1-27B.

FIG. 1 illustrates a system 100 implemented on one or more computing device(s) 102. Computing device 102 includes at least one processor 104. Computing device 102 can be, for example, a mobile device, such as a smartphone or tablet, a personal computer, such as a desktop, laptop, or notebook computer, or other device.

A user interface generator 106 is configured to, by the at least one processor 104, generate a virtual keyboard 108 for display in a user interface. The user interface is presented on a display of computing device(s) 102. As used herein a "virtual keyboard" refers to a user interface having numbers, letters, etc. corresponding to those of a physical keyboard (e.g., a laptop or PC keyboard). Typically, the characters of a virtual keyboard are arranged similarly to those of a physical keyboard. The virtual keyboard is typically displayed on a touchscreen, and individual characters are selected through touch selection, hover selection, or other interaction with the touchscreen. Projection keyboards, Air-Type keyboards, and other non-physical keyboards are also considered to be virtual keyboards.

User interface generator 106 is also configured to, by the at least one processor 104 and upon receiving an indication of a determined user intent 110, generate a task icon 112 within virtual keyboard 108 based on determined user intent 110. As used herein, a "task icon" refers to a graphic, image, text, symbol, or other user interface element that represents functionality. The appearance of task icon 112 can reflect determined user intent 110. For example, if determined user intent 110 is to see a movie, task icon 112 can be a graphic or image of a movie studio, theater, ticket, or projector, the text "movies," etc. In some examples, multiple user intents are determined (e.g., multiple user intents that exceed a confidence or probability threshold), and multiple task icons are presented. Examples of task icons are shown in FIGS. 4A-15.

In some examples, task icon 112 is presented in the input method editor (IME) portion 114 of virtual keyboard 108. IME portion 114 is shown in FIG. 1 as being at the top of virtual keyboard 108. IME portion 114 can be the portion of virtual keyboard 108 where autocorrect or word suggestions are displayed. IME portion 114 can contain various positions of importance. Using the example of autocorrect suggestions appearing in the IME, a most likely suggestion can be presented in IME portion 114 on the left in a first position, a second most likely suggestion can be presented to the right of the first position in a second position, etc. Task icon 112 can be presented in any position within IME portion 114. Task icon 112 can also be presented in a different portion of virtual keyboard 108, such as the left or right side, bottom left or right, etc. Task icon 112 can also be partially occluded as a "peek" of additional information which can be obtained with a swipe. In some examples, user interface generator 106 is further configured to, by the at least one processor 104, remove task icon 112 upon receiving an indication that determined user intent 110 has been updated (e.g., based on additional contextual information or after a time threshold has elapsed).

Interaction with task icon 112 in virtual keyboard 108 launches functionality associated with determined user intent 110. Interaction with task icon 112 can be, for example, a touch or hover selection, swipe to the right (or left, up, or down), pinch, select and hold for a threshold amount of time, or other interaction.

User interface generator 106 can be configured to launch the functionality associated with determined user intent 110 in a task icon user interface (illustrated, e.g., in FIGS. 4B, 6B, 7B, 8D, 9B, 12G, 12H, 13B and other figures). For example, user interface generator 106 can be configured to, upon receiving an indication of an interaction with task icon 112, replace a portion of the user interface with a task icon user interface. The functionality associated with determined user intent 110 is accessible via the task icon user interface. In some examples, the task icon user interface is displayed in place of a portion of virtual keyboard 108. As a specific example, the task icon user interface can be displayed in place of the portion of virtual keyboard 108 below IME portion 114 (illustrated, e.g., in FIGS. 4B and 6B). In some examples, a portion of the user interface other than virtual keyboard 108 is replaced with the task icon user interface. This is illustrated, for example, in FIGS. 12B and 13B. In various examples, virtual keyboard 108 can continue to be displayed while the task icon user interface is displayed.

The task icon user interface can include an application user interface for an application launched by interaction with task icon 112 or a link or deep link to functionality of an application or functionality of a web service. The application launched by interaction with task icon 112 can be, for example, a mapping application, an organization application, a funds transfer application, a media application (audio, video, and/or image), or a user review application. In some examples, the application user interface for the application launched by interaction with task icon 112 comprises shareable content generated by the application and related to determined user intent 110. Shareable content can include, for example, an estimated arrival or departure time, an event start time or end time, a restaurant suggestion, a movie suggestion, a calendar item, a suggested meeting time or meeting location, transit information, traffic information, weather or temperature information, or an instant answer result. In some examples, certain portions of information can be individually selected for sharing. For example, if a restaurant suggestion is shareable content, any combination of the address, hours, link to the menu, directions, reviews, etc. can be shareable. Task icon user interfaces are discussed in detail with respect to FIGS. 4B-15.

User interface generator 106 can be implemented, for example, as computer-executable instructions (e.g., software) stored in memory (not shown) and executable by the at least one processor 104. User interface generator 106 can also be implemented at least in part using programmable logic devices (PLDs) such as field programmable gate arrays (FPGAs), application-specific integrated circuits (ASICs), or other computing hardware.

The determined user intent 110 that is provided to user interface generator 106 is determined by an intent classifier 116 and, in some examples, a ranker 118. Intent classifier 116 is configured to determine, by the at least one processor 104, one or more user intent candidates based on contextual information 120. In some examples, system 100 includes multiple intent classifiers. Contextual information 120 can include, for example, text entered via virtual keyboard 108, text received from a remote computing device, commands received through voice recognition, information relating to an application that is active while virtual keyboard 108 is displayed, task icons previously interacted with, a location of a user interacting with the user interface, a current time, day, or date, or history or preference information.

As an example, if a messaging application is active while virtual keyboard 108 is displayed, contextual information 120 can include: messages entered via virtual keyboard 108; messages received from another user; the fact that the messaging application is active; preferences or history associated with the other user with whom the user is communicating; or preferences or history associated with conversations between the two users (e.g., a history of the two users meeting for coffee). Contextual information 120 can also include actions recently performed by the user (e.g., a recent search for "coffee" in a mapping application), reminders/alarms, calendar or organizer items (e.g., "have coffee with Kyle" stored as an upcoming appointment in a calendar application), etc. As used herein, a messaging application includes dedicated "chat" applications, chat or messaging functionality in other applications, email applications, or other applications in which messages are sent between users.

Intent classifier 116 can determine user intent candidates through a number of approaches, including artificial intelligence and machine learning approaches such as natural language understanding (NLU). NLU involves parsing, organizing, and classifying human language (whether received through voice recognition, touch/type input, or received in an electronic message or other electronic communication). NLU can be performed, for example, using a template matching approach in which text is analyzed to identify particular co-located strings that correspond to a known intent. For example, a template of "(airport_code_1) to (airport_code_2)" can correspond to an intent to purchase airline tickets. In template matching approaches, received text can be compared to a number of different templates.

Intent classification can also be performed through the use of statistical models such as logistic regression, boosted decision trees, neural networks, conditional Markov language models or conditional random fields. In such approaches, a training set of text portions that are tagged with a known intent are used to build statistical models that are then used to predict the intent of other text encountered at run-time. Collecting a variety and large amount of training data can improve the performance of such approaches.

In some examples, system 100 includes different intent classifiers for different types of functionality that can be associated with and accessed via task icon 112. For example, system 100 can include an intent classifier for restaurant recommendations, an intent classifier for directions, an intent classifier for media items, etc. In examples where template matching techniques are used, different intent classifiers can have different associated templates. Intent classifier 116 can be trained using training data based on previously entered text and subsequent actions taken (for the user and/or for other users). For example, if a user receives the text "Hungry?" and replies "starving," and then opens a restaurant review or mapping application, this data can be used as training data to match future received incidences of "hungry" and "starving" with the intent to find a restaurant at which to eat. Training can also be done based on user interactions with, or lack of user interactions with, previously presented task icons. For example, if a task icon is presented based on a determined intent, and the user selects, swipes, or otherwise interacts with the task icon, an interpretation is that the determined user intent was accurate for the contextual information. Conversely, if a task icon is presented but not interacted with by the user, an interpretation is that the determined user intent was not accurate. In some examples, training data can be aggregated across users and stored, for example, in a cloud environment where the training data can be accessed by different users. In other examples, training data is user specific.

A search tool can also be used to train intent classifier 116. User searches and corresponding subsequent actions taken or results selected are used to inform future intent classification. The search tool (illustrated, e.g., in FIGS. 13A-13D, 14A-14D, 15A-15D, and 16) can be included in virtual keyboard 108. The search tool can be presented, for example, in IME portion 114, and can be accessed by interacting with a search icon (e.g., a magnifying glass, question mark, etc.) or by performing a particular gesture or combination of gestures. For example, a swipe of IME portion 114 (e.g., swipe left or right) can cause the search tool having a text entry area to be displayed in IME portion 114. A swipe of IME 114 in an opposite direction or selection of an exit button can cause the search tool to disappear. The search tool can also be a speech recognition search tool that begins "listening" when a search icon is interacted with. In some examples, the search tool is displayed when virtual keyboard 108 is displayed. As a specific example, when virtual keyboard 108 is launched, the search tool appears in or under IME portion 114. In some examples where the search tool is presented in IME portion 114, when task icon 112 is generated and presented (or when autocorrect suggestions are generated) due to use of the application with which virtual keyboard 108 is being used, the search tool disappears. System 100 can include a search engine (not shown) configured to perform searches received via the search tool, and user interface generator 106 can be configured to present the search tool.

Intent classifier 116 can be implemented, for example, as computer-executable instructions (e.g., software) stored in memory (not shown) and executable by the at least one processor 104. Intent classifier 116 can also be implemented at least in part using programmable logic devices (PLDs) such as field programmable gate arrays (FPGAs), application-specific integrated circuits (ASICs), or other computing hardware. Intent classifier 116 can also be implemented using neural networks (e.g., deep neural networks, convolutional neural networks, etc.). In some examples, intent classifier 116 can be implemented in a cloud computing environment (e.g., such as cloud 2110 of FIG. 21), and system 100 is in communication with intent classifier 116 through a network such as the Internet. In some examples, some functionality of intent classifier 116 can be implemented in system 100 while other functionality of intent classifier 116 is implemented in the cloud.

In some examples intent classifier 116 performs ranking of or otherwise selects (e.g., selects a candidate with a highest probability, etc.) one or more of the user intent candidates as determined user intent 110. In other examples, ranker 118 is configured to, by the at least one processor 104, rank the one or more user intent candidates determined by intent classifier 116 and, based on the ranking, select at least one user intent candidate as determined user intent 110. Ranker 118 can be configured to apply a variety of ranking approaches, such as to select a user intent candidate with a highest confidence level (e.g., probability of being correct). In some examples, the functionality of ranker 118 is combined with intent classifier 116. Ranking can be done, for example, by calibrating intent classifier 116 using isotonic or logistic regression and then sorting by classifier outputs, using boosted decision trees or neural networks trained under ranking loss functions, or other approaches. Selection of determined user intent 110 can be done, for example, by thresholding the scores used for ranking.

Ranker 118 can be implemented, for example, as computer-executable instructions (e.g., software) stored in memory (not shown) and executable by the at least one processor 104. Ranker 118 can also be implemented at least in part using programmable logic devices (PLDs) such as field programmable gate arrays (FPGAs), application-specific integrated circuits (ASICs), or other computing hardware.

Figure 2:
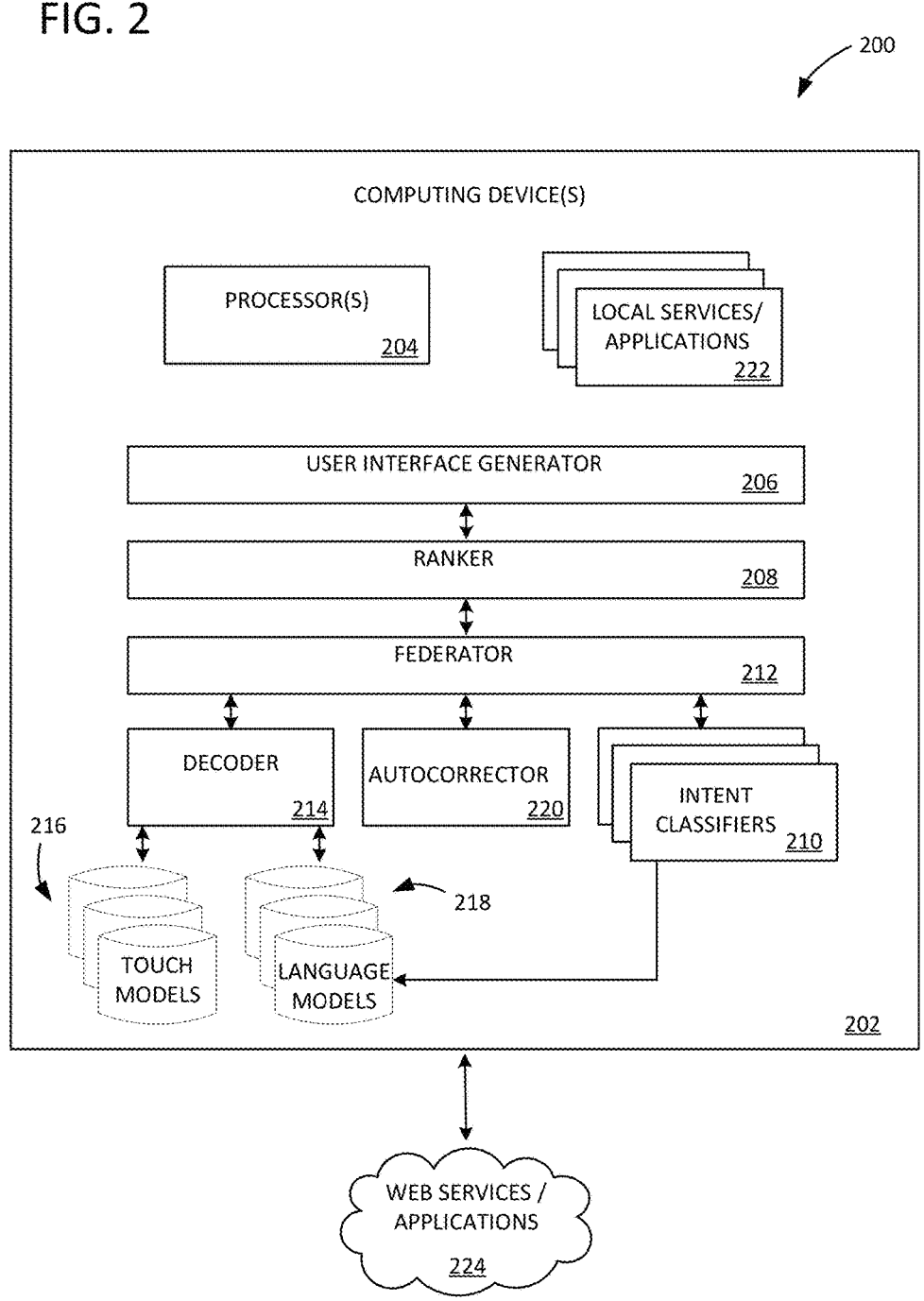
FIG. 2 is a block diagram of an example system capable of dynamically generating intent-based task icons, the system having multiple intent classifiers and a federator.

FIG. 2 illustrates a system 200 implemented on one or more computing device(s) 202. Computing device 202 includes at least one processor 204. Computing device 202 can be similar to computing device 102 of FIG. 1. User interface generator 206 and ranker 208 can also be similar to the corresponding components in FIG. 1. System 200 includes multiple intent classifiers 210. A federator 212 is configured to, by the at least one processor 204, distribute contextual information to intent classifiers 210. Federator 212 is also configured to determine an aggregated group of user intent candidates based on the user intent candidates determined by intent classifiers 210. Ranker 208 is further configured to, by the at least one processor 204, rank the user intent candidates in the aggregated group.

User interface generator 206, ranker 208, and federator 212 can be implemented, for example, as computer-executable instructions (e.g., software) stored in memory (not shown) and executable by the at least one processor 204. User interface generator 206, ranker 208, and federator 212 can also be implemented at least in part using programmable logic devices (PLDs) such as field programmable gate arrays (FPGAs), application-specific integrated circuits (ASICs), or other computing hardware.

Decoder 214 is configured to, by the at least one processor 204, interpret and recognize touch and hover input to the virtual keyboard (not shown). Decoder 214 can be configured to recognize touches/taps as well as swipes. Decoder 214 can be configured to interpret input according to one or more touch models 216 and language models 218 (e.g., such as a user's language model). Touch models 216 are configured to evaluate how well various hypotheses about which word a user intends, as the user is entering text, match the touch and hover input. Language models 218 are configured to evaluate how well these hypotheses fit words already entered. Autocorrector 220 is configured to, by the at least one processor 204, provide autocorrect suggestions, spelling suggestions, etc., that can be presented, for example, in the IME of the virtual keyboard.

Similar to user interface generator 106 of FIG. 1, user interface generator 206 is configured to generate a task icon, within the virtual keyboard, reflecting a determined user intent, and upon receiving an indication of an interaction with the task icon, generate a task icon user interface providing access to functionality corresponding to the determined intent. The task icon user interface can include links or deep links to one or more local services or applications 222 or web services or applications 224. The task icon user interface can also include an application interface for the one or more local services or applications 222 or web services or applications 224.

Figure 3:
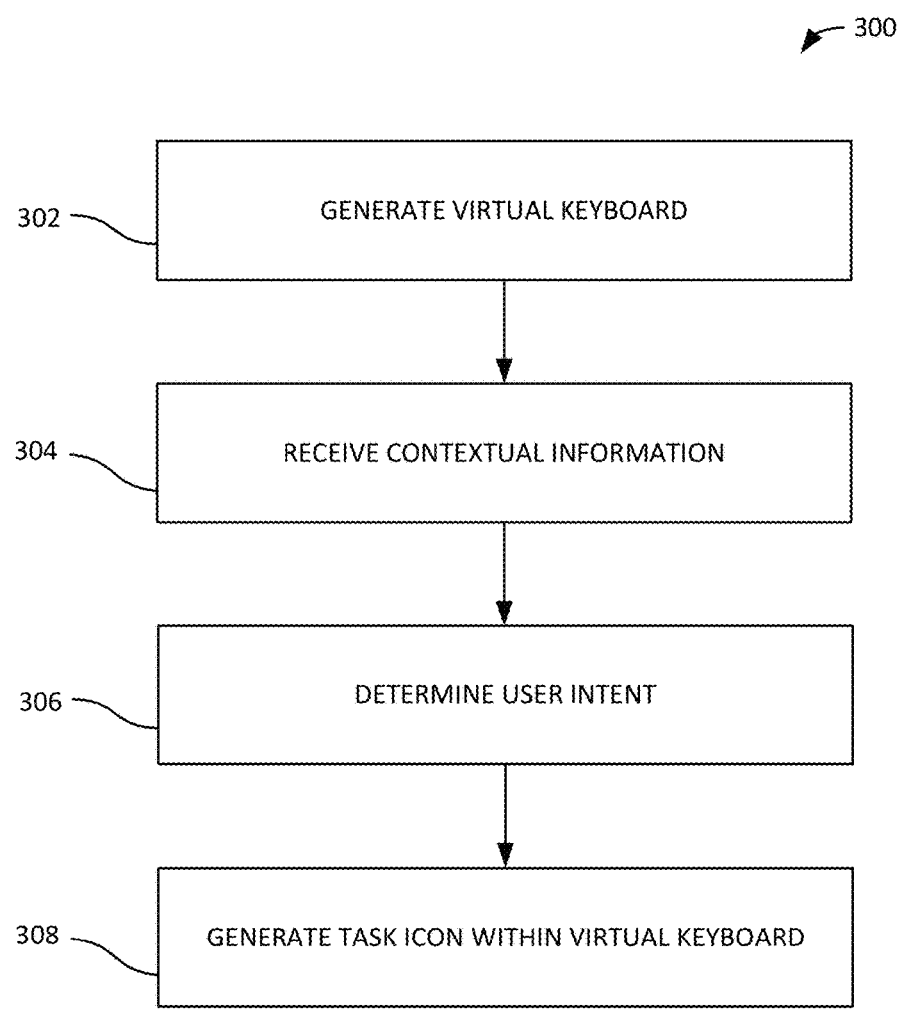
FIG. 3 is a diagram illustrating an example method of reconfiguring a user interface in which an intent-based task icon is dynamically generated and presented in a virtual keyboard.

FIG. 3 illustrates an example method 300 of reconfiguring a user interface. In process block 302, a virtual keyboard is generated. In process block 304, contextual information is received. Contextual information can include, for example, text entered via the virtual keyboard, text received from a remote computing device, commands received through voice recognition, or information relating to an application that is active while the virtual keyboard is displayed. A user intent is determined in process block 306. User intent can be determined, for example, using an intent classifier and ranker. In process block 308, a task icon is generated within the virtual keyboard. The task icon can be presented in the IME of the keyboard, for example. Method 300 can be performed, for example, using system 100 of FIG. 1 or system 200 of FIG. 2.

FIGS. 4A-4D illustrate determination of user intent and presentation of a calendar task icon. In user interface 400 of FIG. 4A, a messaging application is active and a conversation 402 is displayed. User interface 400 also includes a virtual keyboard 404 having an IME portion 406. Based on contextual information obtained from conversation 402 (e.g., the question "Want to go for dinner this week?" and the response "I'm free at"), a user intent to identify an available time to meet for dinner is determined. Contextual information can also include, for example, whether or not "Ellen" is a frequent contact (and is therefore someone with whom it is more likely the user would meet up for dinner), the user's statement "Happy Birthday" and accompanying birthday cake emoji, whether an email indicated Ellen would be in the same location as the user, etc. After this intent is determined, a task icon 408 is generated and presented in IME portion 406 of virtual keyboard 404. A text entry box 409 is also shown in user interface 400. Text entry box 409 is part of the messaging application and is not a part of virtual keyboard 404.

Figure 4D:
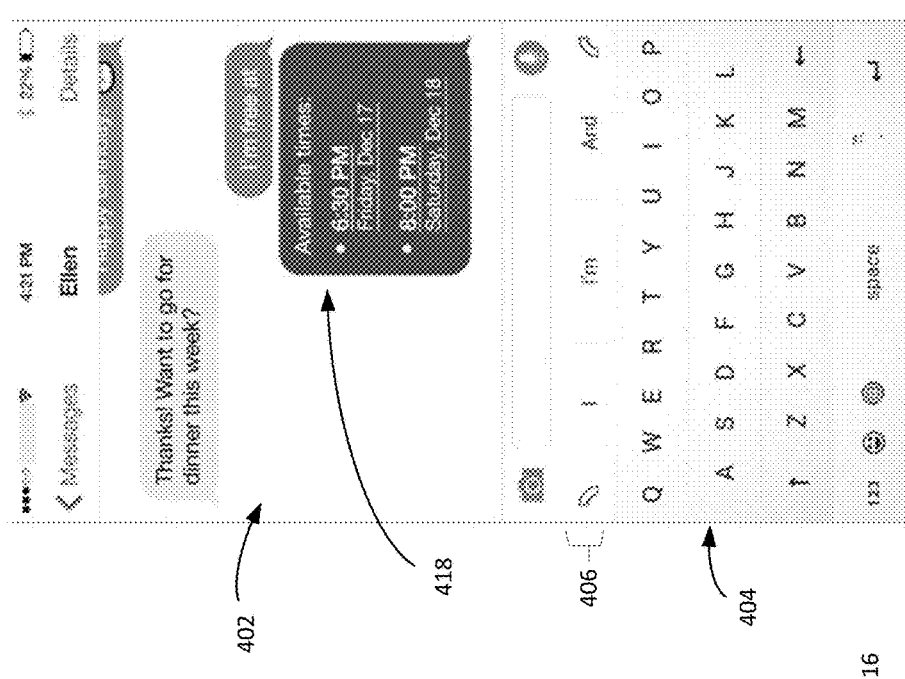

As shown in FIG. 4B, interaction with task icon 408 (such as a selection, swipe to the left or right, etc.) causes a task icon user interface 410 to be presented in place of a portion of user interface 400. In FIG. 4B, task icon user interface 410 is presented in place of a portion of virtual keyboard 404. Specifically, the portion of virtual keyboard 404 below IME portion 406 has been replaced by task icon user interface 410, but IME portion 406 remains displayed. The portion of user interface 400 in which conversation 402 is displayed remains unchanged. The functionality associated with the determined intent is accessible via task icon user interface 410. Task icon user interface 410 includes an application user interface of a calendar application in which blocks of time for different days are shown. The appearance of task icon 408 (a month view of a calendar) reflects the determined user intent and the functionality that can be launched in task icon user interface 410 by interacting with task icon 408. Task icon 408 can be accentuated (e.g., underlined and bolded as shown in FIGS. 4A and 4B, distorted, or otherwise emphasized) to indicate that interaction with task icon 408 launches functionality. A keyboard icon 412 is presented in IME portion 406 to allow the user to replace task icon user interface 410 with the character keys of virtual keyboard 404. In task icon user interface 410, blocks of time are selectable and can be added to conversation 402 as shown in FIGS. 4C and 4D.

Figure 4C:
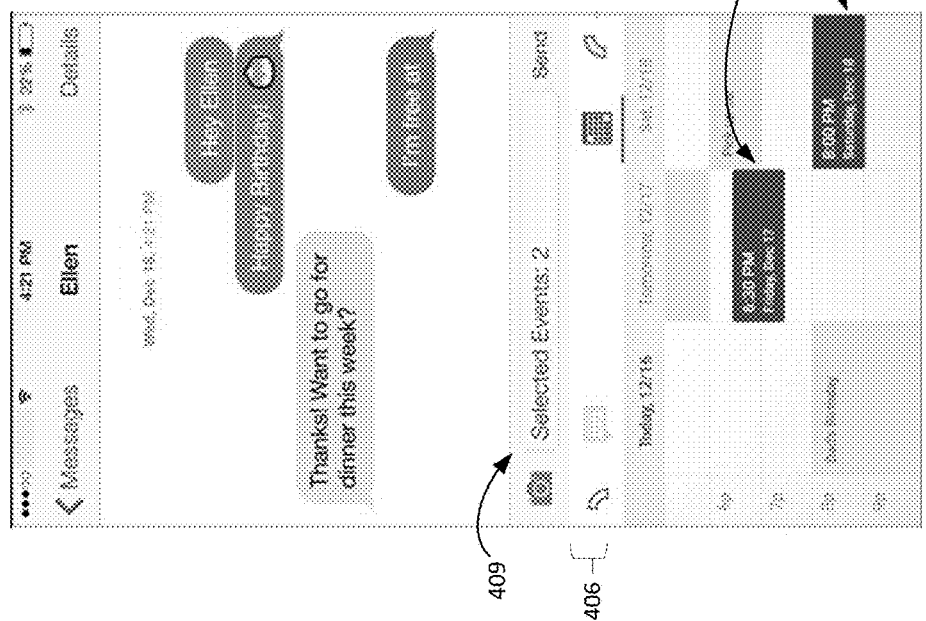

In FIG. 4C, two possible times, time block 414 and time block 416, have been selected. Text entry box 409 indicates "Selected Events:2." Time block 414 and 416 are shareable content that can be selected and added to conversation 402. By taking another action (such as pressing "Send," dragging and dropping, etc.) an "Available times:" conversation entry 418 including the times of time block 414 and time block 416 is added to conversation 402 as shown in FIG. 4D. After conversation entry 418 has been added, task icon 408 is no longer displayed in IME portion 406. As FIGS. 4A-4D illustrate, dynamic determination of user intent and generation and presentation of a task icon corresponding to the user intent allow the user to perform actions and access other applications without interrupting the flow of a conversation.

Figure 5:
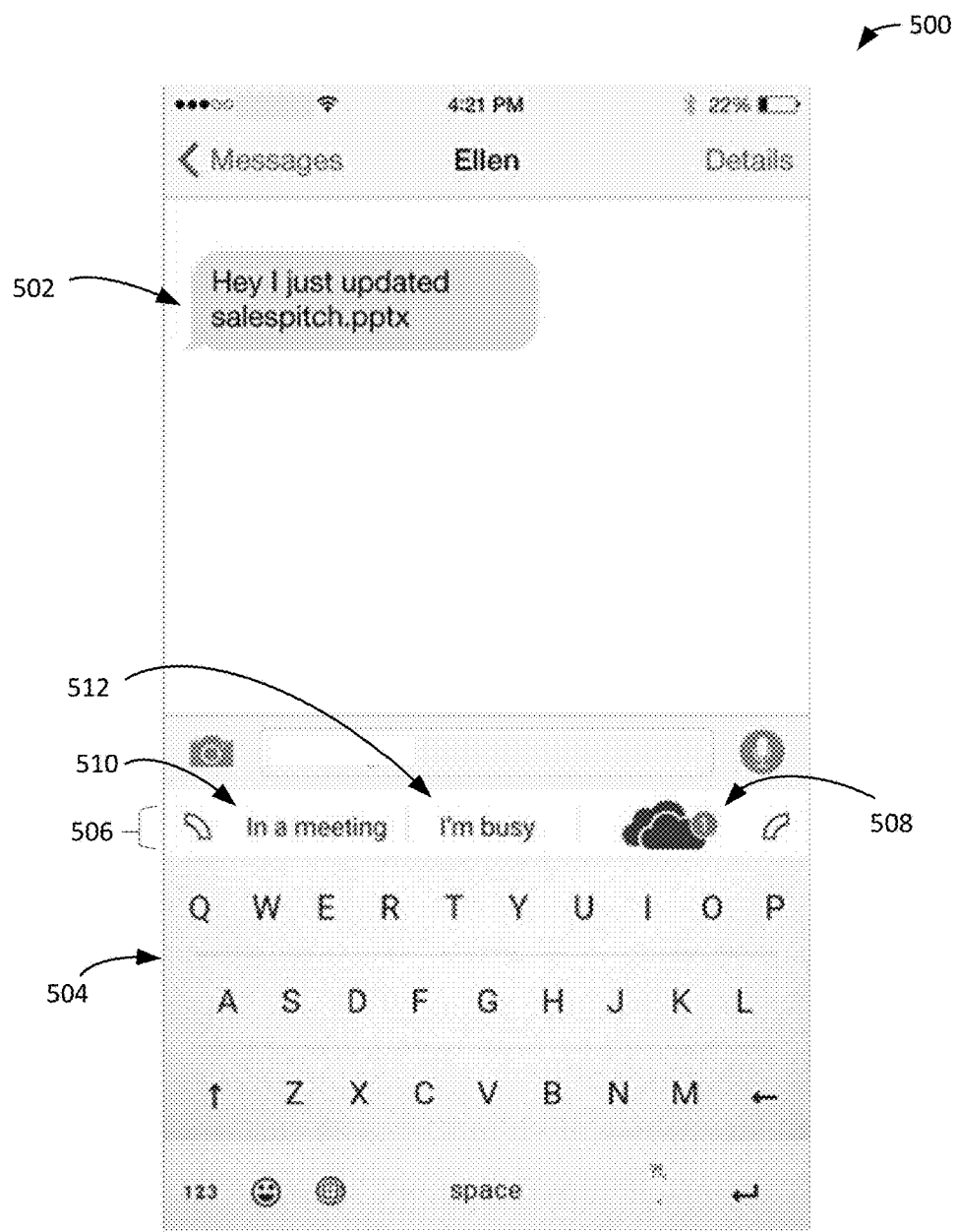
FIG. 5 illustrates determination of intent and presentation of a web services task icon in a virtual keyboard.

FIG. 5 illustrates a user interface 500 that includes a conversation 502 being conducted in a messaging application. A virtual keyboard 504 includes an IME portion 506. A user intent to open a file from a web service is determined based on the statement "Hey I just updated salespitch.pptx" in conversation 502. A web service task icon 508 is presented in IME portion 506, along with autosuggestions 510 ("In a meeting") and 512 ("I'm busy"). In FIG. 5, autosuggestion 510 is in IME position one, autosuggestion 512 is in IME position two, and task icon 508 is in IME position three. Interaction with task icon 508 launches functionality associated with the web service (not shown), such as a link or deep link to the "salespitch.pptx" file, to a shared work area or file folder, a web service user interface, etc.

FIG. 6A illustrates a user interface 600 that includes a conversation 602 being conducted in a messaging application. A virtual keyboard 604 includes an IME portion 606. A user intent to share a current location (and/or to provide an estimated time of arrival, etc.) is determined based on the statements "Hey where are you, just got a table . . . " and/or "I'm at" in conversation 602. A mapping task icon 608 is then presented in IME portion 606 to reflect the determined intent. Interaction with mapping task icon 608 causes mapping task icon user interface 610 to be presented in place of a portion of virtual keyboard 604, as shown in FIG. 6B.

Mapping task icon user interface 610 includes a map of the user's current location and destination as well as shareable content items 612, 614, and 616 that indicate the user's estimated time of arrival by car, bus, or walking, respectively. In FIG. 6C, shareable content item 614 has been selected (as indicated by the bolding of shareable content item 614), and the bus route taken between the current location of the user and the destination is shown in mapping task icon user interface 610. In FIG. 6D, conversation entry 618 has been added to conversation 602. Conversation entry 618 reflects shareable content item 614.

Figure 7B:
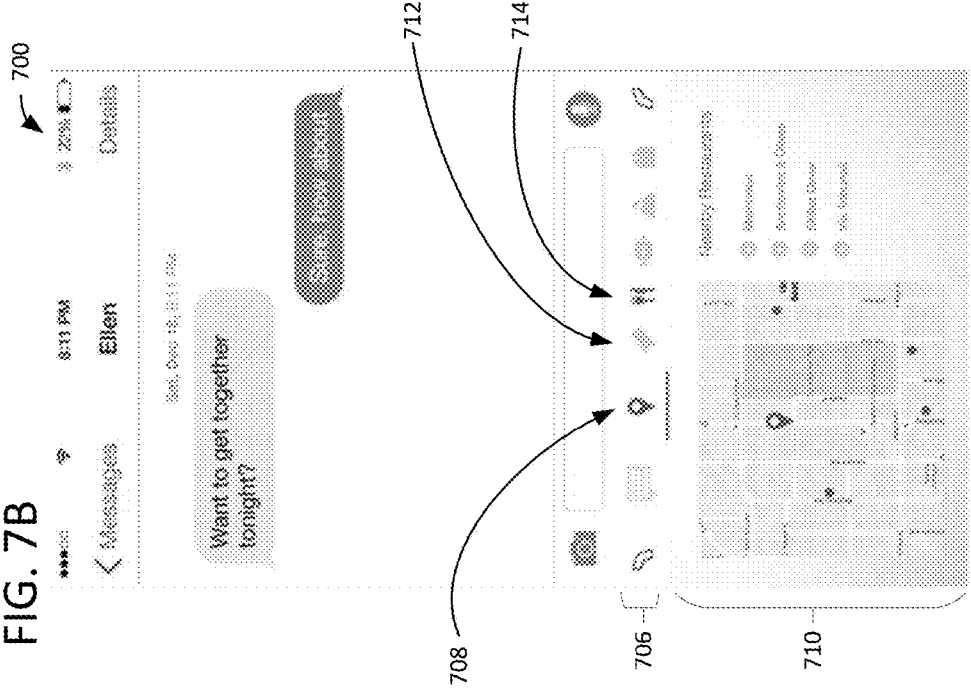
FIGS. 7A-7D illustrate determination of intent, presentation of a mapping task icon, and selection of shareable content (a link to a restaurant) from a task icon user interface.
Figure 7A:
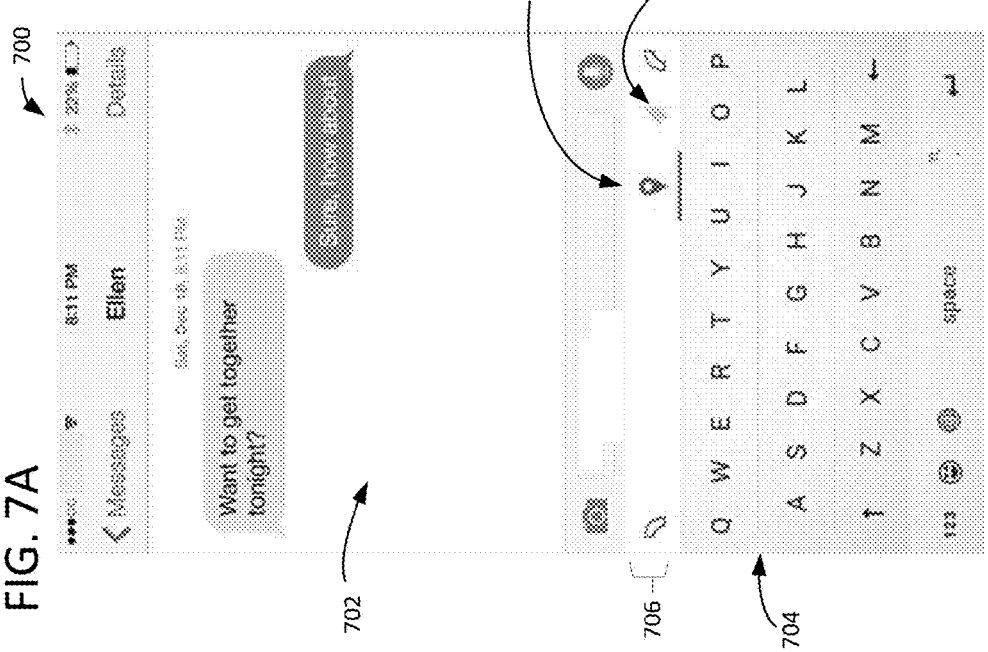

FIG. 7A illustrates a user interface 700 that includes a conversation 702 being conducted in a messaging application. A virtual keyboard 704 includes an IME portion 706. A user intent to meet at a location (e.g., for dinner at a restaurant) is determined based on the statements "Want to get together tonight?" and/or "Sure, how about" in conversation 702. A mapping task icon 708 is presented in IME portion 706. Interaction with mapping task icon 708 causes mapping task icon user interface 710 to be presented in place of a portion of virtual keyboard 704, as shown in FIG. 7B.

Mapping task icon user interface 710 displays the user's current location and lists nearby restaurants.

As shown in FIGS. 7A and 7B, IME portion 706 also includes additional task icons generated based on contextual information, such as movie task icon 712, which is partially obscured in FIG. 7A but is visible in FIG. 7B. In some cases, multiple user intents are possible. Based on the statements in conversation 702, a user might be interested in meeting for dinner, meeting for coffee, meeting for a movie, meeting to return an item, etc. As a result, multiple task icons can be generated and presented within virtual keyboard 704. The multiple task icons can be presented in an order of likelihood determined, for example, based on confidence level, user history, etc. As shown in FIG. 7B, mapping task icon 708, movie task icon 712, restaurant task icon 714 and other task icons are presented in IME portion 706.

In some examples, a first task icon can be associated with other task icons representing a subset of functionality of the first task icon. For example, mapping task icon 708 can launch a variety of different mapping functionality (e.g., estimated time of arrival, location of restaurants, location of stores, etc.). Accordingly, as illustrated in FIG. 7B, mapping task icon 708 has been selected, and mapping task icon user interface 710 is associated with the restaurant aspect of mapping represented by restaurant task icon 714. In user interface 700, a user can swipe or select other task icons to change the task icon user interface that is displayed below IME portion 706.

Figure 7C:
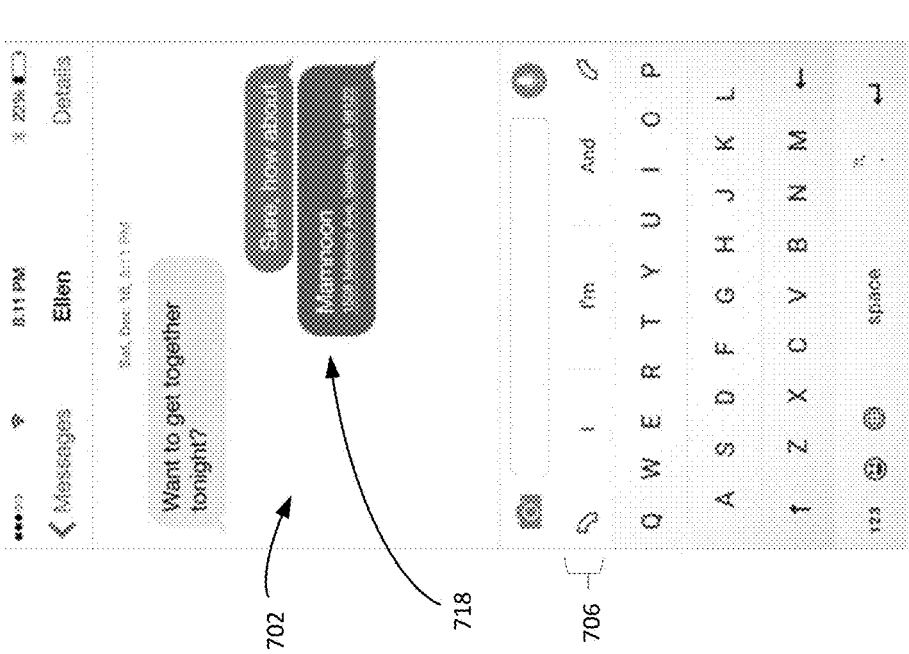
Figure 7D:
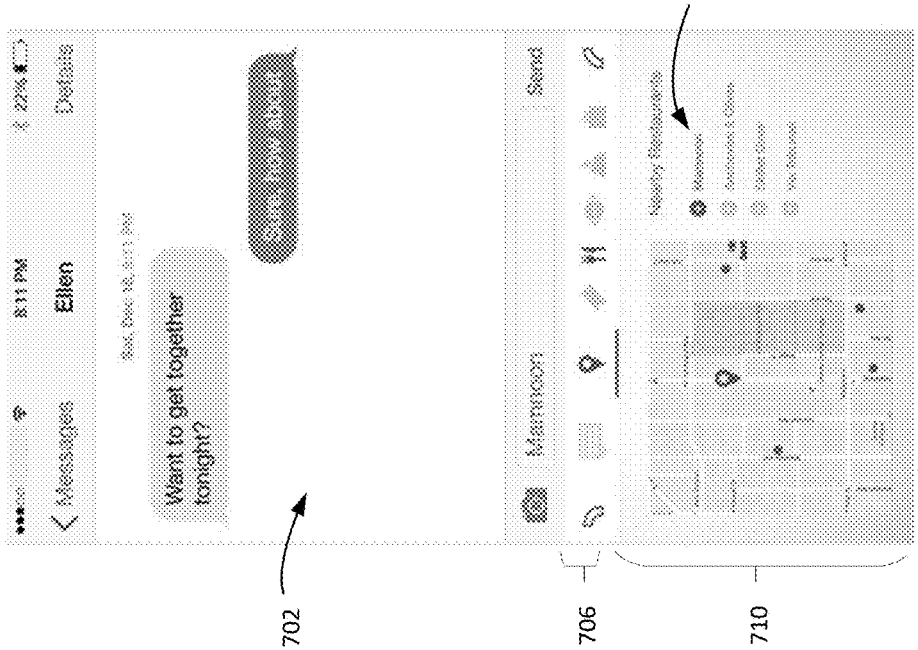

In FIG. 7C, a shareable content item 716 (the restaurant "Mamnoon") has been selected (as indicated by the bolding of shareable content item 716). In FIG. 7D, a conversation entry 718 has been added to conversation 702. Conversation entry 702 reflects shareable content item 718 and lists the name and address of the restaurant. The task icons, including task icons 708 and 712, have been removed from IME portion 706 after conversation entry 702 was added.

Figure 8B:
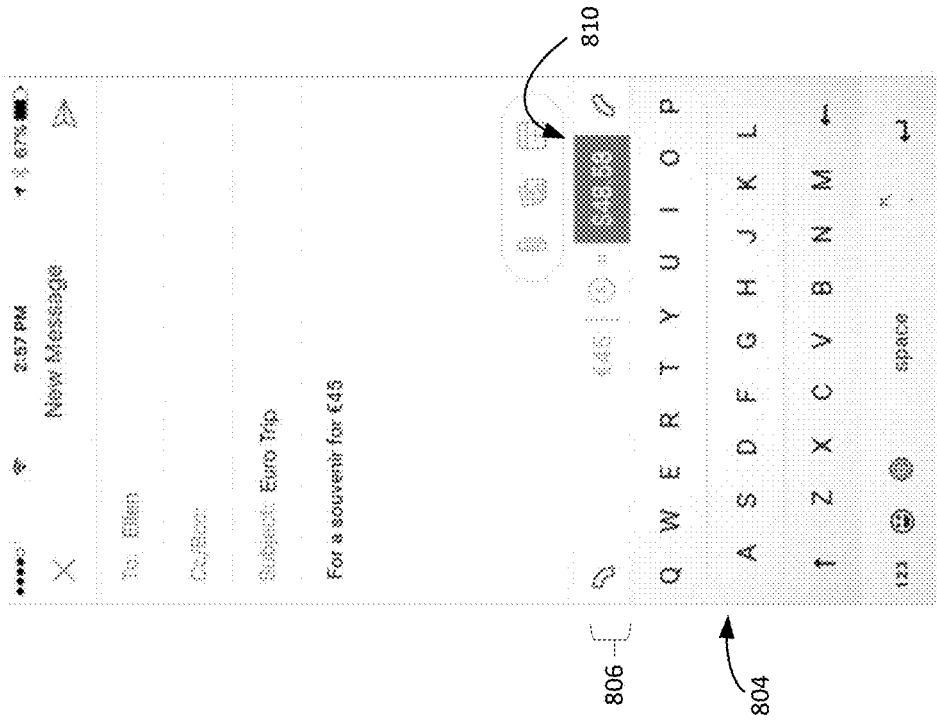
FIGS. 8A-8B illustrate determination of intent and presentation of instant answers in the virtual keyboard.
Figure 8A:
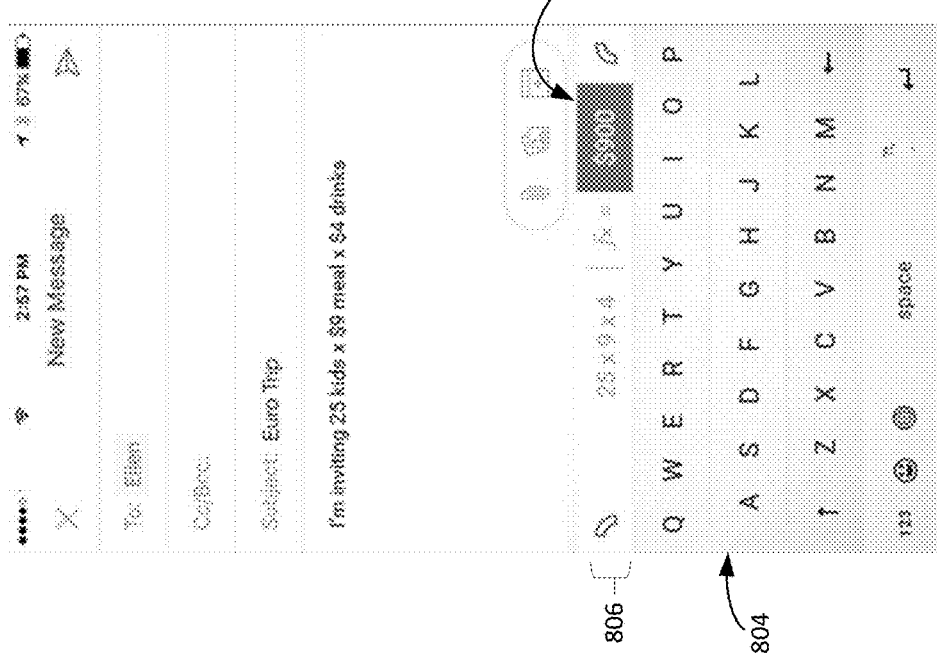

FIGS. 8A and 8B relate to intent-based instant answers. In user interface 800 of FIG. 8A, a new message is being composed (e.g., in an email or messaging application) that includes the text "I'm inviting 25 kids×$9 meal×$4 drinks." Some or all of this text can be used to determine a user intent of calculating a total cost. An instant answer result 802 indicating the total cost is displayed within IME portion 804 of virtual keyboard 806. Similarly, in user interface 808 of FIG. 8B, a new message is being composed that includes the text "For a souvenir for €45." Some or all of this text can be used to determine a user intent of calculating a U.S. dollar equivalent price. An instant answer result 810 indicating the U.S. dollar price is displayed within IME portion 804 of virtual keyboard 806.

Figure 9B:
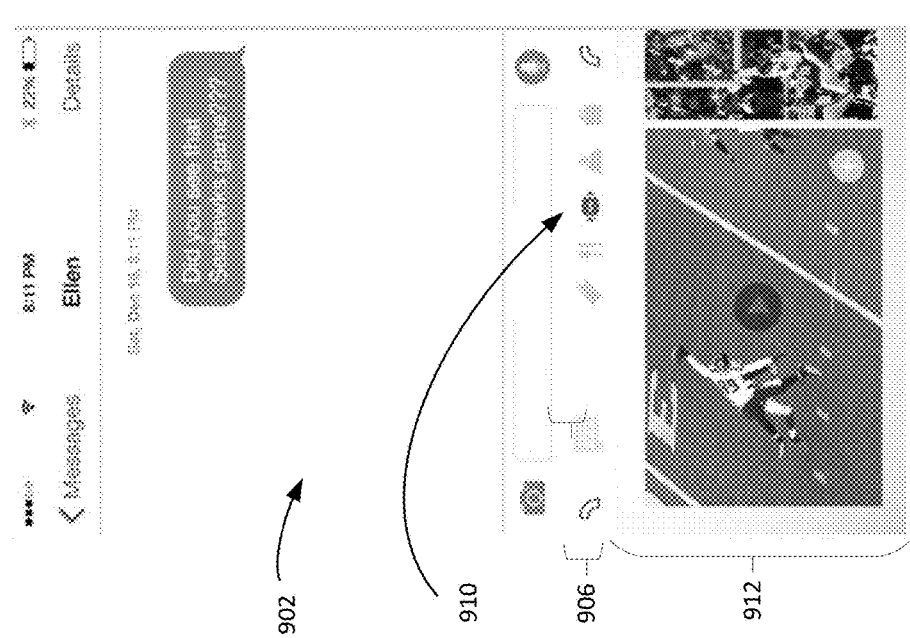
FIGS. 9A-9B illustrate determination of intent and presentation of a media task icon in the virtual keyboard.
Figure 9A:
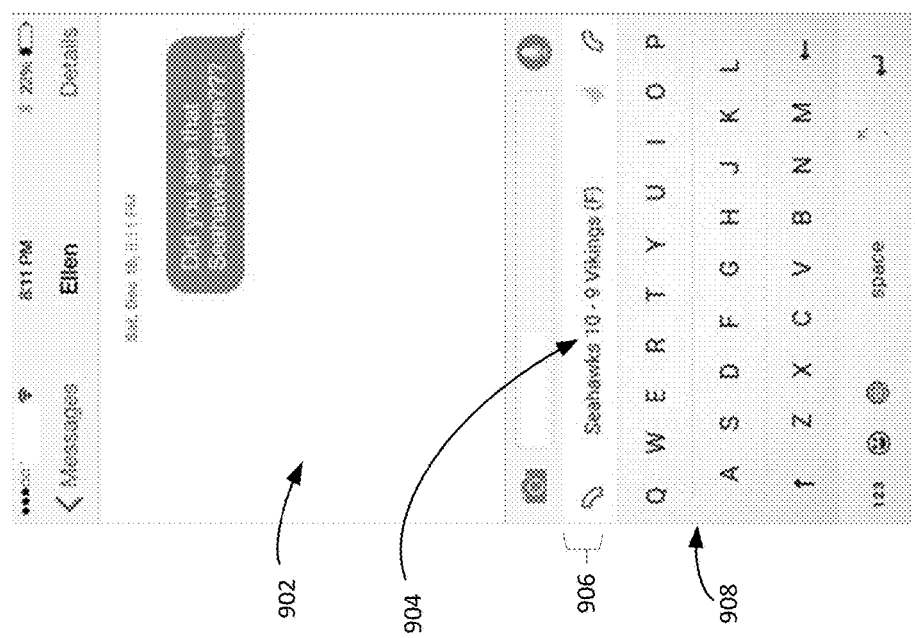

FIGS. 9A and 9B illustrate a user interface 900 in which a conversation 902 is displayed. Based on contextual information (e.g., the conversation entry "Did you see that Seahawks game???") a user intent to view or share a video of a Seattle Seahawks football game is determined. An instant answer result 904 of a recent game score is provided in IME portion 906 of virtual keyboard 908. One or more task icons can also be generated and displayed in virtual keyboard 908, as is illustrated in FIG. 9B. Additional task icons can be revealed, for example, by swiping instant answer result 904. FIG. 9B shows multiple task icons including football media task icon 910, which when interacted with causes a replacement of a portion of virtual keyboard 908 with football media task user interface 912, which displays shareable and/or viewable football game video clips and/or images. A user, for example, can select or drag and drop a thumbnail image of a video clip into conversation 902.

FIGS. 10A and 10B illustrate a user interface 1000 in which a conversation 1002 is displayed. Based on contextual information (e.g., the conversation entries "We could also see a movie after dinner" and/or "Yes! Let's get tix for Star Wars") a user intent to go see the movie "Star Wars" is determined. A movie task icon 1004 is presented in IME portion 1006 of virtual keyboard 1008. Interaction with movie task icon 1004 causes movie task icon user interface 1010 to be presented in place of a portion of virtual keyboard 1008, as shown in FIG. 10B. Movie task icon user interface 1010 displays show times for "Star Wars" at theaters near the user's current locations. Movie task icon user interface 1010 can be a movie ticket purchase/reservation service application user interface and/or can contain links to a movie service or deep links to purchase tickets for a particular show. In FIG. 10B, the theater "iPic Redmond (2D)" is selected and appears as a text entry in text entry box 1012. This text entry can then be added to conversation 1002.

Figure 11:
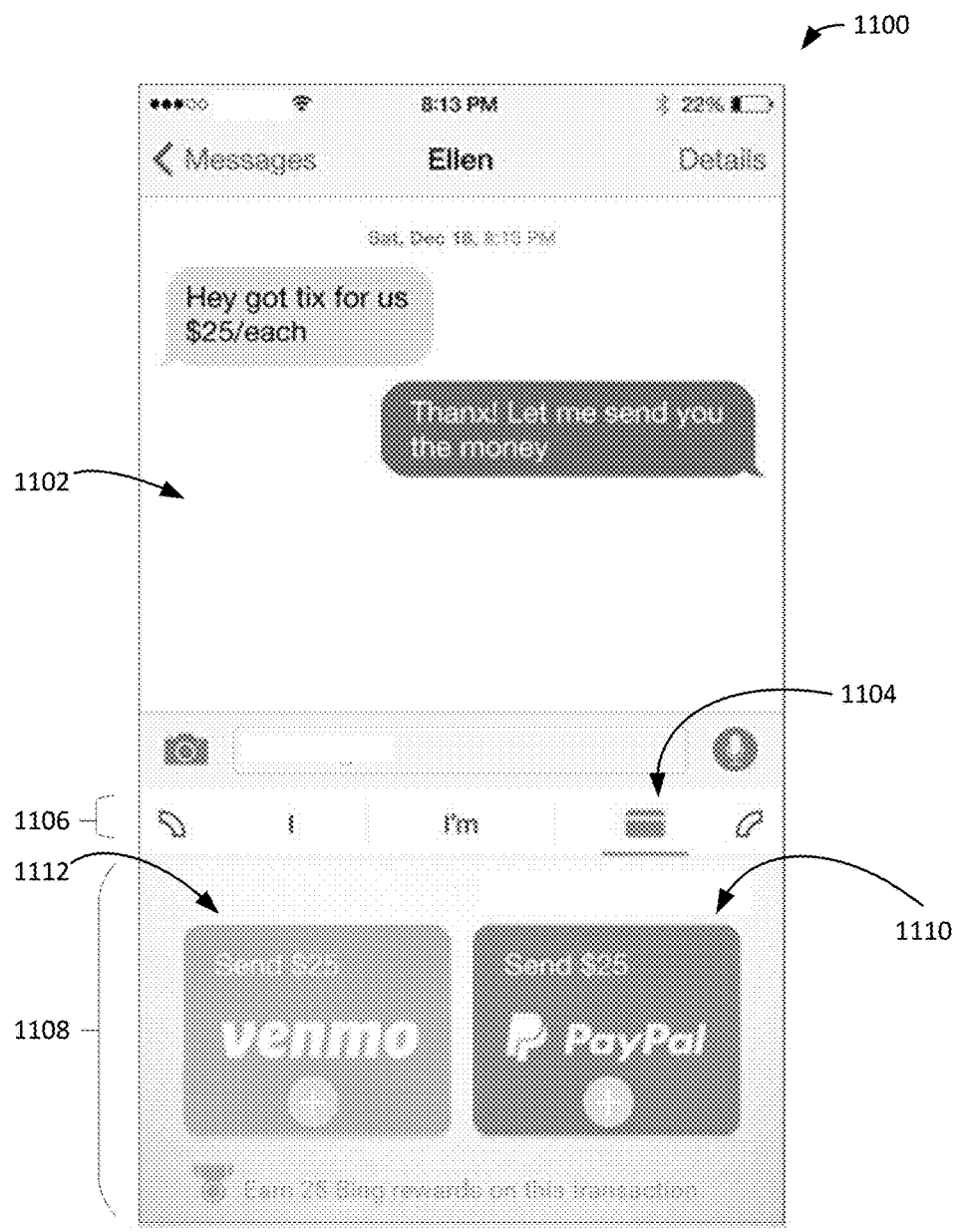
FIG. 11 illustrates determination of intent, presentation of a payment task icon in the virtual keyboard, and display of a payment task user interface.

FIG. 11 illustrates a user interface 1100 in which a conversation 1102 is displayed. Based on contextual information (e.g., the conversation entries "Hey got tix for us $25/each" and/or "Thanx! Let me send you the money") a user intent to transfer funds is determined. A funds transfer is considered a transaction service; a transactional service application can be a funds transfer application or other transaction-based application. A funds transfer task icon 1104 is presented in IME portion 1106 of a virtual keyboard (only IME portion 1106 is shown in FIG. 11). FIG. 11 also shows a funds transfer task icon user interface 1108 that replaced a portion of the virtual keyboard after interaction with funds transfer task icon 1104. Funds transfer task icon user interface contains deep links 1110 and 1112 that can be selected to transfer funds using different funds transfer services. An indication that funds were sent can then be added to conversation 1102.

Figure 12A:
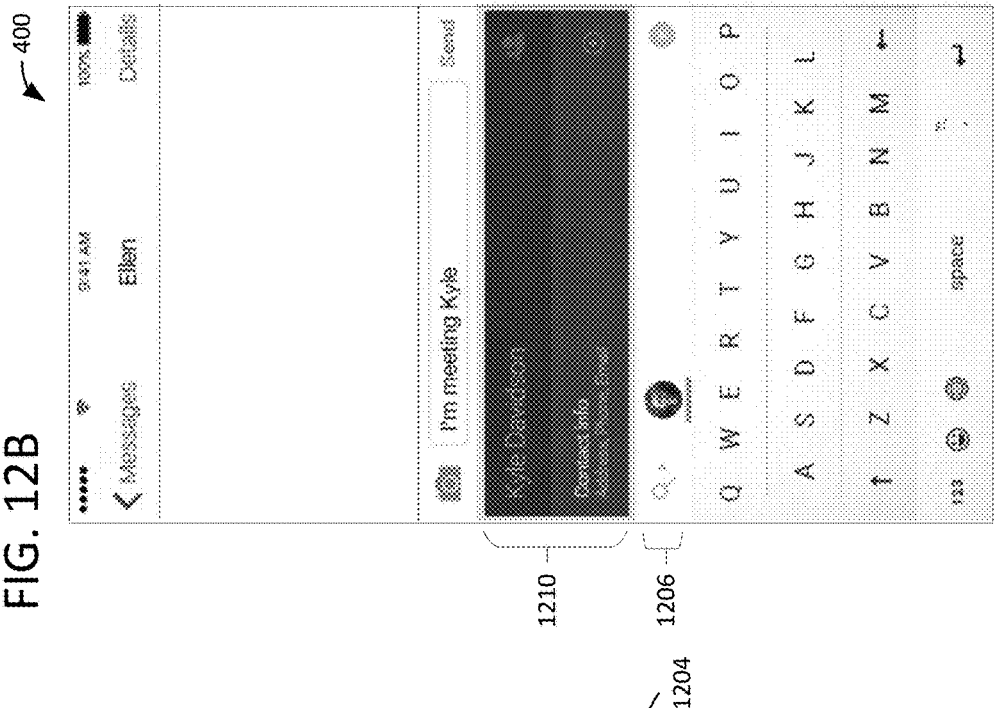
Figure 12B:
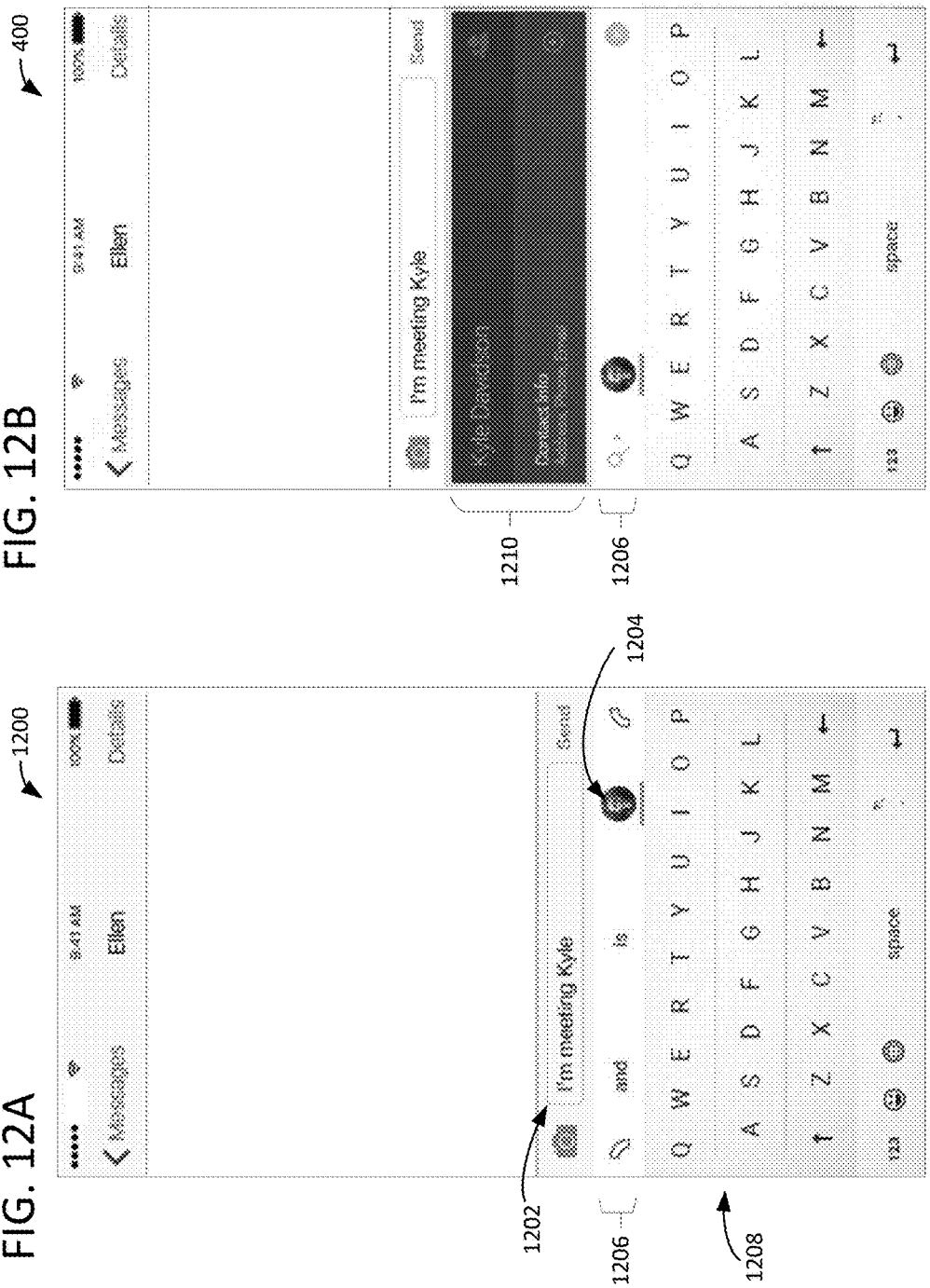

FIGS. 12A-12H illustrate examples in which a task icon user interface replaces a portion of the overall user interface (above the virtual keyboard) rather than replacing a portion of the virtual keyboard. FIG. 12A illustrates a user interface 1200 in which "I'm meeting Kyle" has been entered into a text entry box 1202 of a messaging application. Based on contextual information (e.g., the text entry "I'm meeting Kyle") a user intent to access contact information for Kyle is determined. A contacts task icon 1204 is presented in IME portion 1206 of virtual keyboard 1208. Interaction with task icon 1204 causes a portion of user interface 1200 (the portion immediately above IME portion 1206) to be replaced with a contacts task icon user interface 1210, as shown in FIG. 12B. Contacts task icon user interface 1210 comprises functionality of a contacts or organizer application and displays contact information for Kyle.

Figure 12D:
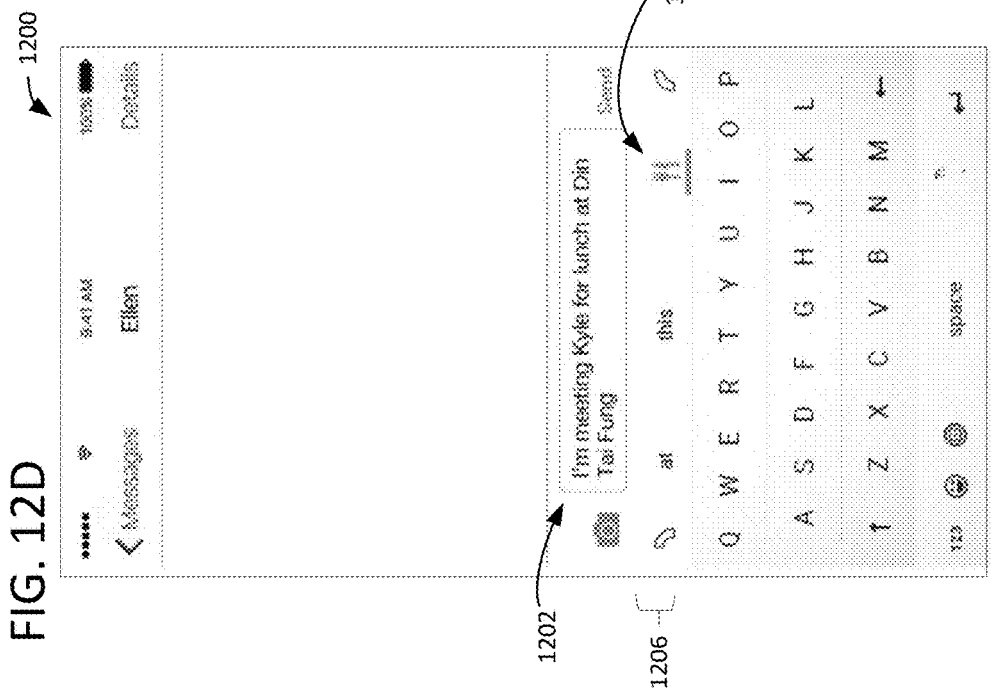
Figure 12C:
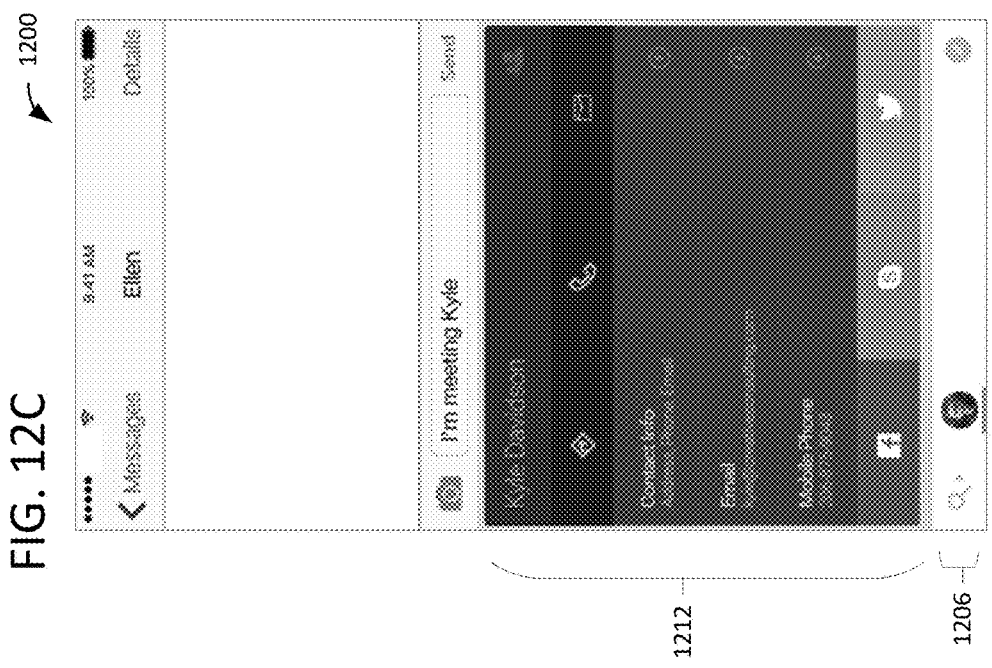

FIG. 12C illustrates an expanded contacts task icon user interface 1212 that is presented upon interaction with contacts task icon user interface 1210 in FIG. 12C. Expanded contacts task icon user interface 1212 is presented in place of a portion of virtual keyboard 1208 (i.e., in place of the character keys). IME portion 1206 is moved to the bottom of user interface 1200. In FIG. 12C, the portion of user interface 1200 available for displaying messages remains the same as in FIG. 12B before presentation of expanded contacts task icon user interface 1212.

In FIG. 12D, the user has exited expanded contacts task icon user interface 1212 and continued typing in text entry box 1204, which now reads "I'm meeting Kyle for lunch at Din Tai Fung." An updated user intent of determining/sharing the location of a restaurant is determined based on updated contextual information (the additional text "for lunch at Din Tai Fung"). A restaurant task icon 1214 is displayed in IME portion 1206 to reflect the updated user intent, and contacts task icon 1204 is removed from IME portion 1206. In some examples, task icons that were presented but subsequently removed because of an updated user intent can be represented by an indicator (e.g., a numeral or other indicator in the IME or elsewhere in the virtual keyboard), and these task icons can be redisplayed upon user interaction with the indicator.

Figure 12E:
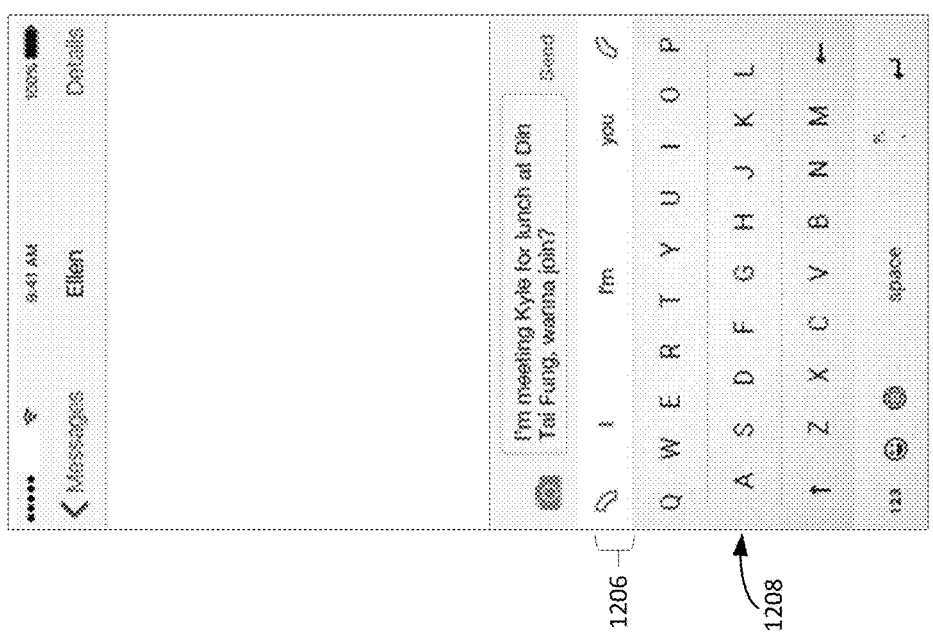
Figure 12F:
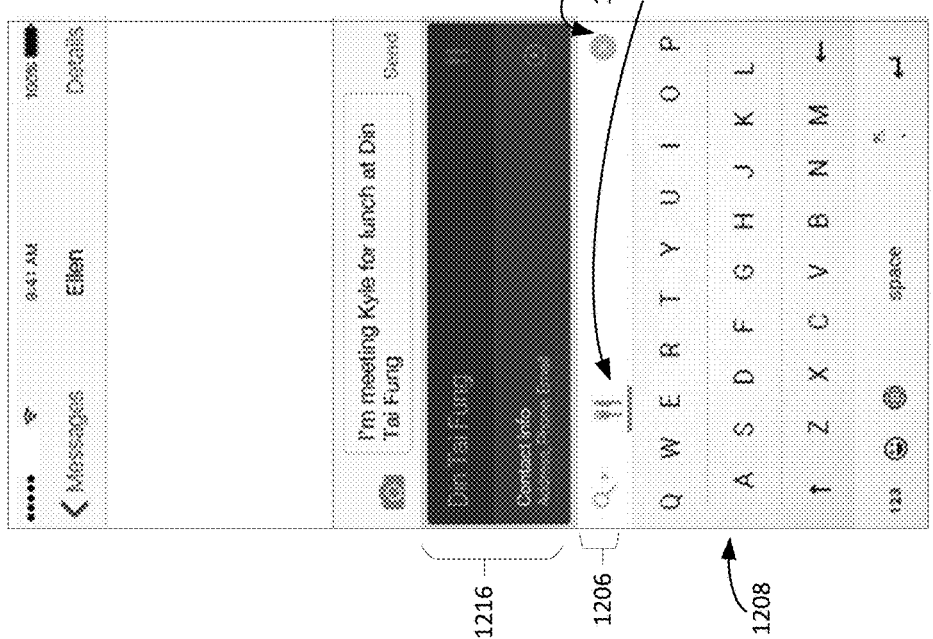

In FIG. 12E, a user interaction with restaurant task icon 1214 causes a portion of user interface 1200 to be replaced with a restaurant task icon user interface 1216 that provides contact information for the restaurant "Din Tai Fung." In FIG. 12F, user interface 1200 reflects that a user has selected exit button 1218 illustrated in FIG. 12E, and restaurant task icon user interface 1216 and restaurant task icon 1214 have disappeared.

In some examples, if a task icon is determined to still reflect a determined user intent after additional contextual information is received but an additional intent is also determined based on the additional contextual information, then an additional task icon can be presented with the original task icon. In FIGS. 12G and 12H, both contacts task icon 1204 and restaurant task icon 1214 are presented in IME portion 1206 based on updated contextual information (the additional text "for lunch at Din Tai Fung, wanna join?"). A user interaction with contacts task icon 1204 causes a contacts task icon user interface 1220 to replace a portion of user interface 1200. In FIG. 12G, multiple task icon user interfaces are present to correspond to the multiple task icons. A portion of a restaurant task icon user interface 1222 is visible next to contacts task icon user interface 1220. The different task icon user interfaces can be scrollable. For example, a user can swipe or scroll contacts task icon user interface 1220 to the left or right or swipe/select restaurant task icon 1214 to display restaurant task icon user interface 1222. FIG. 12H illustrates an example in which restaurant task icon user interface 1222 is selected and then, upon user interaction with restaurant task icon user interface 1222, a portion of virtual keyboard 1208 is replaced by extended restaurant task icon user interface 1224.

Figure 13B:
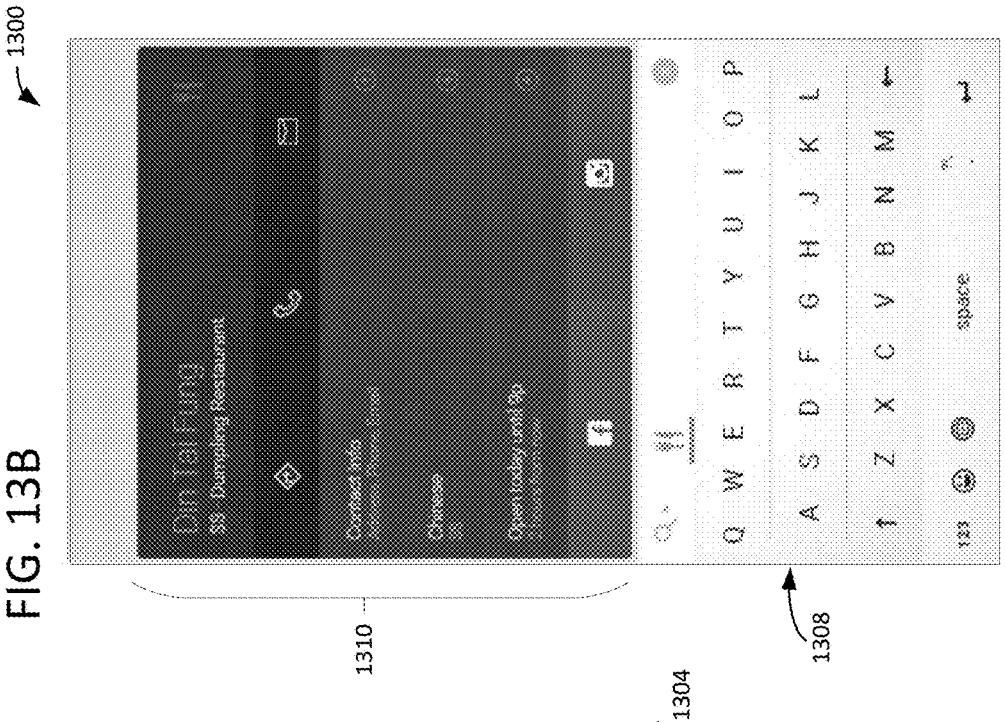
FIGS. 13A-13B illustrate various features related to determination of intent and presentation of a task icon in the virtual keyboard in which a task user interface is presented above the virtual keyboard while a messaging application is active and substantially replaces the messaging application user interface.
Figure 13A:
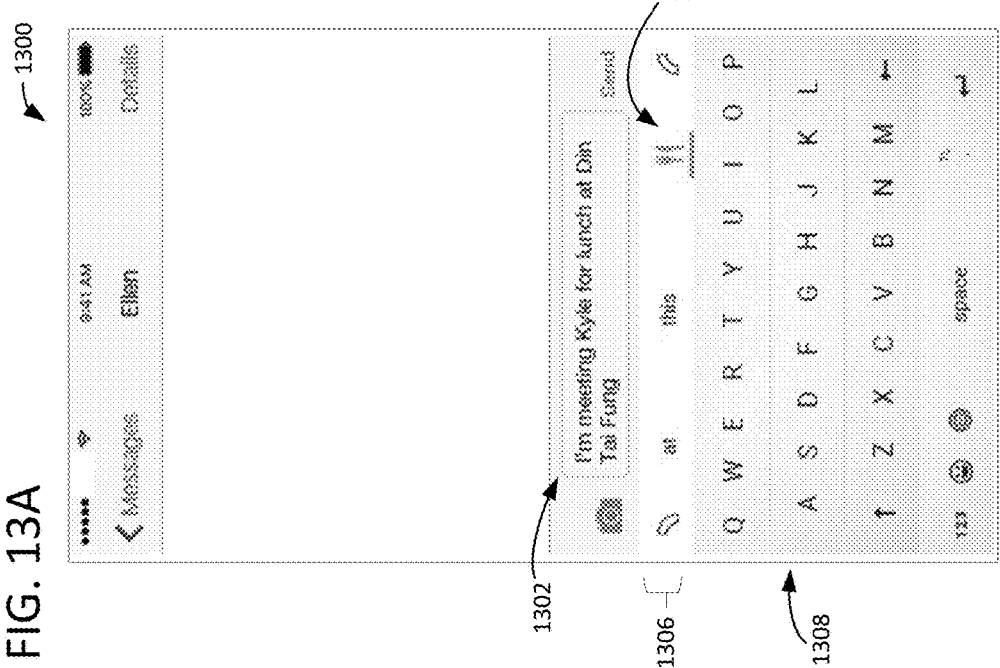

FIG. 13A illustrates a user interface 1300 in which "I'm meeting Kyle for lunch at Din Tai Fung" has been entered into a text entry box 1302 of a messaging application. Based on contextual information (e.g., the text entry "I'm meeting Kyle for lunch at Din Tai Fung") a user intent to access/share restaurant information is determined. A restaurant task icon 1304 is presented in IME portion 1306 of virtual keyboard 1308. Interaction with task icon 1304 causes a portion of user interface 1300 (the portion above IME portion 1206) to be replaced with a restaurant task icon user interface 1310, as shown in FIG. 13B. Virtual keyboard 1308 continues to be displayed when restaurant task icon user interface 1310 is presented.

Figure 14A:
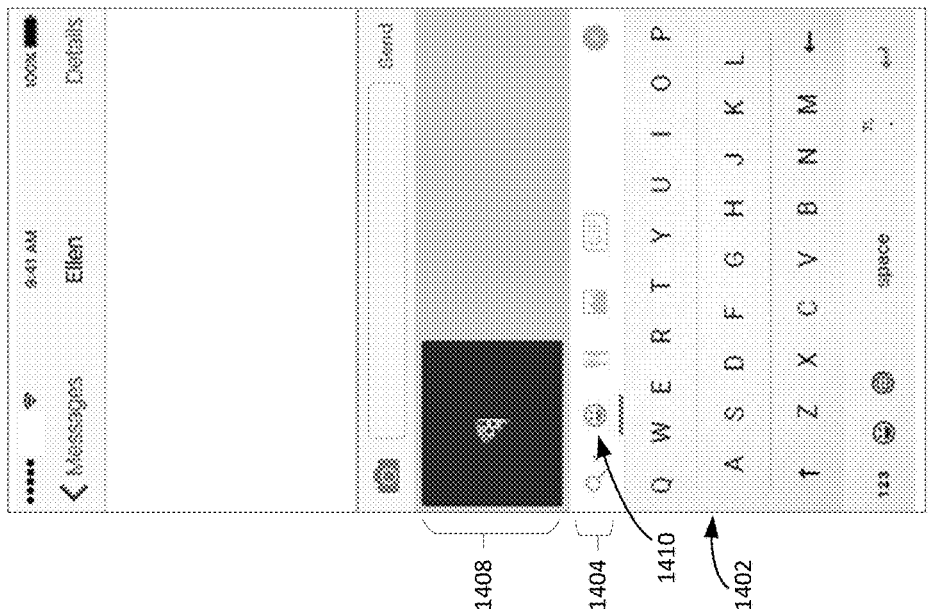
FIGS. 14A-14D illustrate various features related to a search tool within the virtual keyboard.

FIGS. 14A-16 illustrate various example user interfaces in which a search tool is presented within a virtual keyboard. In FIG. 14A, user interface 1400 contains a virtual keyboard 1402 having an IME portion 1404. A search tool, represented by a magnifying glass icon 1406 is presented in IME portion 1404. In some examples, the search tool is accessed (and magnifying glass icon 1406 is displayed) by swiping the IME or selecting another icon or character displayed within virtual keyboard 1402. In FIG. 14A, a user has entered "Pizza." A search result user interface 1408 is then displayed that shows results for various categories such as emoji, restaurants, etc.

Figure 14B:
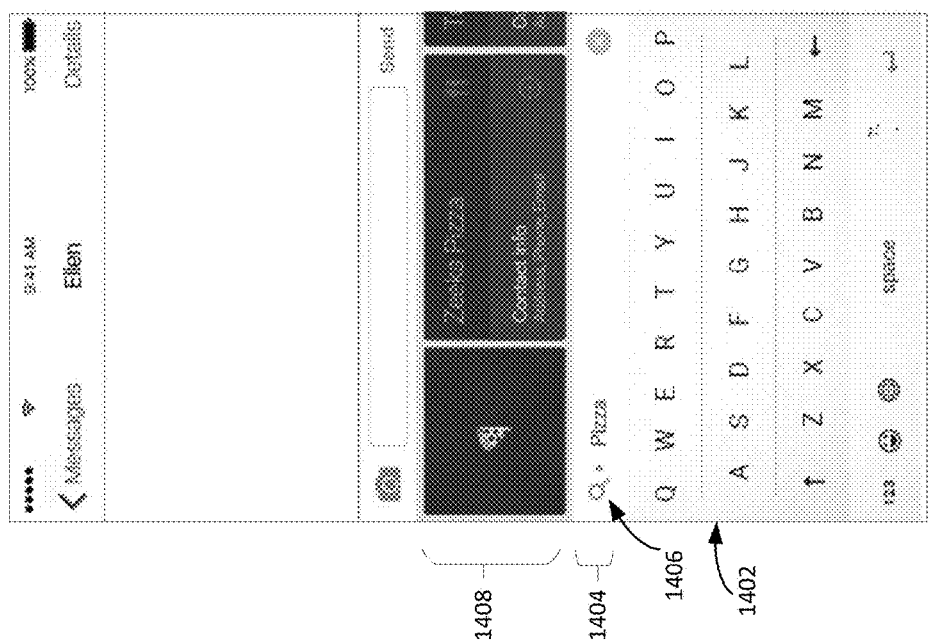
Figure 14D:
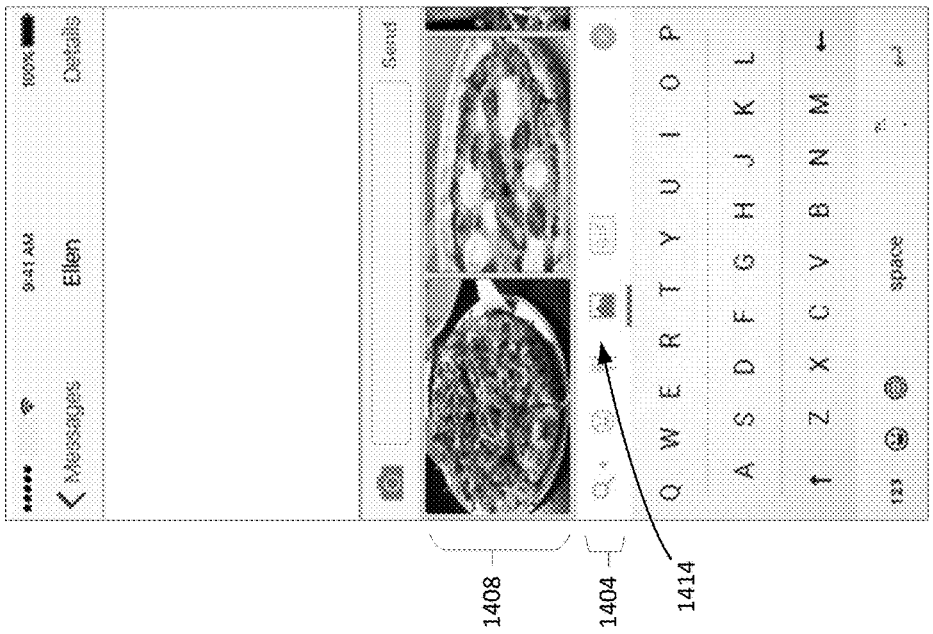
Figure 14C:
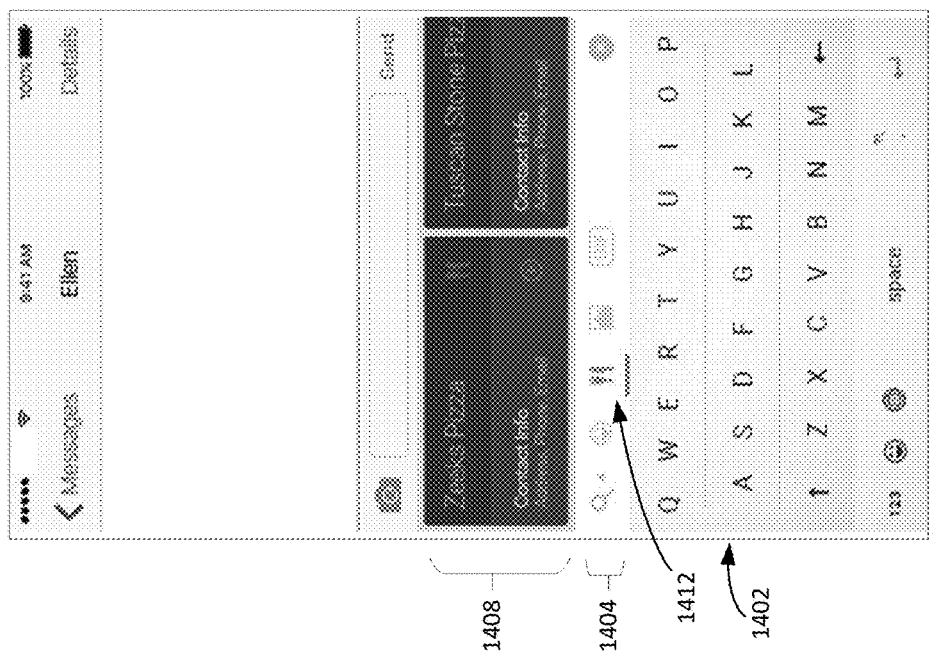

In FIG. 14B, different task icons are displayed in IME portion 1404 corresponding to the various categories. In FIG. 14B, an emoji icon 1410 is selected, and search results user interface 1408 displays only emoji results for "pizza." Emoji icon 1410 is not considered to be a task icon because the emoji is not associated with functionality. In FIG. 14C, a restaurant task icon 1412 is selected, and search results user interface 1408 displays only restaurant results. Similarly, in FIG. 14D, an image task icon 1414 is selected, and search results user interface 1408 displays only image results. As with emoji icon 1410, in some examples, image task icon 1414 is not considered to be a task icon unless functionality is associated with image task icon 1414. Search results user interface 1408 can provide access to functionality (e.g., via links, deep links, or application user interfaces) similar to a task icon user interface.

Figure 15A:
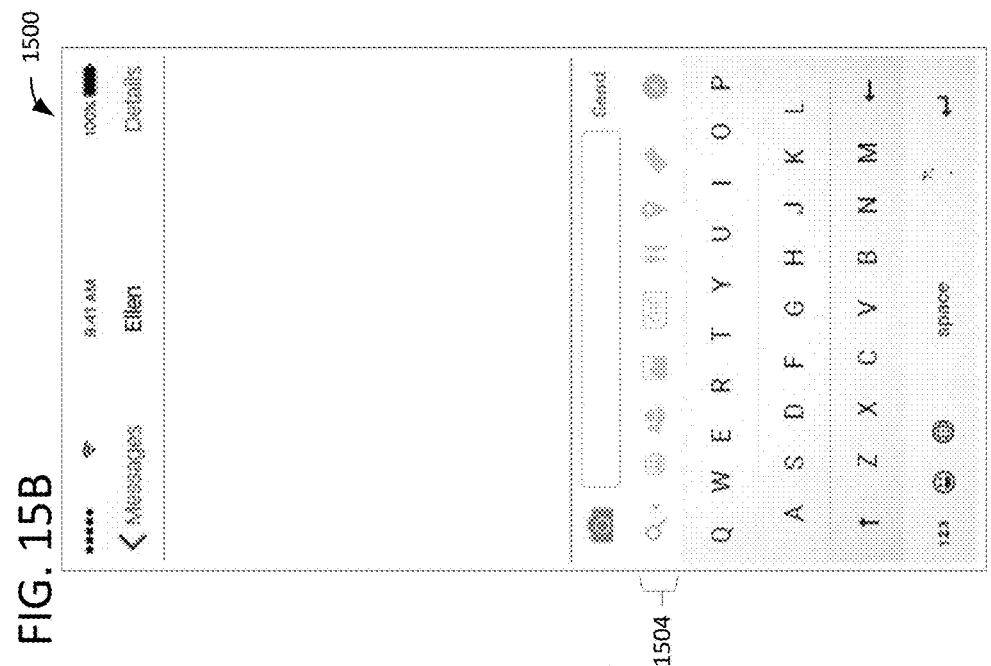
FIGS. 15A-15D illustrate various features related to a search tool within the virtual keyboard in search category choices are presented.
Figure 15B:
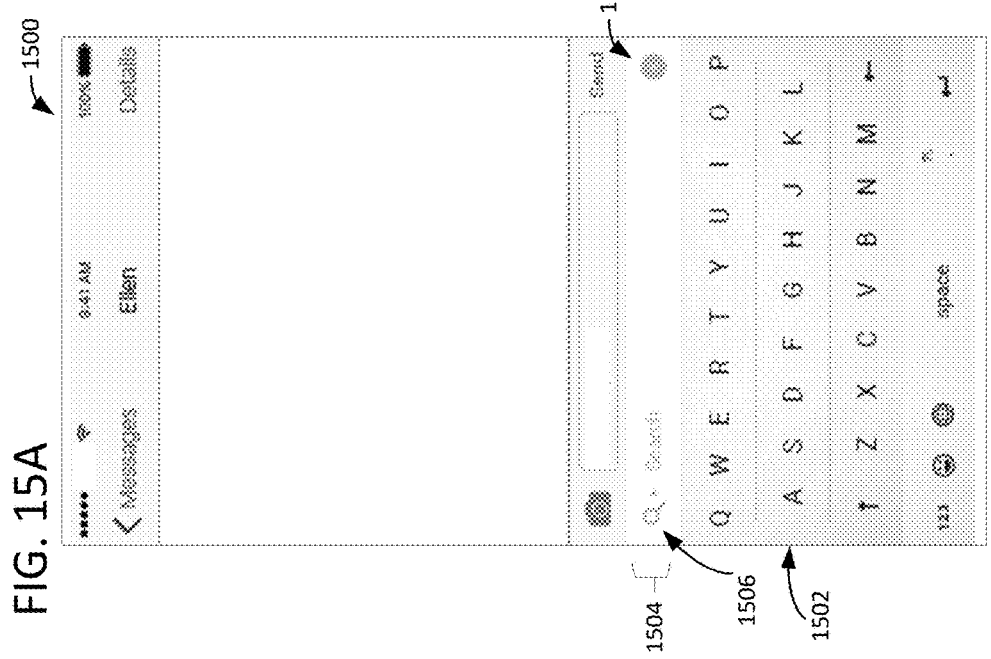

FIG. 15A illustrates an example user interface 1500 including a virtual keyboard 1502 having an IME portion 1504. FIG. 15A illustrates an example of the initial display of a search tool (as represented by magnifying glass icon 1506). The search tool can be presented, for example, after a user swipes or otherwise interacts with IME portion 1504. The search tool can be hidden by selecting exit button 1508. In some examples, the search tool provides an option to select search results that correspond to various categories. FIG. 15B illustrates a variety of task icons corresponding to the various categories presented within IME portion 1504. The category-based search can be an alternative to the arrangement displayed in FIG. 15A, or the arrangements in FIGS. 15A and 15B can be toggled or selected between.

Figure 15D:
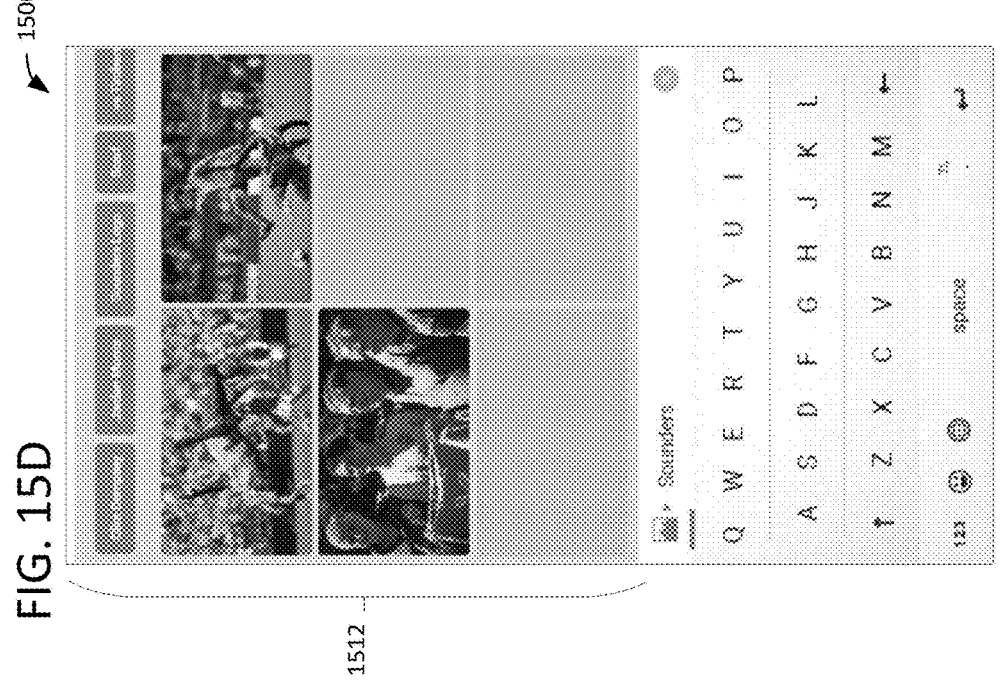
Figure 15C:
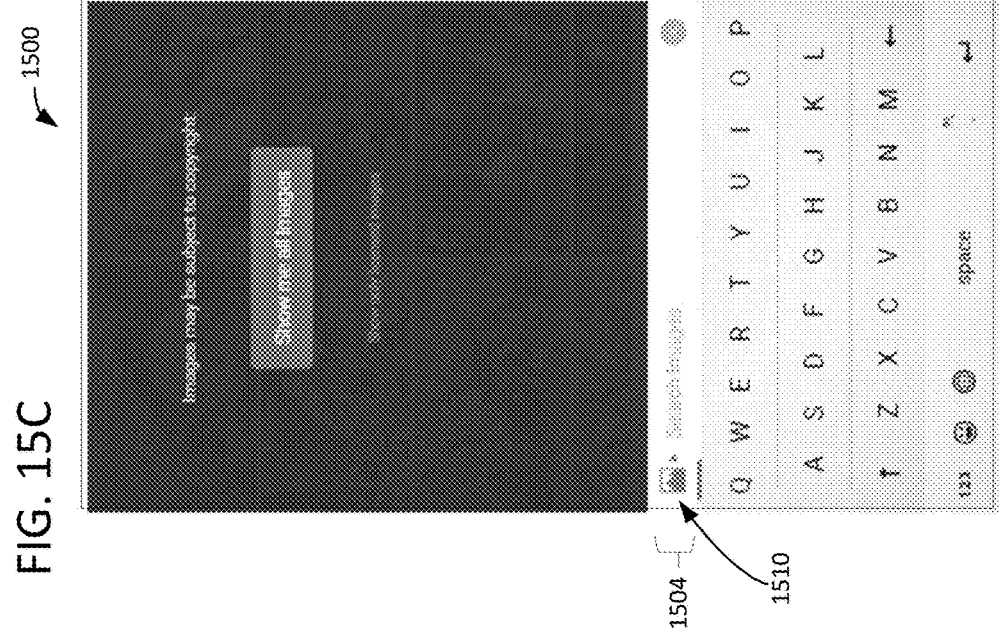

FIG. 15C illustrates a user selection of a particular search category. In FIG. 15C, an image search is selected, as indicated by image task icon 1510 shown in IME portion 1504. In FIG. 15D, "Sounders" is searched for, and a search results user interface 1512 is presented that includes image results.

Figure 16:
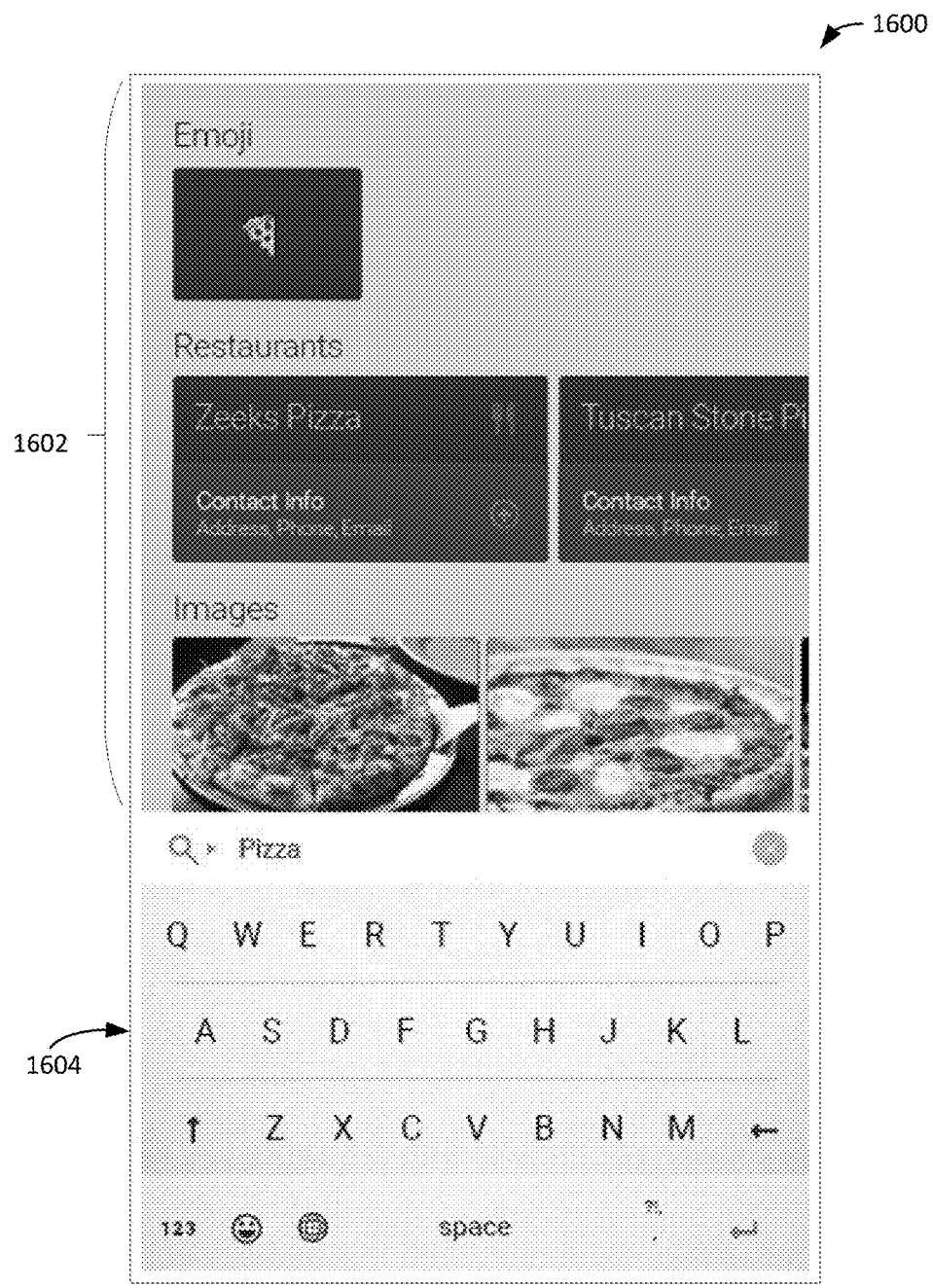
FIG. 16 illustrates a search tool within the virtual keyboard and a search user interface presented above the virtual keyboard.

FIG. 16 illustrates a user interface 1600 in which a search results user interface 1602 is presented above a virtual keyboard 1604 in place of a portion of user interface 1600.

In FIGS. 4A through 16, task icon user interfaces, extended task icon user interfaces, and search result user interfaces are presented in different locations and replace different portions of the overall user interface. It is contemplated that any of the positions described herein of the task icon user interfaces can be used with any of the examples. Specific configurations and examples were chosen for explanatory purposes and are not meant to be limiting.

In some examples, task icons are generated and presented based on previous manual searches. For example, task icons corresponding to previous searches entered through a search tool (e.g., in the IME portion of a virtual keyboard) can be presented in the virtual keyboard. In some examples, task icons corresponding to previous searches can be presented before a current user intent is determined.

Figure 17:
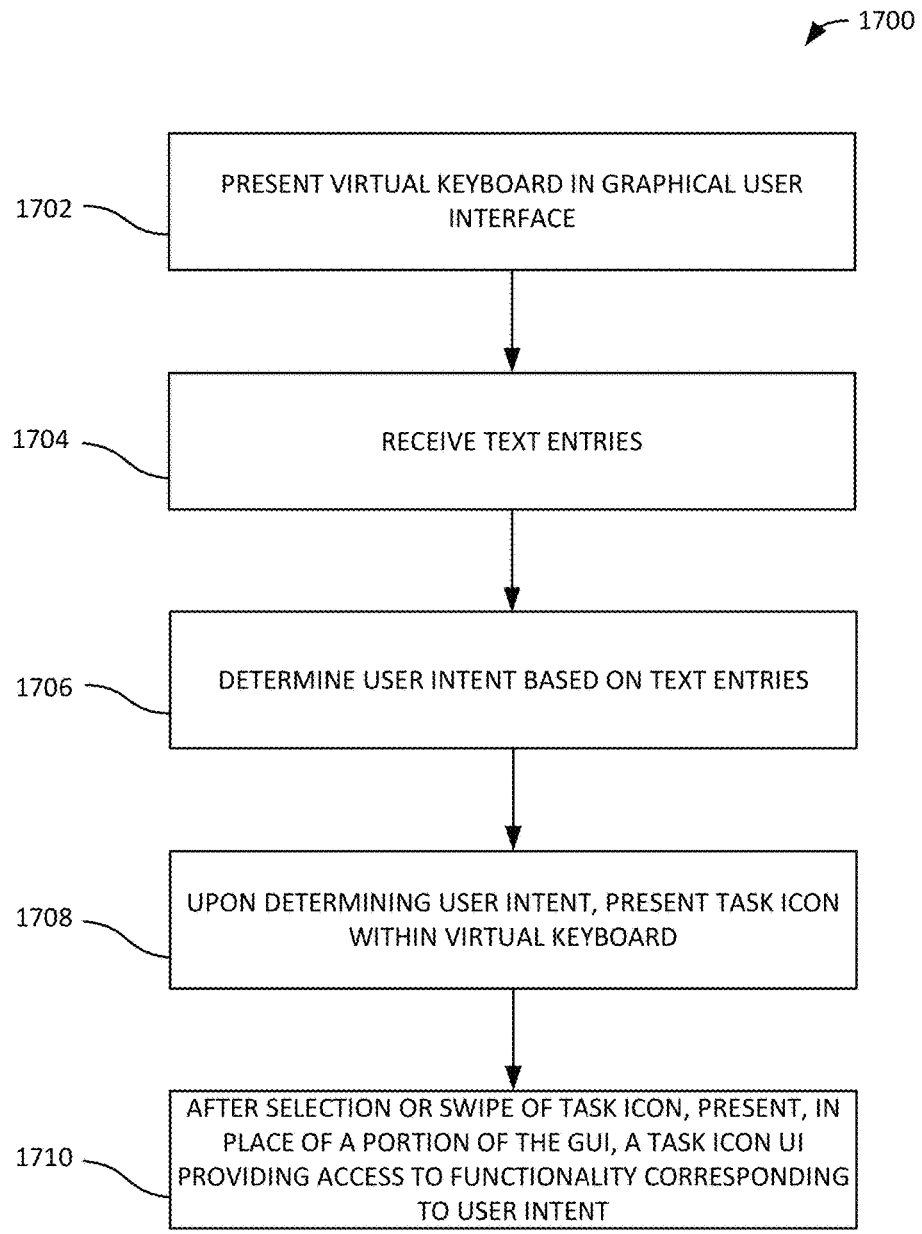
FIG. 17 is a flowchart illustrating an example method of reconfiguring a user interface in which an intent-based task icon is dynamically generated and presented in a virtual keyboard and in which a task icon user interface is presented in place of a portion of the user interface.

FIG. 17 illustrates a method 1700 for reconfiguring a user interface on a computing device. In process block 1702, a virtual keyboard is presented in the graphical user interface. In process block 1704, one or more text entries are received. In process block 1706, based at least in part on the one or more text entries, a user intent is determined using one or more intent classifiers. Upon determining the user intent, a task icon representing functionality corresponding to the user intent is presented within the virtual keyboard in process block 1708. In process block 1710, after a user selection of the task icon, a task icon user interface that provides access to the functionality corresponding to the user intent is presented in place of a portion of the graphical user interface.

Figure 18:
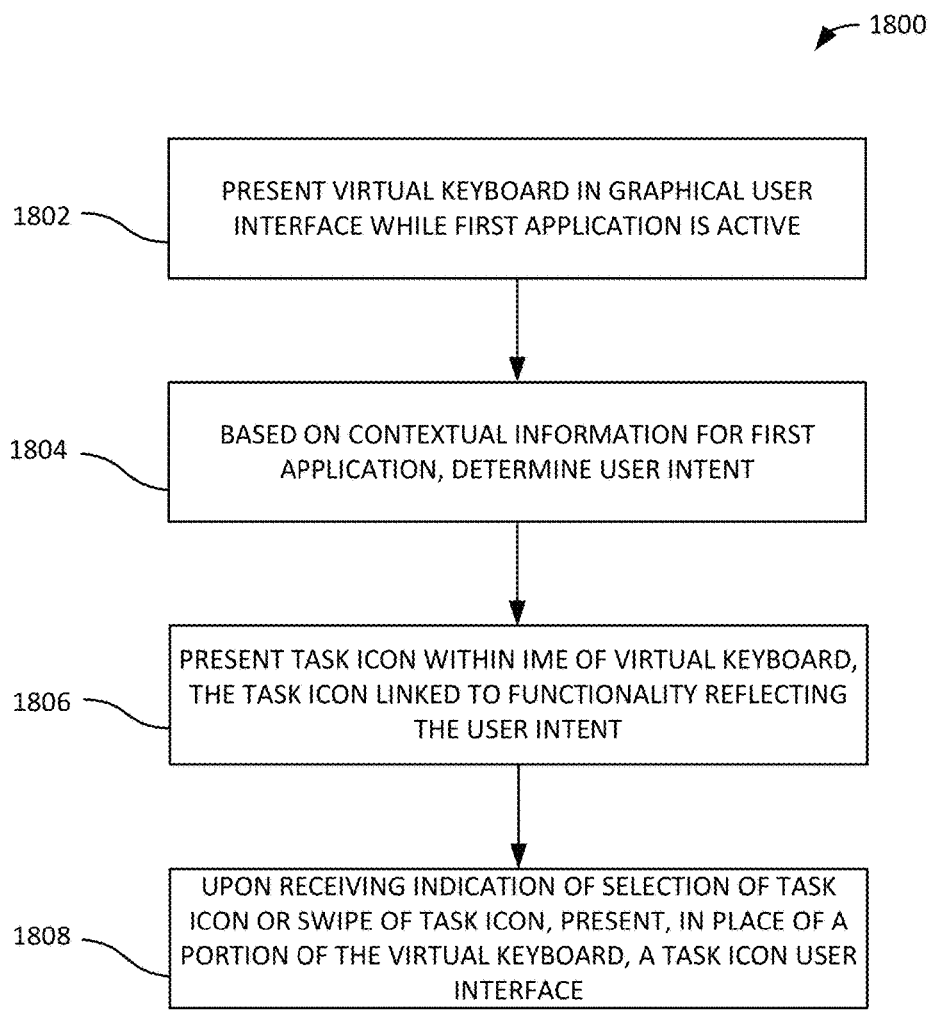
FIG. 18 is a flowchart illustrating an example method of reconfiguring a user interface including a virtual keyboard in which a task icon user interface is presented in place of a portion of the virtual keyboard.

FIG. 18 illustrates a method 1800 for reconfiguring a graphical user interface. In process block 1802, while a first application is active, a virtual keyboard is presented in the graphical user interface. The virtual keyboard has an input method editor (IME) portion. In process block 1804, based at least in part on contextual information for the first application, a user intent is determined. The contextual information includes at least one of text entered via the virtual keyboard, text received via the first application, or information relating to the first application. A task icon is presented within the IME portion of the virtual keyboard in process block 1806. The task icon is linked to functionality reflecting the user intent. In process block 1808, upon receiving an indication of a selection of the task icon, a task icon user interface is presented in place of a portion of the virtual keyboard. The task icon user interface comprises at least one of: an application user interface for a second application, shareable content generated by the second application, or a deep link to functionality of the second application or functionality of a web service.

Example Computing Systems

Figure 19:
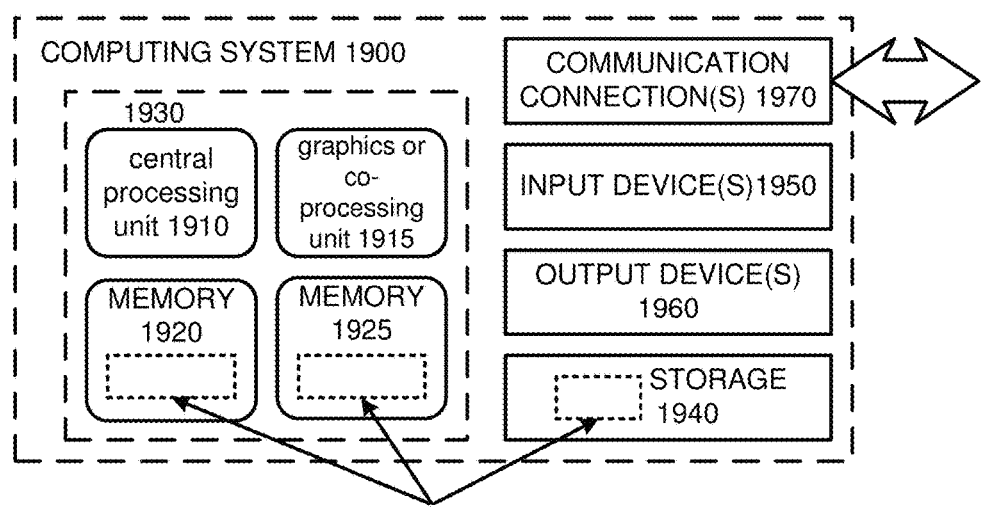
FIG. 19 is a diagram of an example computing system in which some described embodiments can be implemented.

FIG. 19 depicts a generalized example of a suitable computing system 1900 in which the described innovations may be implemented. The computing system 1900 is not intended to suggest any limitation as to scope of use or functionality, as the innovations may be implemented in diverse general-purpose or special-purpose computing systems.

With reference to FIG. 19, the computing system 1900 includes one or more processing units 1910, 1915 and memory 1920, 1925. In FIG. 19, this basic configuration 1930 is included within a dashed line. The processing units 1910, 1915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 19 shows a central processing unit 1910 as well as a graphics processing unit or co-processing unit 1915. The tangible memory 1920, 1925 may be volatile memory (e.g., registers, cache, RAM), nonvolatile memory (e.g., ROM, EEPROM, flash memory, etc.), or some combination of the two, accessible by the processing unit(s). The memory 1920, 1925 stores software 1980 implementing one or more innovations described herein, in the form of computer-executable instructions suitable for execution by the processing unit(s). For example, memory 1920, 1925 can store intent classifier 116, ranker 118, and/or user interface generator 106 of FIG. 1 and/or user interface generator 206, ranker 208, federator 212, decoder 214, autocorrector 220, and/or intent classifiers 210 of FIG. 2.

A computing system may have additional features. For example, the computing system 1900 includes storage 1940, one or more input devices 1950, one or more output devices 1960, and one or more communication connections 1970. An interconnection mechanism (not shown) such as a bus, controller, or network interconnects the components of the computing system 1900. Typically, operating system software (not shown) provides an operating environment for other software executing in the computing system 1900, and coordinates activities of the components of the computing system 1900.

The tangible storage 1940 may be removable or non-removable, and includes magnetic disks, magnetic tapes or cassettes, CD-ROMs, DVDs, or any other medium which can be used to store information and which can be accessed within the computing system 1900. The storage 1940 stores instructions for the software 1980 implementing one or more innovations described herein. For example, storage 1940 can store intent classifier 116, ranker 118, and/or user interface generator 106 of FIG. 1 and/or user interface generator 206, ranker 208, federator 212, decoder 214, autocorrector 220, and/or intent classifiers 210 of FIG. 2.

The input device(s) 1950 may be a touch input device such as a keyboard, mouse, pen, or trackball, a voice input device, a scanning device, or another device that provides input to the computing system 1900. For video encoding, the input device(s) 1950 may be a camera, video card, TV tuner card, or similar device that accepts video input in analog or digital form, or a CD-ROM or CD-RW that reads video samples into the computing system 1900. The output device(s) 1960 may be a display, printer, speaker, CD-writer, or another device that provides output from the computing system 1900.

The communication connection(s) 1970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Mobile Devices

Figure 20:
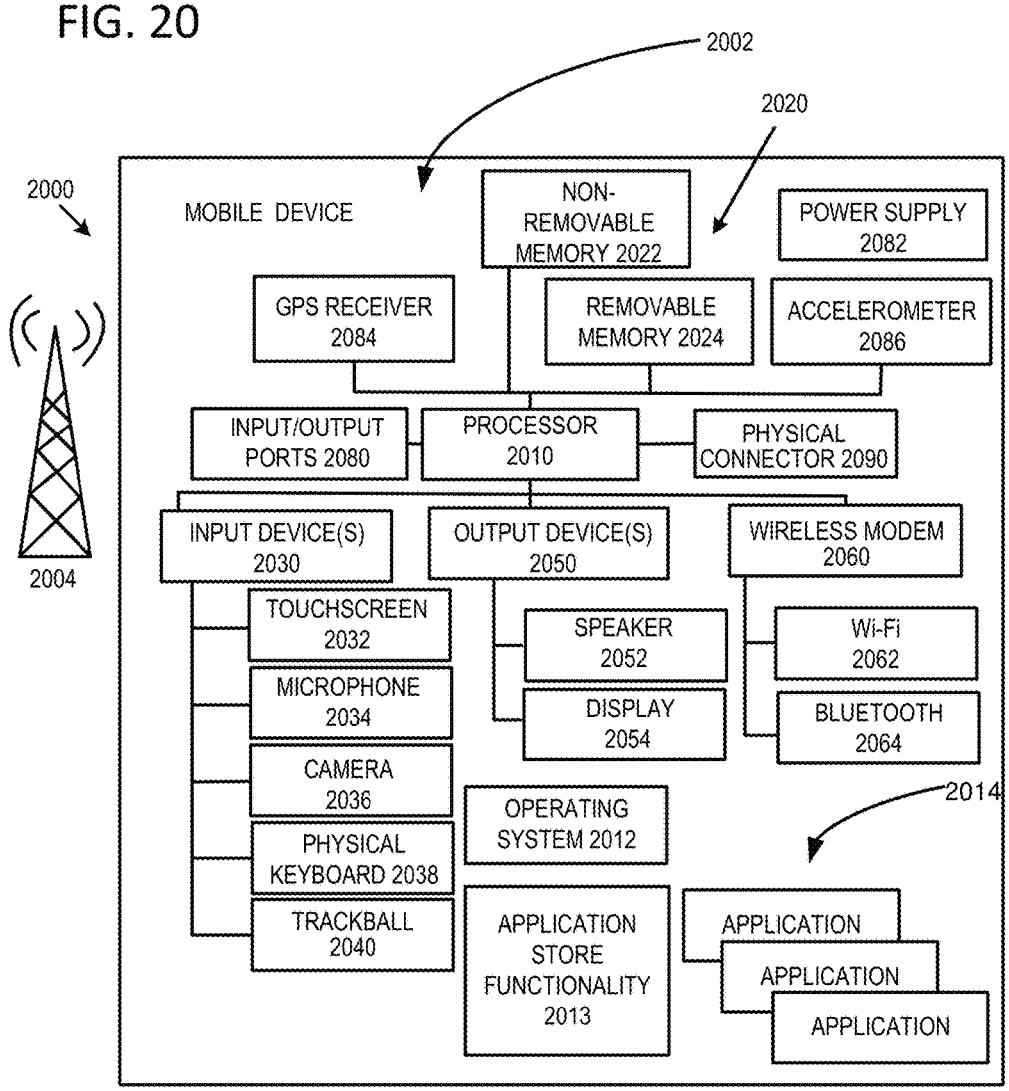
FIG. 20 is an example mobile device that can be used in conjunction with the technologies described herein.

FIG. 20 is a system diagram depicting an example mobile device 2000 including a variety of optional hardware and software components, shown generally at 2002. Any components 2002 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 2004, such as a cellular, satellite, or other network.

The illustrated mobile device 2000 can include a controller or processor 2010 (e.g., signal processor, microprocessor, ASIC, or other control and processing logic circuitry) for performing such tasks as signal coding, data processing, input/output processing, power control, and/or other functions. An operating system 2012 can control the allocation and usage of the components 2002 and support for one or more application programs 2014. The application programs can include common mobile computing applications (e.g., email applications, calendars, contact managers, web browsers, messaging applications), or any other computing application. The application programs 2014 can also include virtual keyboard, task icon, and user interface reconfiguration technology. Functionality 2013 for accessing an application store can also be used for acquiring and updating application programs 2014.

The illustrated mobile device 2000 can include memory 2020. Memory 2020 can include non-removable memory 2022 and/or removable memory 2024. The non-removable memory 2022 can include RAM, ROM, flash memory, a hard disk, or other well-known memory storage technologies. The removable memory 2024 can include flash memory or a Subscriber Identity Module (SIM) card, which is well known in GSM communication systems, or other well-known memory storage technologies, such as "smart cards." The memory 2020 can be used for storing data and/or code for running the operating system 2012 and the applications 2014. Example data can include web pages, text, images, sound files, video data, or other data sets to be sent to and/or received from one or more network servers or other devices via one or more wired or wireless networks. The memory 2020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 2000 can support one or more input devices 2030, such as a touchscreen 2032, microphone 2034, camera 2036, physical keyboard 2038 and/or trackball 2040 and one or more output devices 2050, such as a speaker 2052 and a display 2054. Other possible output devices (not shown) can include piezoelectric or other haptic output devices. Some devices can serve more than one input/output function. For example, touchscreen 2032 and display 2054 can be combined in a single input/output device.

The input devices 2030 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 2012 or applications 2014 can comprise speech-recognition software as part of a voice user interface that allows a user to operate the device 2000 via voice commands Further, the device 2000 can comprise input devices and software that allows for user interaction via a user's spatial gestures, such as detecting and interpreting gestures to provide input to a gaming application.

A wireless modem 2060 can be coupled to an antenna (not shown) and can support two-way communications between the processor 2010 and external devices, as is well understood in the art. The modem 2060 is shown generically and can include a cellular modem for communicating with the mobile communication network 2004 and/or other radio-based modems (e.g., Bluetooth 2064 or Wi-Fi 2062). The wireless modem 2060 is typically configured for communication with one or more cellular networks, such as a GSM network for data and voice communications within a single cellular network, between cellular networks, or between the mobile device and a public switched telephone network (PSTN).

The mobile device can further include at least one input/output port 2080, a power supply 2082, a satellite navigation system receiver 2084, such as a Global Positioning System (GPS) receiver, an accelerometer 2086, and/or a physical connector 2090, which can be a USB port, IEEE 1394 (FireWire) port, and/or RS-232 port. The illustrated components 2002 are not required or all-inclusive, as any components can be deleted and other components can be added.

Example Cloud-Supported Environments

Figure 21:
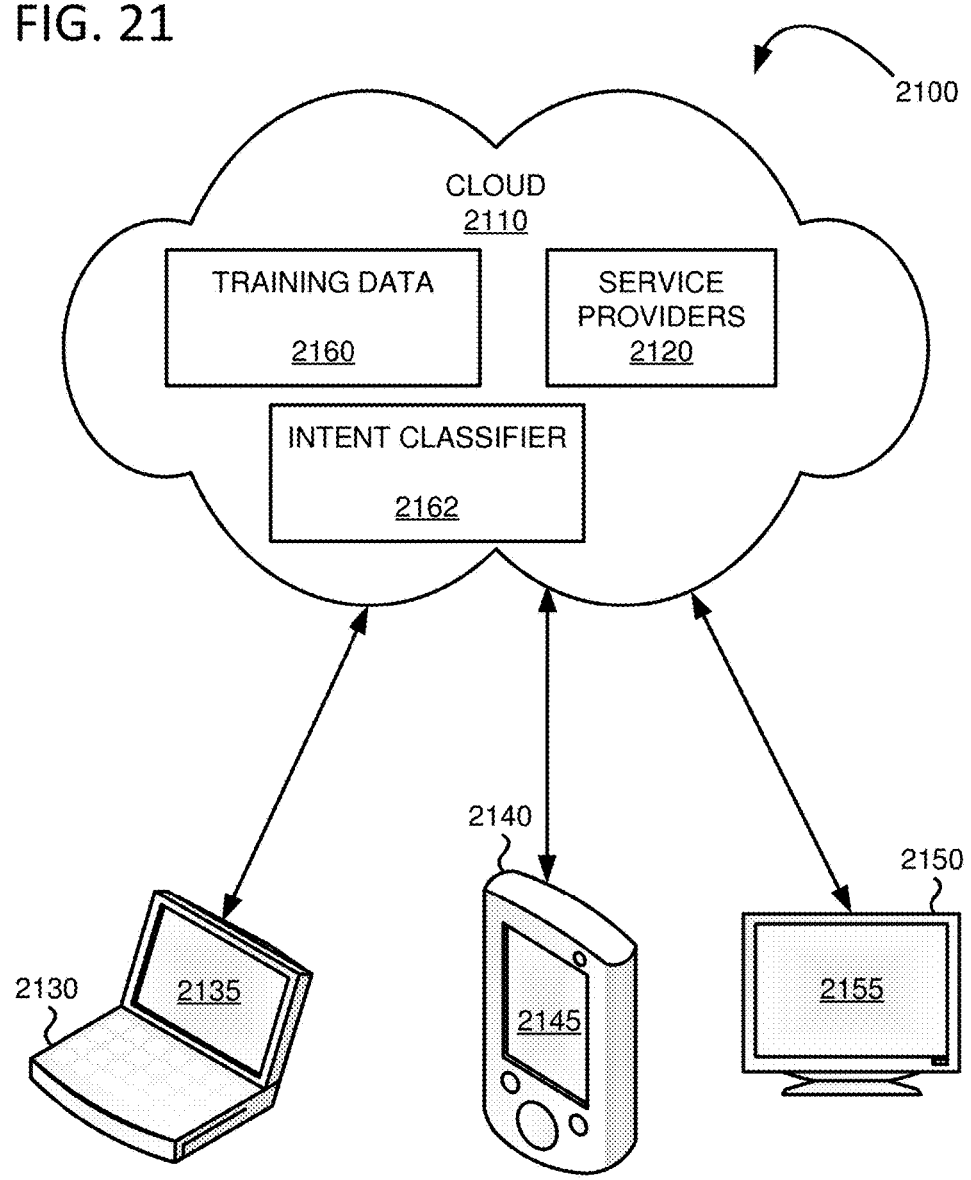
FIG. 21 is an example cloud-supported environment that can be used in conjunction with the technologies described herein.

FIG. 21 illustrates a generalized example of a suitable cloud-supported environment 2100 in which described embodiments, techniques, and technologies may be implemented. In the example environment 2100, various types of services (e.g., computing services) are provided by a cloud 2110. For example, the cloud 2110 can comprise a collection of computing devices, which may be located centrally or distributed, that provide cloud-based services to various types of users and devices connected via a network such as the Internet. The implementation environment 2100 can be used in different ways to accomplish computing tasks. For example, some tasks (e.g., processing user input and presenting a user interface) can be performed on local computing devices (e.g., connected devices 2130, 2140, 2150) while other tasks (e.g., storage of data to be used in subsequent processing) can be performed in the cloud 2110.

In example environment 2100, the cloud 2110 provides services for connected devices 2130, 2140, 2150 with a variety of screen capabilities. Connected device 2130 represents a device with a computer screen 2135 (e.g., a mid-size screen). For example, connected device 2130 can be a personal computer such as desktop computer, laptop, notebook, netbook, or the like. Connected device 2140 represents a device with a mobile device screen 2145 (e.g., a small size screen). For example, connected device 2140 can be a mobile phone, smart phone, personal digital assistant, tablet computer, and the like. Connected device 2150 represents a device with a large screen 2155. For example, connected device 2150 can be a television screen (e.g., a smart television) or another device connected to a television (e.g., a set-top box or gaming console) or the like. One or more of the connected devices 2130, 2140, 2150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2100. For example, the cloud 2110 can provide services for one or more computers (e.g., server computers) without displays.

Services can be provided by the cloud 2110 through service providers 2120, or through other providers of online services (not depicted). For example, cloud services can be customized to the screen size, display capability, and/or touchscreen capability of a particular connected device (e.g., connected devices 2130, 2140, 2150).

In example environment 2100, the cloud 2110 provides the technologies and solutions described herein to the various connected devices 2130, 2140, 2150 using, at least in part, the service providers 2120. For example, the service providers 2120 can provide a centralized solution for various cloud-based services. The service providers 2120 can manage service subscriptions for users and/or devices (e.g., for the connected devices 2130, 2140, 2150 and/or their respective users). The cloud 2110 can store training data 2160 used in user intent determination as described herein. An intent classifier 2162, which can be, for example, similar to intent classifier 116 of FIG. 1, can also be implemented in cloud 2110.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 19, computer-readable storage media include memory 1920 and 1925 and storage 1940. By way of example and with reference to FIG. 20, computer-readable storage media include memory 2020, 2022, and 2024. The term computer-readable storage media does not include signals and carrier waves. In addition, the term computer-readable storage media does not include communication connections (e.g., 1970, 2060, 2062, and 2064).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

Additional Examples

In some example systems, similar to system 100 of FIG. 1 and/or system 200 of FIG. 2, a user interface generator (e.g., such as user interface generator 106 or user interface generator 206) is configured to, by at least one processor, generate a virtual keyboard for display in a user interface. The user interface generator can be further configured to present a search icon upon receiving an indication of an interaction with an IME portion of the virtual keyboard. Search user interfaces and search icons are also discussed with respect to FIGS. 14A-16. The search icon can be presented, for example, in the IME portion of the virtual keyboard. The user interaction can be a press-and-hold of the IME portion, swipe of the IME portion, or other user interaction. In some examples, any part of the IME portion can be interacted with (e.g., swiped) to cause the search icon to be presented.

In some examples, the virtual keyboard does not include a search icon or search functionality prior to receiving the indication of the user interaction. Such an approach avoids cluttering the virtual keyboard with a large number of icons or features that a user is not currently interested in using while still allowing the user to access search functionality in the virtual keyboard when such functionality is desired.

The search icon can be one of: a web search icon, an emoji search icon, a contacts search icon, a graphic interchange format (GIF) search icon, a universal search icon, or another suitable search icon. In some examples, the search icons correspond to at least some of the same categories as task icons. In some examples, the user interface generator is configured to present a plurality of search icons in the IME upon receiving the indication of the user interaction. The respective search icons represent different types of search functionality accessible via the virtual keyboard. As a specific example, a web search icon (e.g., a magnifying glass) and at least one additional search icon (e.g., an emoji search icon, image search icon, a video search icon, GIF search icon, contacts search icon, etc.) are presented together to allow a user to select a particular category of search. In some examples, a universal search icon is presented alone or in conjunction with other search icons.

In some examples, a search query text entry area is presented in conjunction with the plurality of search icons. In examples in which multiple search icons are presented, an indicator or emphasis of one of the search icons or de-emphasis of other search icons (e.g., underline, bolding, graying out of other search icons, etc.) illustrates which search icon is active. The active search icon determines the search category for which search results are presented. For example, if the image search icon is underlined and bolded, image search results are returned. In some examples, a search query text entry area is presented upon further interaction (e.g., press-and-hold, selection, swipe, etc.) with a search icon rather than being presented at the same time as the search icon(s).

In some examples, the user interface generator is further configured to, by at least one processor, replace a portion of the virtual keyboard with a search result interface. The search result interface can be presented in place of the portion of the virtual keyboard prior to receiving a search query. That is, upon receiving the indication of the user interaction with the IME portion of the virtual keyboard, the virtual keyboard can be modified from an initial state in which no search icons or search functionality is included to a state in which search icon(s) and a search result interface are included. In examples in which the search result interface is presented prior to receiving a query, search results of previous queries or common queries (either for the particular user or for a group of users) can be presented.

Search results presented in the search result interface can be presented in a "card" format in which each result is included in a rectangular (or other shaped) area resembling a business card. A result card can be swiped left or right to reveal another result in card format. In other examples, search results are presented in a list, thumbnail, or other format.

The search result interface can be presented anywhere in the virtual keyboard. In some examples, the search result interface is presented above the IME portion of the virtual keyboard, and the virtual keyboard is expanded upward to accommodate the search result interface. In another example, the portion of the virtual keyboard below the IME portion can be replaced by the search result interface. The user interface generator can be further configured to animate a transition in which the letter keys of the virtual keyboard are replaced by the search results of previous queries. For example, the letter keys can transition horizontally to the left or right or vertically up or down. A search result user interface can transition along with the letter keys and appear as though the search result user interface is pushing the letter keys out of the viewable area.

Figure 22A:
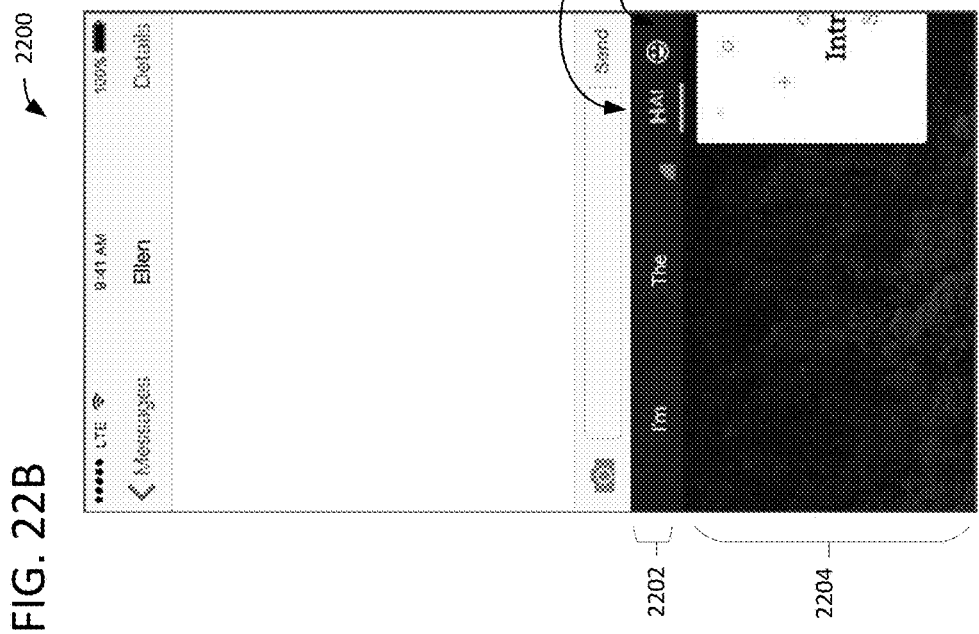

FIGS. 22A-22J illustrate various search interfaces presented in a virtual keyboard. FIG. 22A shows graphical user interface 2200. User interface 2200 includes a virtual keyboard having an IME portion 2202. In FIG. 22A, an introductory screen is shown that introduces a user to the in-keyboard search functionality. In virtual keyboard portion 2204, instructions are shown (i.e., to swipe the IME portion 2202) for causing search functionality to be presented in the virtual keyboard. In some examples, in a normal operating situation (i.e., when it is not the first time the virtual keyboard is being used), virtual keyboard portion 2204 would display the keys of the virtual keyboard (e.g., as is shown in FIG. 4A).

Figure 22B:
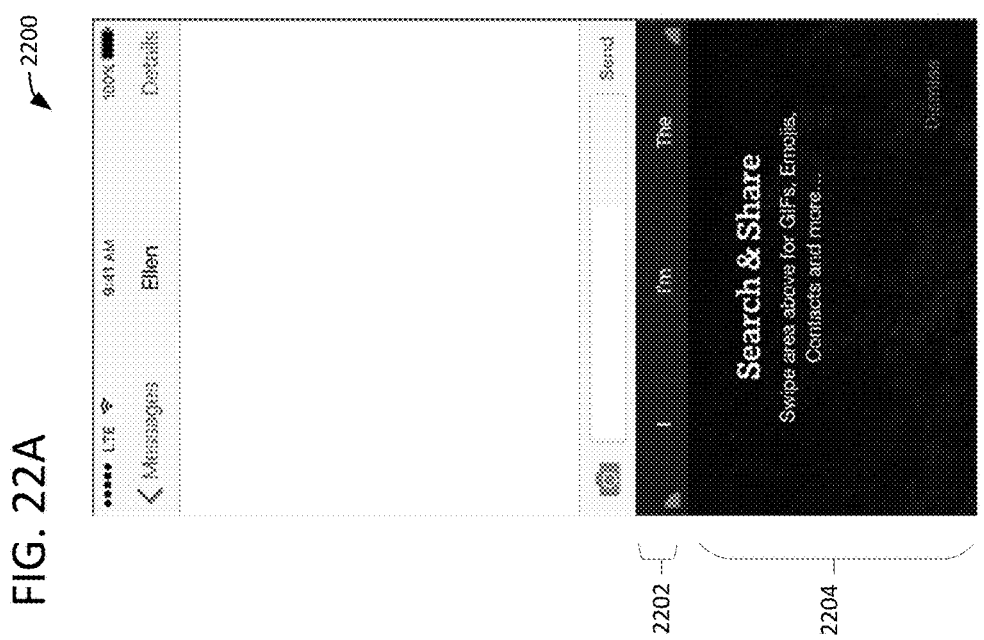

In FIG. 22B, a user has swiped IME portion 2202, and a search interface is beginning to be revealed (sliding from right to left). The search interface includes a first search icon 2206 (shown as "HA!," which is a GIF search category), and a second search icon 2208, which is an emoji search category. Virtual keyboard portion 2204 is becoming a search result interface as introductory content 2210 is also moved into view.

Figure 22C:
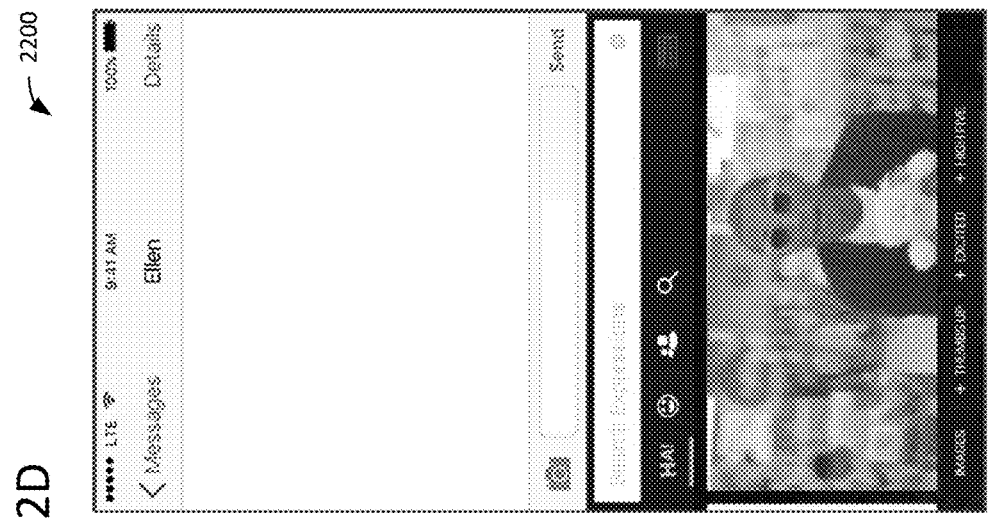

FIG. 22C illustrates user interface 2200 after the search interface has fully moved across the display from right to left. IME portion 2202 has expanded and now includes a search query text entry area 2212 as well as first search icon 2206, second search icon 2208, a third search icon 2214 (contacts search), and a fourth search icon 2216 (web search). First search icon 2206 is the "active" search category, as indicated by the bolding/coloring and underlining of first search icon 2206 relative to second search icon 2208, third search icon 2214, and fourth search icon 2216. A keyboard icon 2218 is also presented on the right side of IME portion 2202. Interaction with keyboard icon 2218 causes the keys of the virtual keyboard to be presented in place of the search result interface. Virtual keyboard portion 2204 in FIG. 22B has become search result interface 2219. Search result interface 2219 can also include search expanders (e.g., search expander 2220), alternative search term suggestions, related queries, etc. In some examples, search query text entry area 2212 is not presented until a user interaction with a search icon.

Figure 22D:
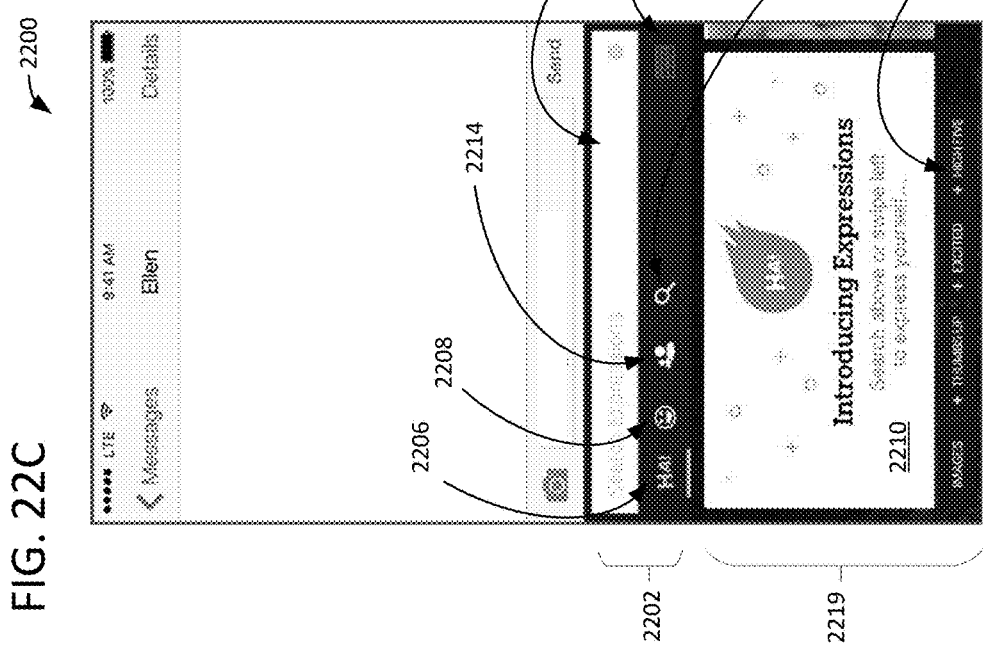

As with FIG. 22A, search result interface 2219 shows introductory content 2210 that can be displayed when a user uses the virtual keyboard for a first time. In normal operation, a previous or common search result can be presented, as is illustrated in FIG. 22D. In FIG. 22D, a previous search result 2221 is presented after, for example, a user swipe of introductory content 2210 moves introductory content 2210 to the left and out of the display. As shown in FIGS. 22A-22D, a search icon, search query text entry area, or other search functionality is not presented in the virtual keyboard until the user interacts with IME portion 2202. As is also shown in FIGS. 22A-22D, a previous or common search result 2221 can be provided in search result interface 2219 before a user has actually performed a search query after causing the search interface to be presented.

Figure 22E:
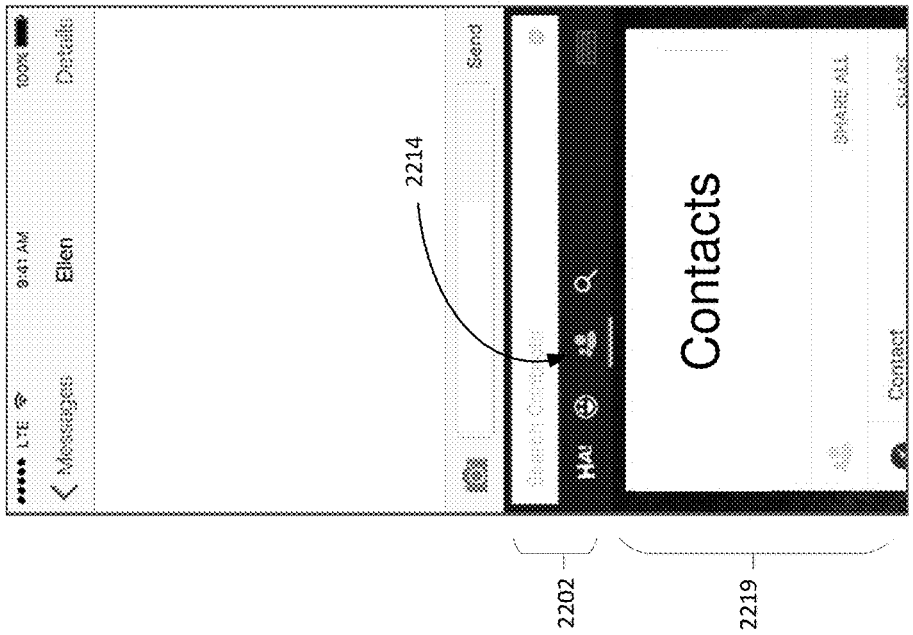
Figure 22F:
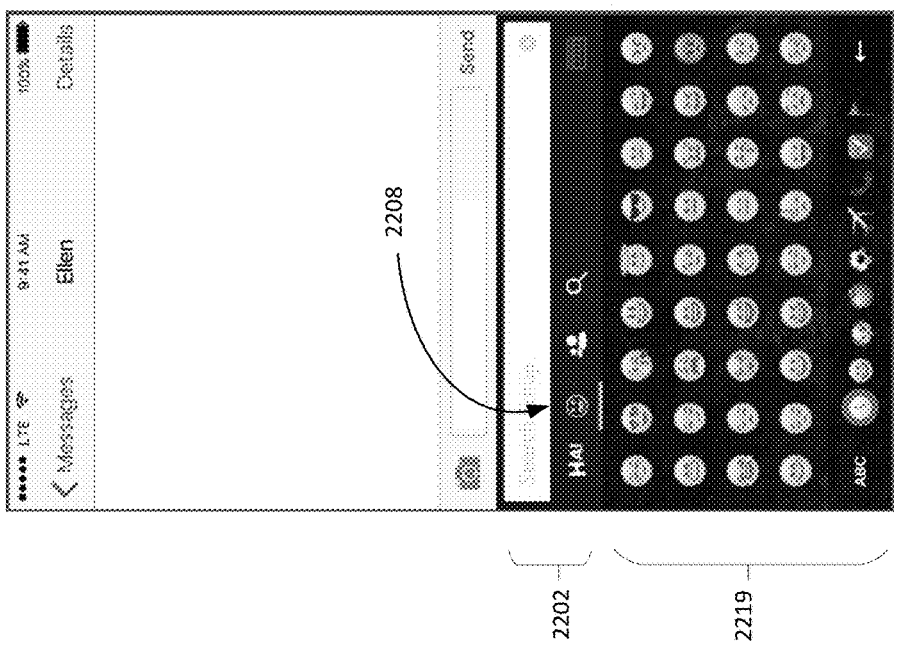
Figure 22H:
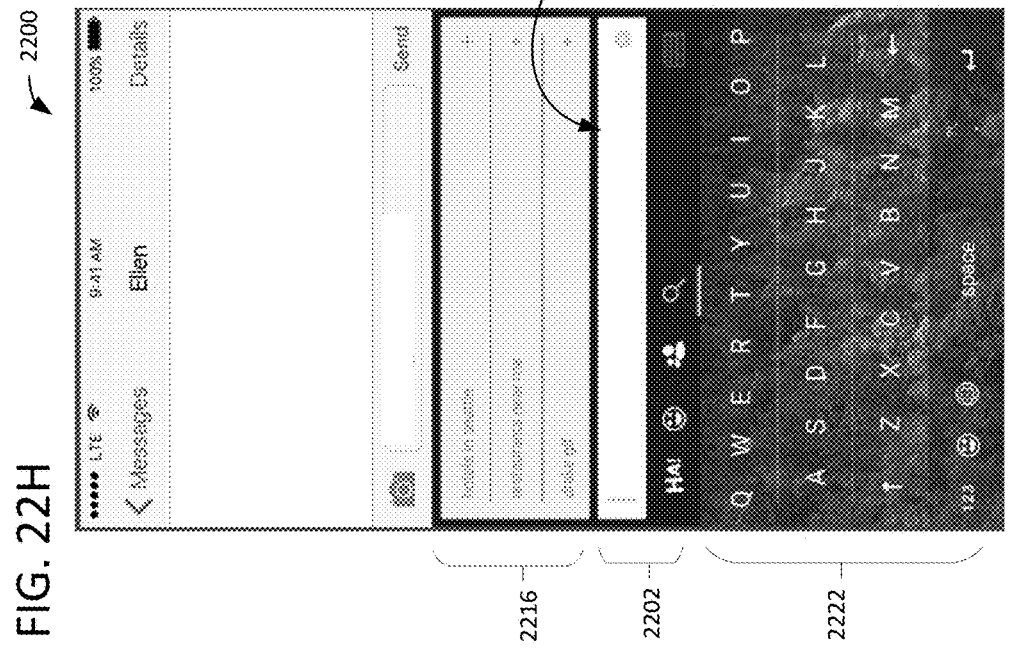
Figure 22G:
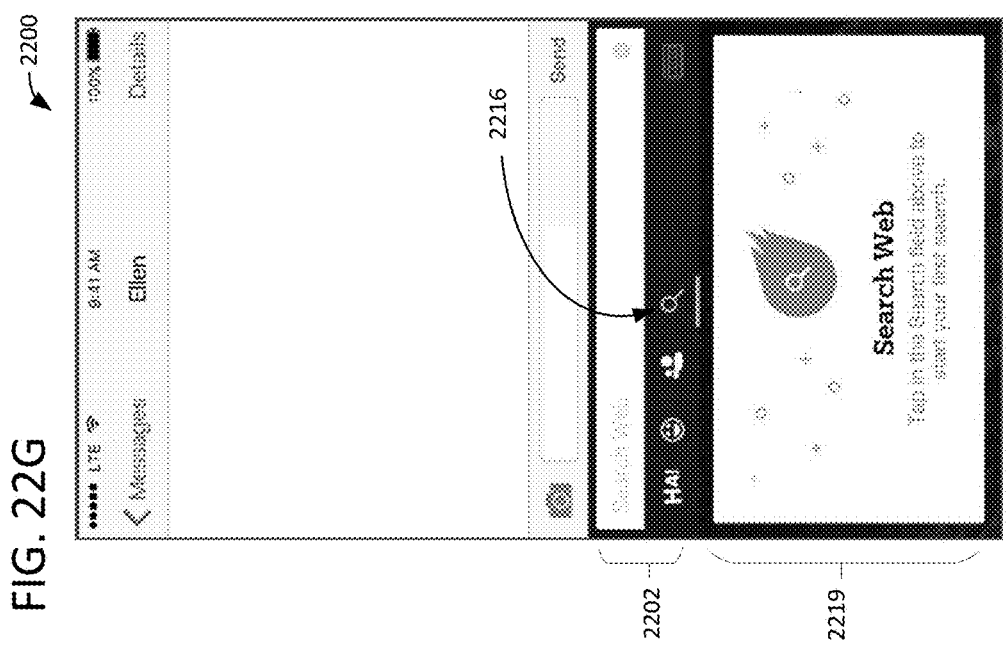

FIG. 22E illustrates user interface 2200 where a user has selected the second search icon 2208 (emoji search) as the active search category. Search result user interface 2219 changes to show emoji search results. Similarly, in FIG. 22F, a user has selected the third search icon 2214 (contacts search) as the active search category, and search result user interface 2219 changes to show contacts search results. In FIG. 22G, a user has selected the fourth search icon 2216 (web search) as the active search category, and search result user interface 2219 changes to show introductory content regarding web search. In some examples, after a user has already performed at least one web search, a previous web search result is presented in search result interface 2219.

In FIGS. 22A-22G, search results are shown as cards, but other formats such as a list, thumbnail icons, etc. is also possible. FIG. 22H illustrates user interface 2200 after a user taps in search query text entry area 2212. Search result interface 2219 has been replaced by keys 2222 of the virtual keyboard. In some examples, a transition between virtual keyboard portion 2204, search result interface 2219 (and between search results within search result interface 2219), and/or keys 2222 is animated in the horizontal or vertical direction (e.g., left-to-right, right-to-left, up-to-down, down-to-up).

In FIG. 22I, a user has entered "Colonie" via keys 2222 shown in FIG. 22H. Search result interface 2219 is redisplayed instead of keys 2222 as a result, and a search result for the restaurant Colonie is displayed in search result interface 2219. The search result can include shareable content. In some examples, the entire search result can be shared, as indicated by option 2224 to "SHARE ALL," and in some examples, particular pieces of information can be shareable (e.g., only a phone number, address, hours, reviews, menu, etc.). In FIG. 22J, a user selection to share the address of Colonie is shown by touch marker 2226. The address information 2228 for Colonie is then presented in the text entry box for the messaging application with which the virtual keyboard is currently being used. As is shown in FIG. 22J, each of "Phone," "Website," and "Bing" have a selectable option to share, and the Address, which has already been sent to the text entry box to share, has the option to remove. With such an interface, a user can select only one, two, three, etc., pieces of information to share rather than having to share an entire search result card that may contain information not relevant to the intended recipient.

In FIGS. 22A-22J, a common decorative theme is maintained for the search interface, virtual keyboard, and search results interface. In some examples, different themes are used to indicate entry into the search interface.

Figure 23:
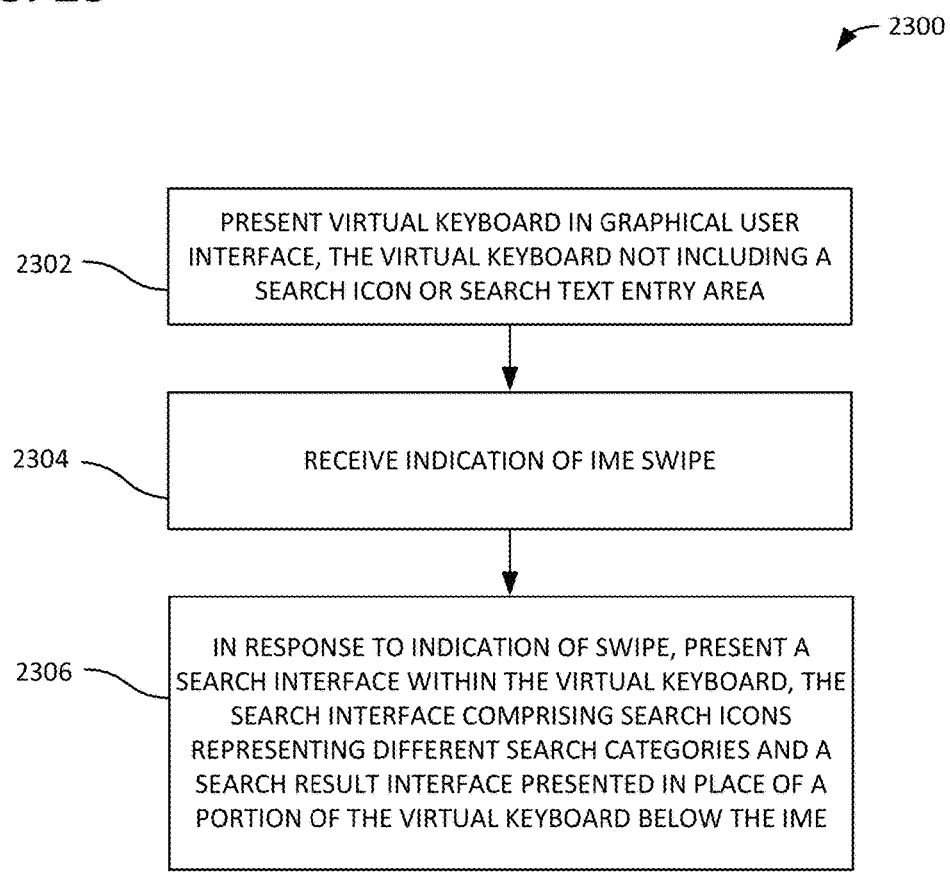
FIG. 23 illustrates an example method of reconfiguring a graphical user interface in which a search interface is presented within the virtual keyboard.

FIG. 23 illustrates a method 2300 for reconfiguring a graphical user interface on a computing device. In process block 2302, a virtual keyboard is presented in the graphical user interface. The virtual keyboard does not include a search icon or a search text entry area. In process block 2304, an indication of a swipe of an IME portion of the virtual keyboard is received. In process block 2306, in response to the indication of the swipe, a search interface is presented within the virtual keyboard. The search interface comprises a plurality of search icons representing different search categories. In some examples, the search interface also includes a search query text entry area.

The search interface also comprises a search result interface. The search result interface is presented in place of a portion of the virtual keyboard below the IME portion, and the search result interface can include search results for previously received or common search queries. In some examples, the search result interface is presented above the IME portion of the virtual keyboard, and the overall size of the virtual keyboard is expanded. The previously received or common search queries included in the search result interface can correspond to the search category represented by a search icon of the plurality of search icons that is currently selected (the "active" search icon). The plurality of search icons can include, for example, a web search icon and at least one of an image search icon, a video search icon, an emoji search icon, a contacts search icon, a graphic interchange format (GIF) search icon, or a universal search icon.

Figure 24:
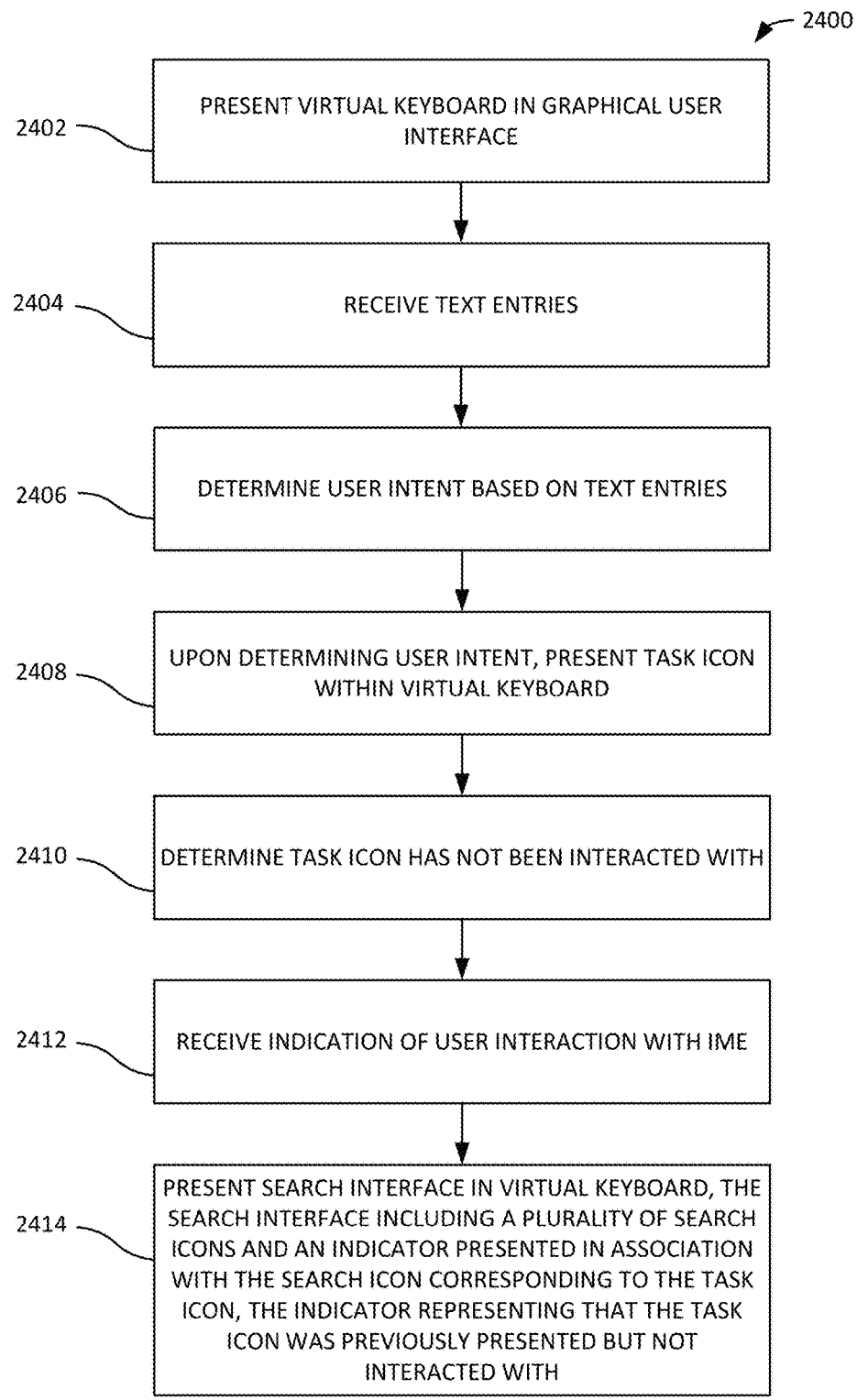

FIG. 24 illustrates a method 2400 for reconfiguring a graphical user interface on a computing device. In process block 2402, a virtual keyboard is presented in the graphical user interface. In process block 2404, one or more text entries are received. Based at least in part on the one or more text entries, a user intent is determined, using one or more intent classifiers, in process block 2406. In process block 2408, upon determining the user intent, a task icon representing functionality corresponding to the user intent is presented within the virtual keyboard. Interaction with the task icon results in a portion of the graphical user interface being replaced with a task icon user interface that provides access to the functionality corresponding to the user intent.

In process block 2410, it is determined that the task icon has not been interacted with. A threshold time can be used for this purpose. For example, if a task icon has not been selected, swiped, etc., within three, five, 10, 15, etc. seconds, it can be determined that the task icon has not been interacted with. Other time thresholds can also be used. In some examples, upon determining that the task icon has not been interacted with, the task icon is removed from the virtual keyboard or moved to an edge of the graphical user interface (e.g., the edge of the IME portion) such that only a portion of the task icon is visible. This is also referred to as providing a "peek" of the task icon. In some examples, if the peek of the task icon has not been interacted with beyond a second time threshold (e.g., 20 seconds, 30 seconds, one minute, etc.), the peek of the task icon is removed from the virtual keyboard.

In process block 2412, an indication of a user interaction with the IME portion of the virtual keyboard is received. This can be, for example, a swipe, selection, press-and-hold, or other user interaction. In process block 2414, a search interface is presented in the virtual keyboard responsive to receiving the indication. The search interface comprises a plurality of search icons representing different search categories. The search interface also includes an indicator presented in association with a search icon corresponding to the task icon. The indicator represents that the task icon was previously presented but not interacted with. Example indicators are illustrated in FIGS. 25F and 25G. In some examples, the task icon is removed from the graphical user interface when the search interface is presented.

Figure 25B:
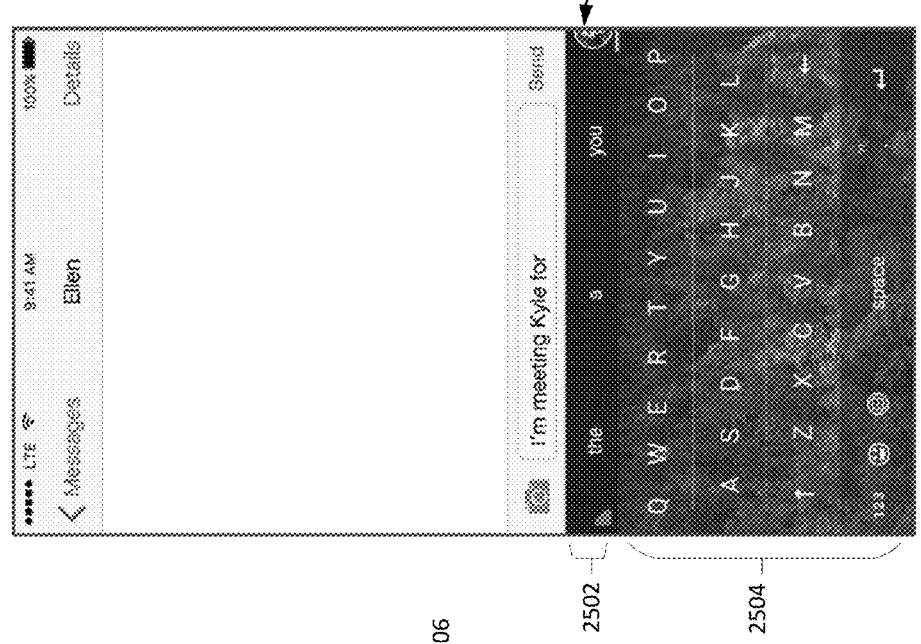
Figure 25A:
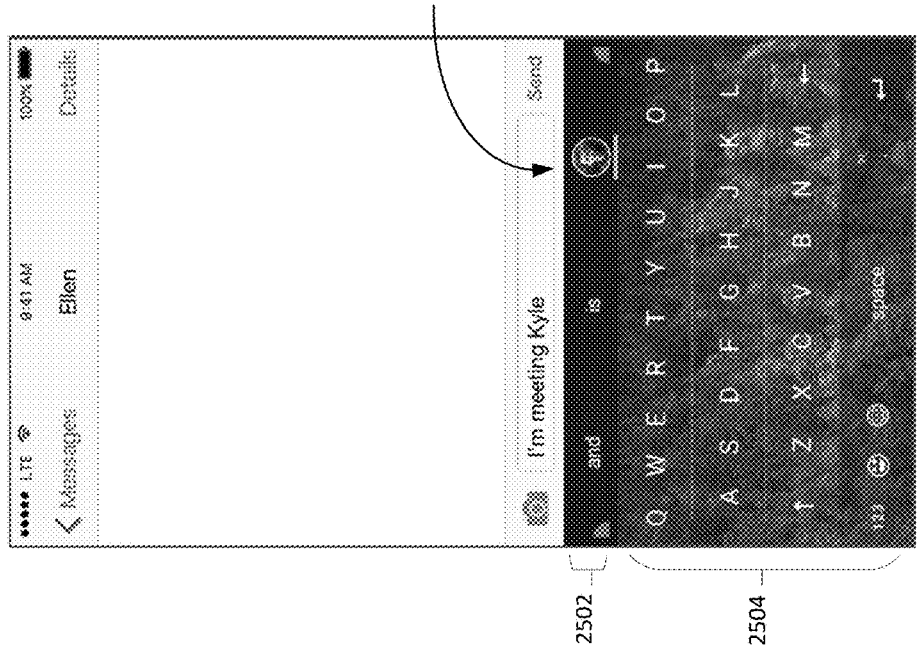
Figure 25D:
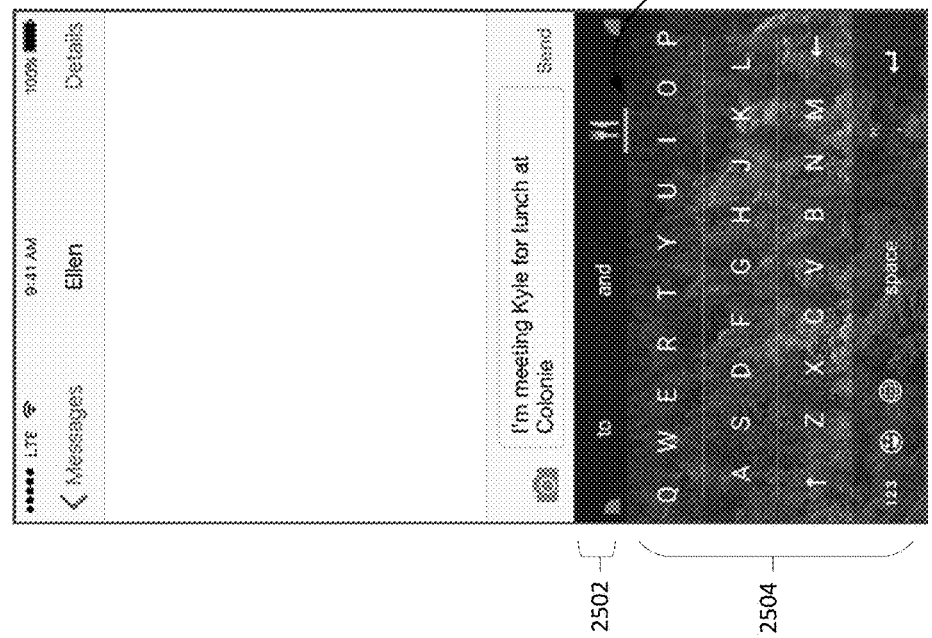
Figure 25C:
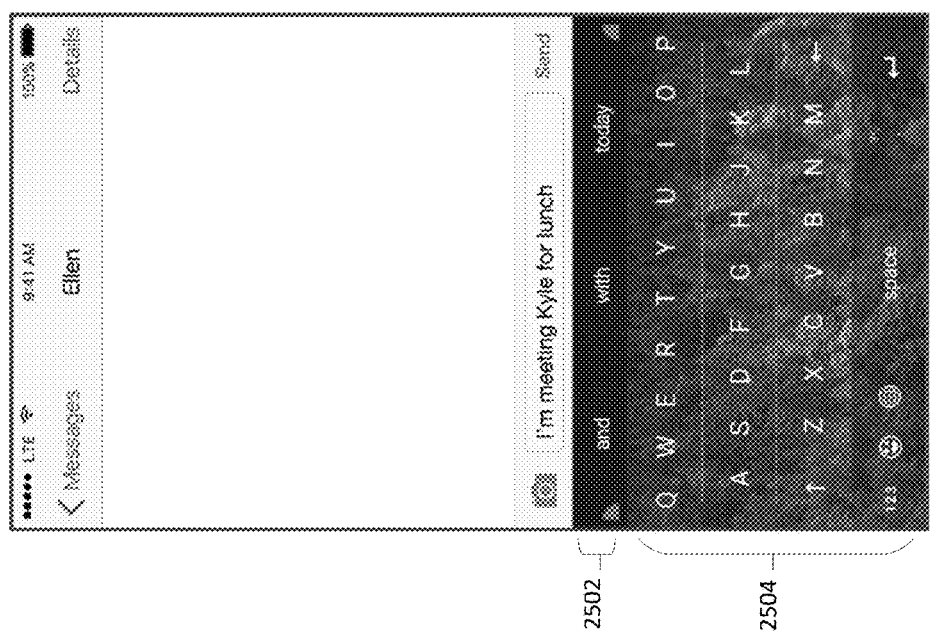
Figure 25G:
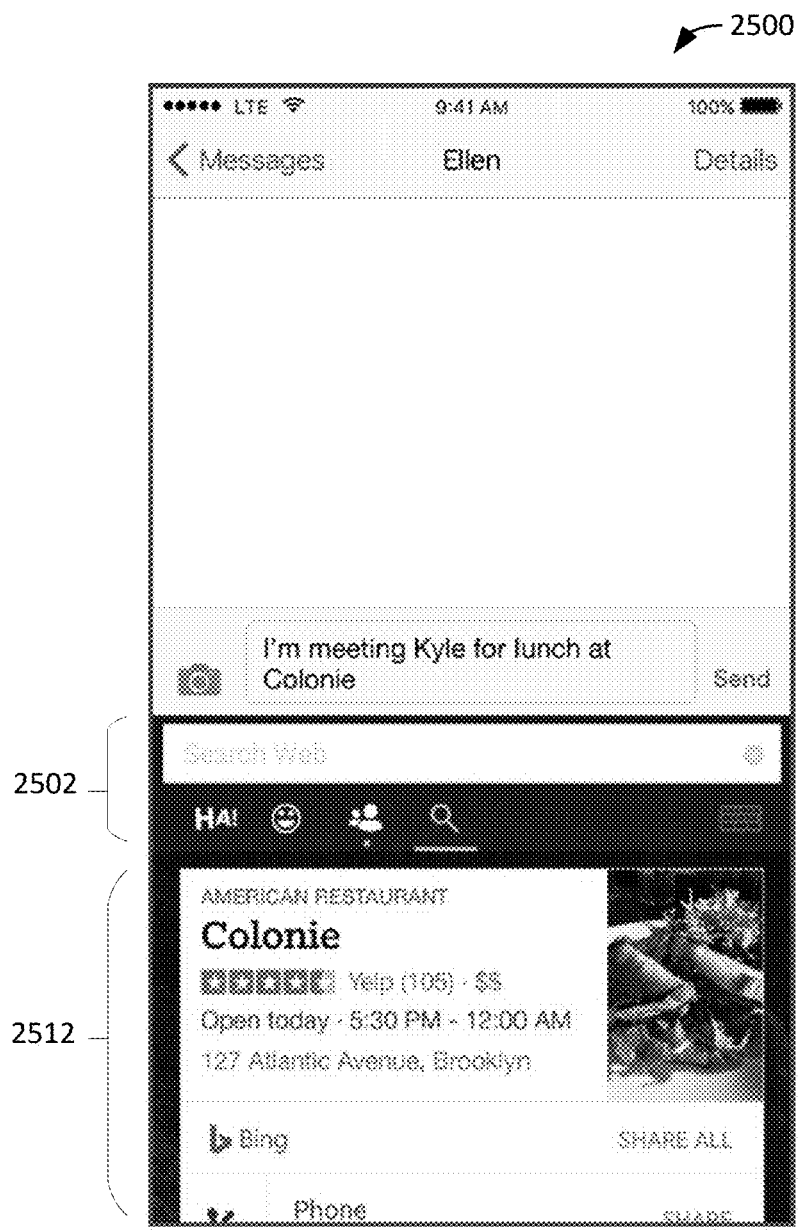

FIGS. 25A-25G illustrate additional task icon features. Task icons are discussed in detail with respect to, for example, FIGS. 4A-16. In FIG. 25A, user interface 2500 includes a virtual keyboard comprising an IME portion 2502 and keyboard keys 2504. FIG. 25A illustrates generation and presentation of a task icon 2506 based on determining a user intent to meet a person named Kyle. In FIG. 25B, task icon 2506 has moved to the right-hand edge of IME portion 2502 after it was determined that the user had not interacted with task icon 2506 (e.g., after a time threshold had elapsed). This "peek" of task icon 2506 can persist or can disappear from IME portion 2502 after a second time threshold has elapsed.

In FIG. 25C, the user has continued typing "lunch" onto the original entered text of "I'm meeting Kyle," and task icon 2506 has been removed from view. In FIG. 25D, the user additionally types "at Colonie," and a second task icon 2508 is generated and presented in IME portion 2502 based on a determined intent to go to the restaurant Colonie. In FIG. 25E, the user swipes IME portion 2502, as indicated by swipe mark 2510, to reveal a search interface, shown in FIG. 25F. In FIG. 25F, IME portion 2502 has expanded and now includes four search icons and a search query text entry area, similar to that shown in FIG. 22C. Keyboard keys 2504 have been replaced with a search result interface 2512.

The user has not interacted with either of task icon 2506 or second task icon 2508. The fact that task icons have been presented but were not interacted with is indicated in FIG. 25F by indicators 2514 and 2516, which appear as dots below the search icons whose category corresponds to task icon 2506 and second task icon 2508. That is, because a contact task icon was presented, a dot indicator is presented below the search icon for contacts, and because a restaurant task icon was presented, a dot indicator is presented below the web search icon (the restaurant task icon provides access to restaurant information accessed via the web). In some examples, a separate indicator is provided next to the search icons to indicate that previously presented but not interacted with task icons are available. In some examples, the task icons themselves are presented next to the search icons (e.g., task icon 2506 and second task icon 2508 are presented to the right of the web search (magnifying glass) icon shown in FIG. 25F). In some examples, only the most recent or a most recent number (e.g., two) of task icons are presented along with the search icons.

In FIG. 25G, a user has selected the web search icon (as indicated by the bolding/coloring and underlining, and the information linked to second task icon 2508 is presented. The indicator associated with the web search icon is then removed.

Figure 26B:
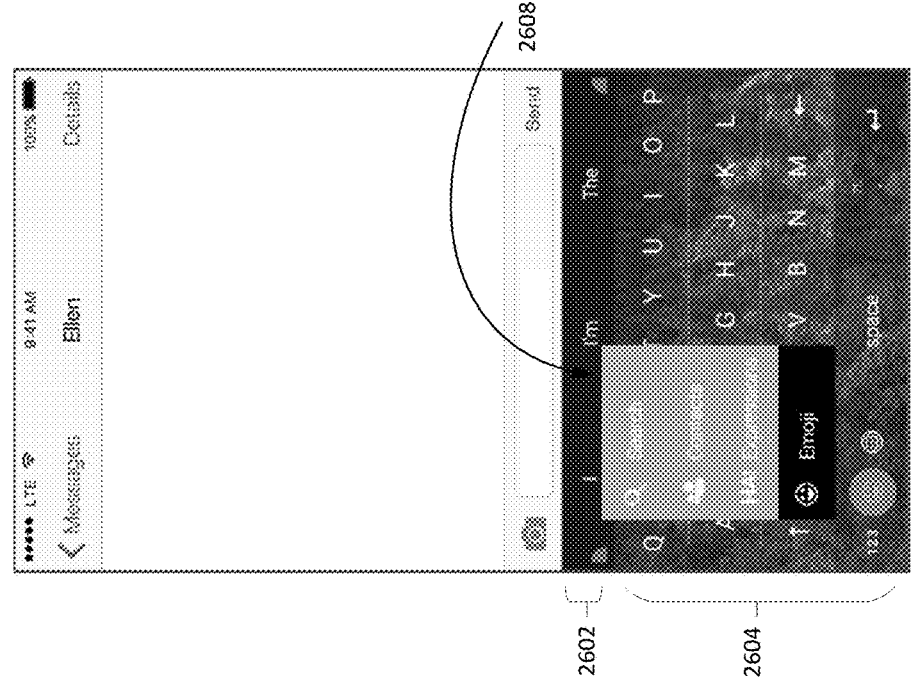
FIGS. 26A-26B illustrate presentation of a search interface menu in response to a user interaction with the virtual keyboard.
Figure 26A:
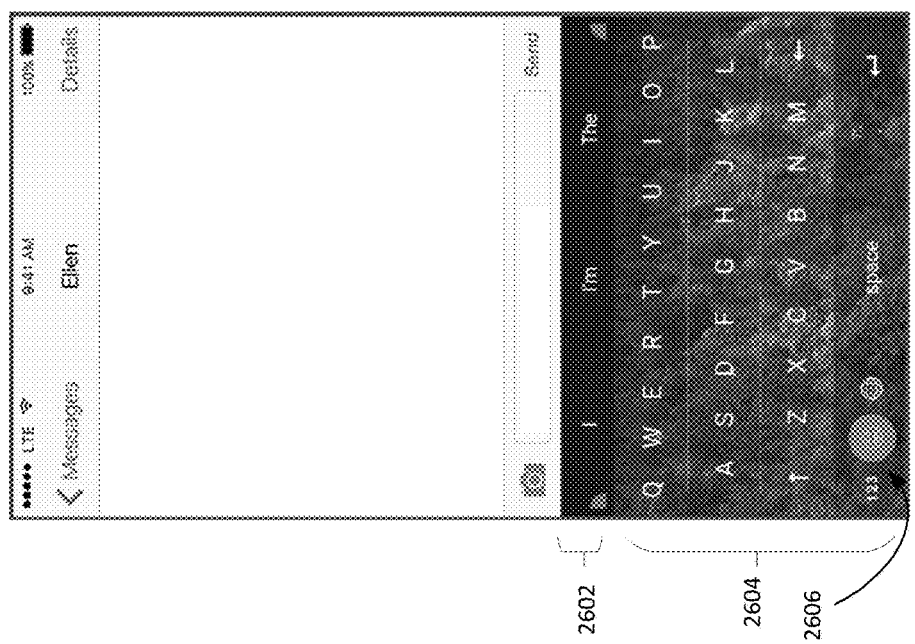

FIGS. 26A-26B illustrate an alternative or additional search interface entry point. User interface 2600 includes an IME portion 2602 and keyboard keys 2604. In FIG. 26A, a user press-and-hold of an emoji icon, indicated by touch marker 2606, launches a search menu 2608, shown in FIG. 26B. Search menu 2608 includes the four search icons discussed with respect to FIGS. 22A-22J, along with a text description of the corresponding search category. In some examples, a user selection, swipe, or other interaction with one of the search icons launches the search interface illustrated, for example, in FIGS. 22A-22J. In other examples, a search query text entry area is launched and search menu 2608 remains displayed.

Figure 27A:
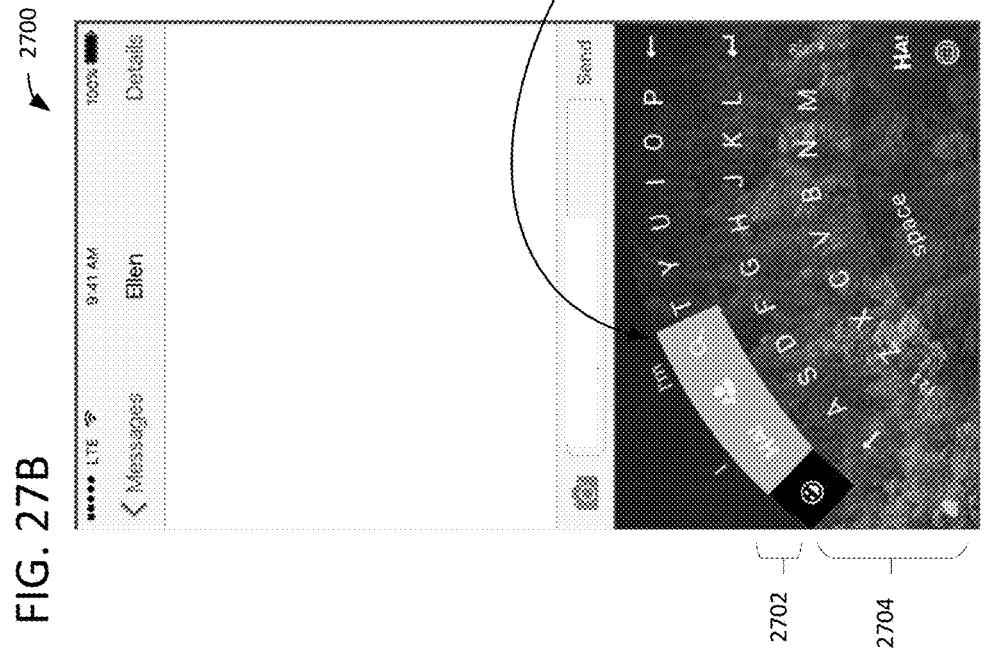
FIGS. 27A-27B illustrate an arc arrangement presentation of a search interface menu in response to a user interaction with the virtual keyboard.
Figure 27B:
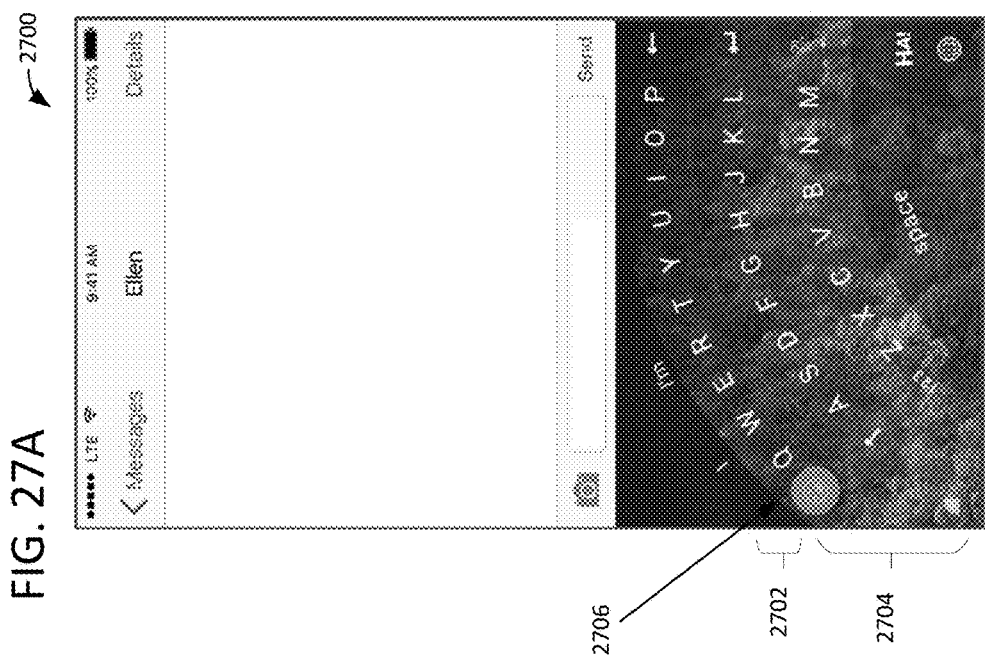

FIGS. 27A-27B illustrate still another alternative or additional search interface entry point. User interface 2700 includes a virtual keyboard in an "arc" style. The virtual keyboard includes IME portion 2702, and keyboard keys 2704. A user interaction with an emoji icon, as indicated by touch marker 2706, launches a search menu 2708 that extends, in an arc shape, to the right of the emoji icon. Search menu 2708 includes the same four search categories as illustrated in FIGS. 26A-26B, but other search categories are also possible. In some examples, an arc-shaped or other shape menu is displayed in another portion of the virtual keyboard rather than extending from the emoji icon. The emoji icon is used as an example launch point because an emoji search category is one of the four search categories shown. Other categories are possible (e.g., image search, video search, etc.), and other launch points are possible (e.g., "HA!" in the bottom right corner of FIGS. 27A and 27B). In some examples, a search query text entry box is presented when search menu 2708 is presented.

In some examples, a search icon is included within a virtual keyboard (e.g., in the IME portion of the virtual keyboard), and after a task icon is generated based on a determined user intent, the task icon is presented in place of the search icon. As an example, if a user is typing the message "we should book our flights to New York" in a messaging application, a user intent to purchase airline tickets to New York can be determined, and a flight or travel task icon can be presented in place of a search icon in the virtual keyboard (e.g., in the IME portion).

We claim:

1. A system, comprising:
   at least one processor; and
   a user interface generator configured to, by the at least one processor:
   generate a virtual keyboard for display in a user interface;
   upon receiving an indication of an interaction with an input method editor (IME) portion of the virtual keyboard, present a plurality of search icons in the IME portion of the virtual keyboard, the respective search icons representing different types of search functionality accessible via the virtual keyboard; and
   for at least one search icon among the plurality of presented search icons:
     determine that the at least one search icon corresponds to a task icon,
     determine that the corresponding task icon has not previously been interacted with, and
     present an indicator in association with the at least one search icon representing that the at least one search icon corresponds to a task icon that has not previously been interacted with.

2. The system of claim 1, wherein the interaction is a swipe of the IME portion of the virtual keyboard.

3. The system of claim 2, wherein the swipe of the IME portion of the virtual keyboard is a swipe of any portion of the IME portion of the virtual keyboard.

4. The system of claim 1, wherein the plurality of search icon comprises at least one of: a web search icon, an emoji search icon, a contacts search icon, a graphic interchange format (GIF) search icon, or a universal search icon.

5. The system of claim 1, wherein the user interface generator is further configured to, by the at least one processor, present a search query text entry area in conjunction with the plurality of search icons.

6. The system of claim 1, wherein the user interface generator is further configured to, by the at least one processor, replace a portion of the virtual keyboard with a search result interface.

7. The system of claim 6, wherein the search result interface replaces a portion of the virtual keyboard below the IME portion.

8. The system of claim 6, wherein the search result interface replaces the portion of the virtual keyboard prior to receiving a search query.

9. The system of claim 6, wherein the search result interface comprises search results of previous queries.

10. The system of claim 9, wherein the user interface generator is further configured to animate a transition in which one or more letter keys of the virtual keyboard are replaced by the search results of previous queries.

11. The system of claim 1, wherein prior to receiving the indication of the interaction, the virtual keyboard did not include a search icon.

12. A method for reconfiguring a graphical user interface on a computing device, the method comprising:
   presenting a virtual keyboard in the graphical user interface, wherein the virtual keyboard does not include a search icon or a search text entry area;
   receiving an indication of a swipe of an input method editor (IME) portion of the virtual keyboard;
   in response to the indication of the swipe, presenting, within the virtual keyboard, a search interface, the search interface comprising:

a plurality of search icons representing different search categories; and a search result interface, wherein the search result interface is presented in place of a portion of the virtual keyboard below the IME portion, and wherein the search result interface comprises search results for previously received or common search queries; and for at least one of the plurality of presented search icons:

determining that the at least one search icon corresponds to a task icon that has not previously been interacted with, and presenting an indicator in association with the at least one search icon representing that the at least one search icon corresponds to a task icon that has not previously been interacted with.

13. The method of claim 12, wherein the search interface further comprises a search query text entry area.

14. The method of claim 12, wherein the previously received or common search queries included in the search result interface correspond to the search category represented by a search icon of the plurality of search icons that is currently selected.

15. The method of claim 12, wherein the plurality of search icons comprise a web search icon and at least one of an image search icon, a video search icon, an emoji search icon, a contacts search icon, a graphic interchange format (GIF) search icon, or a universal search icon.

16. One or more computer-readable storage media storing computer-executable instructions for reconfiguring a graphical user interface, the reconfiguring comprising:

presenting a virtual keyboard in the graphical user interface;

receiving one or more text entries;

based at least in part on the one or more text entries, determining a user intent using one or more intent classifiers;

upon determining the user intent, presenting, within the virtual keyboard, a task icon representing functionality corresponding to the user intent, wherein interaction with the task icon results in a portion of the graphical user interface being replaced with a task icon user interface that provides access to the functionality corresponding to the user intent;

determining that the task icon has not been interacted with;

receiving an indication of a user interaction with an input method editor (IME) portion of the virtual keyboard; and presenting a search interface in the virtual keyboard responsive to receiving the indication, wherein the search interface comprises a plurality of search icons representing different search categories, and wherein the search interface includes an indicator presented in association with a search icon corresponding to the task icon, the indicator representing that the task icon was previously presented but not interacted with.

17. The one or more computer-readable storage media of claim 16, wherein the reconfiguring further comprises upon determining that the task icon has not been interacted with, moving the task icon to an edge of the graphical user interface such that only a portion of the task icon is visible.

18. The one or more computer-readable storage media of claim 17, wherein the reconfiguring further comprises removing the task icon from the graphical user interface when the search interface is presented.

* * * * *